(12) United States Patent
Singh et al.

(10) Patent No.: US 12,523,879 B2
(45) Date of Patent: Jan. 13, 2026

(54) CRYSTALLINE WAVEGUIDES AND WEARABLE DEVICES CONTAINING THE SAME

(71) Applicant: Magic Leap, Inc., Plantation, FL (US)

(72) Inventors: Vikramjit Singh, Pflugerville, TX (US); Chinmay Khandekar, Sunnyvale, CA (US); Robert D. TeKolste, Boulder, CO (US); Ryan Jason Ong, Austin, TX (US); Arturo Manuel Martinez, Jr., Austin, TX (US); Mohammadsadegh Faraji-Dana, Sunnyvale, CA (US); Qizhen Xue, Austin, TX (US); Frank Y. Xu, Austin, TX (US); Mauro Melli, San Leandro, CA (US); Brennen Mueller, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 19/131,149

(22) PCT Filed: Dec. 18, 2023

(86) PCT No.: PCT/US2023/084633
§ 371 (c)(1),
(2) Date: May 19, 2025

(87) PCT Pub. No.: WO2024/130250
PCT Pub. Date: Jun. 20, 2024

(65) Prior Publication Data
US 2026/0003192 A1    Jan. 1, 2026

Related U.S. Application Data

(60) Provisional application No. 63/433,335, filed on Dec. 16, 2022.

(51) Int. Cl.
*G02B 27/01* (2006.01)
*G02B 1/02* (2006.01)

(52) U.S. Cl.
CPC .......... *G02B 27/0172* (2013.01); *G02B 1/02* (2013.01); *G02B 27/0176* (2013.01);
(Continued)

(58) Field of Classification Search
CPC .......... G02B 27/0172; G02B 27/0176; G02B 2027/0132; G02B 2027/0123; G02B 2027/0178; G02B 2027/012; G02B 1/02
See application file for complete search history.

(56) References Cited

U.S. PATENT DOCUMENTS

| 3,867,185 A | 2/1975 | Primak |
| 11,327,315 B2 | 5/2022 | Luo et al. |

(Continued)

FOREIGN PATENT DOCUMENTS

WO    2019178120 A1    9/2019

OTHER PUBLICATIONS

Sanna et al., "Lithium Niobate X-cut, Y-cut, and Z-cut surfaces from ab initio theory," Physical Review B, Jun. 2010, 81:214116-1-214116-11.

(Continued)

*Primary Examiner* — Muhammad N Edun
(74) *Attorney, Agent, or Firm* — Fish & Richardson P.C.

(57) ABSTRACT

A head-mounted display system includes: a head mounted display frame; a first eyepiece supported by the frame, the first eyepiece including a first substrate composed of a crystalline, transparent material having crystallographic axes in a first orientation with respect to the frame, the substrate having a first surface and a second surface opposite the first surface, the first eyepiece further including a first in-coupling element including a grating on the first surface, (Continued)

and a first out-coupling element including a grating on the first surface and/or a grating on the second surface; and a second eyepiece including a second substrate composed of the crystalline, transparent material having crystallographic axes in a second orientation with respect to the frame different from the first orientation, a second in-coupling element on either surface of the second substrate, and a second out-coupling element on either surface of the second substrate.

20 Claims, 40 Drawing Sheets

(52) U.S. Cl.
CPC ............. *G02B 2027/012* (2013.01); *G02B 2027/0123* (2013.01); *G02B 2027/0132* (2013.01); *G02B 2027/0178* (2013.01)

(56) References Cited

U.S. PATENT DOCUMENTS

| | | |
|---|---|---|
| 2018/0052276 A1 | 2/2018 | Klienman et al. |
| 2020/0271840 A1 | 8/2020 | Klug et al. |
| 2020/0310121 A1 | 10/2020 | Choi et al. |
| 2021/0033867 A1* | 2/2021 | Luo .................. G02B 5/1866 |
| 2021/0072437 A1 | 3/2021 | Singh et al. |
| 2021/0239984 A1 | 8/2021 | Popovich et al. |
| 2022/0128817 A1 | 4/2022 | Singh et al. |
| 2022/0269075 A1* | 8/2022 | Yang ................ G02B 27/0103 |
| 2023/0296845 A1* | 9/2023 | Fan .................... G02B 6/0016 |

OTHER PUBLICATIONS

Schlarb et al., "Refractive indices of Lithium Niobate as a function of wavelength and composition," Journal of Applied Physics, Apr. 1993, 73(7):3472-3476.
International Search Report and Written Opinion in International Appln. No. PCT/US2023/084633, mailed on Apr. 25, 2024, 9 pages.
Lee et al., "Metasurface eyepiece for augmented reality," Nature Communications, Nov. 2018, 9:4562, 10 pages.

* cited by examiner

1300

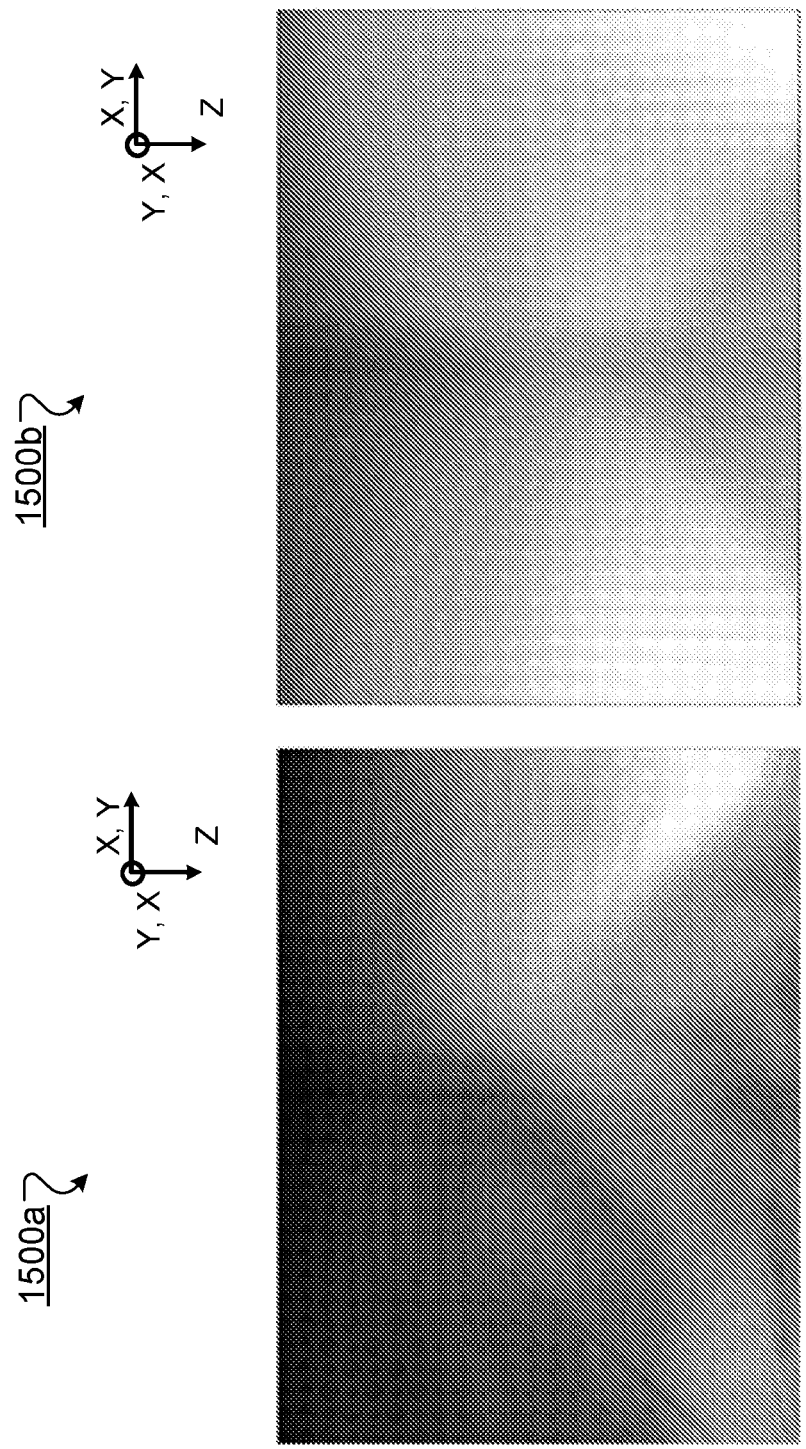

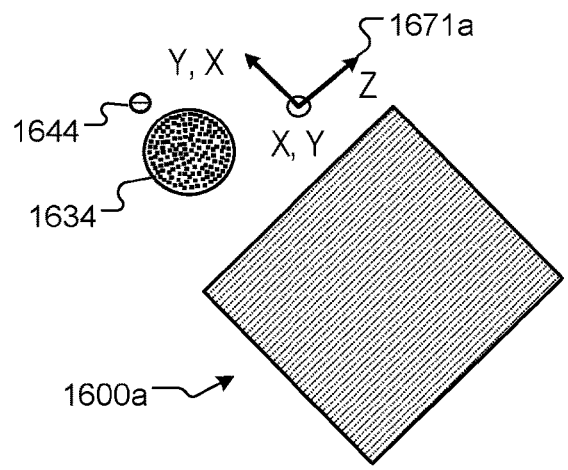
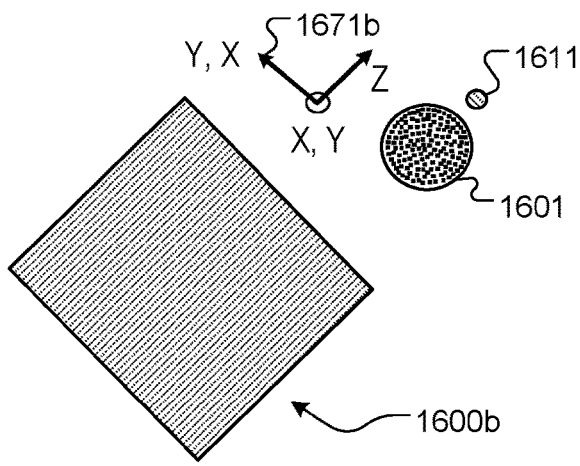
FIG. 16A   FIG. 16B
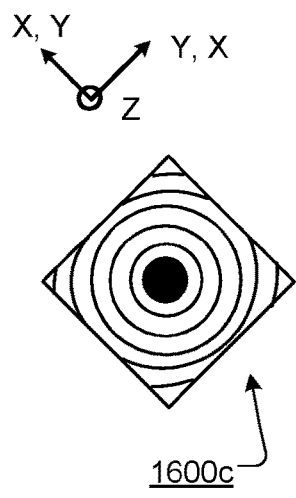
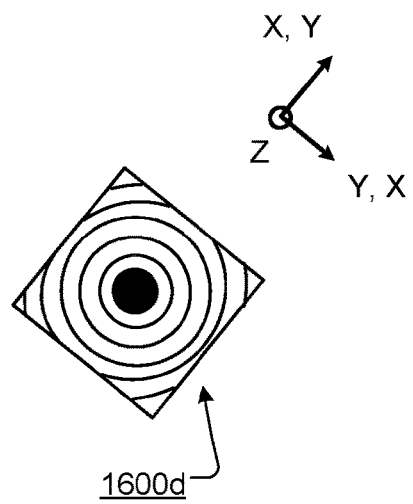
FIG. 16C   FIG. 16D

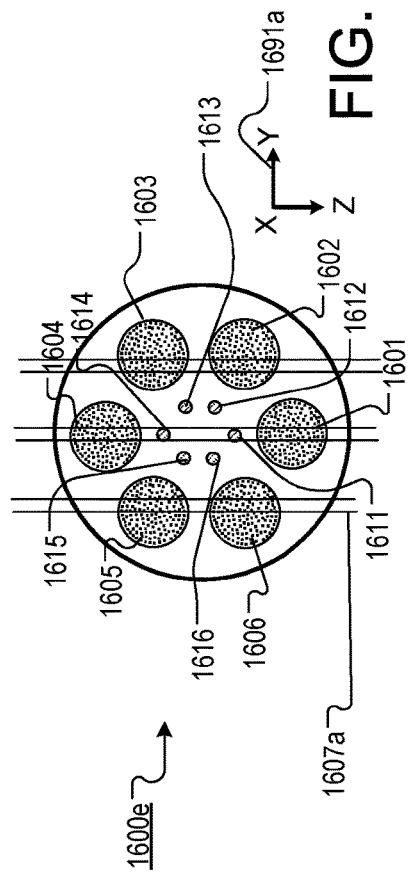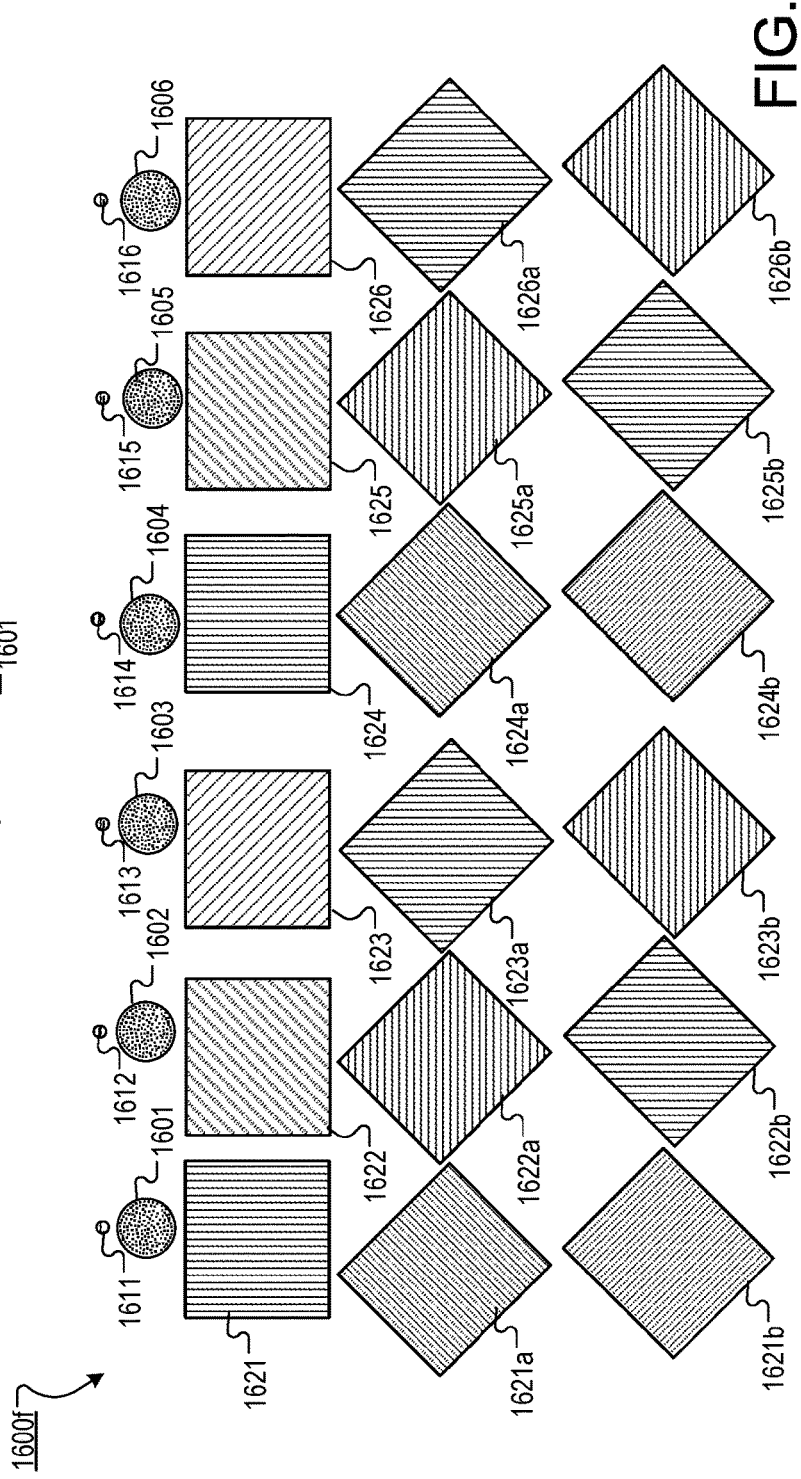

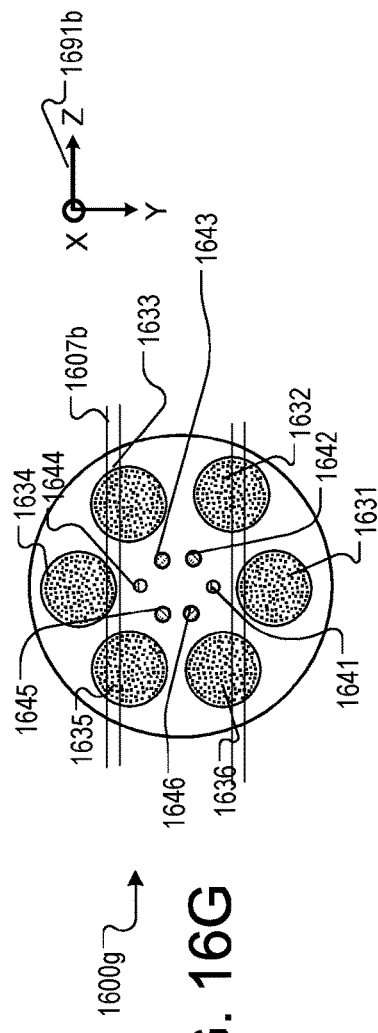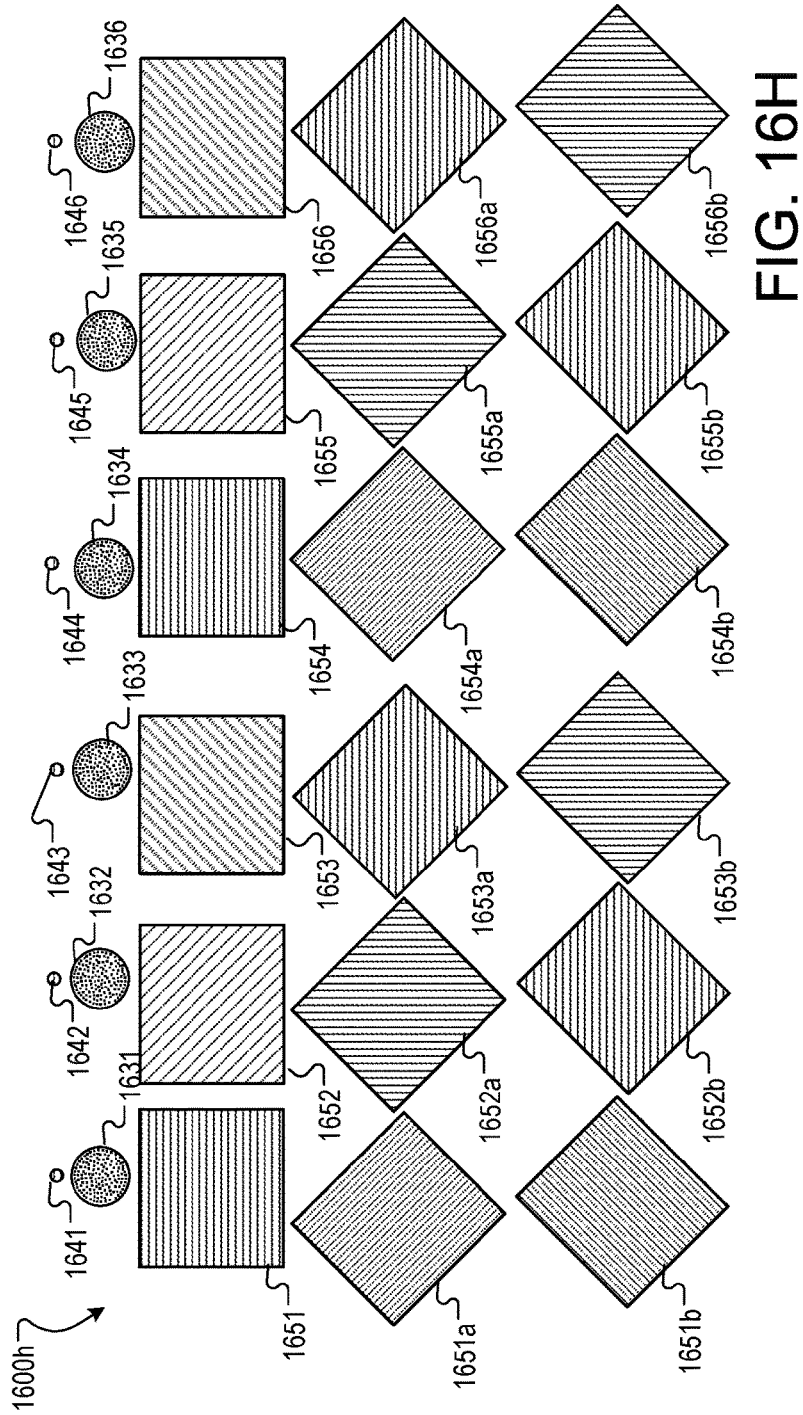

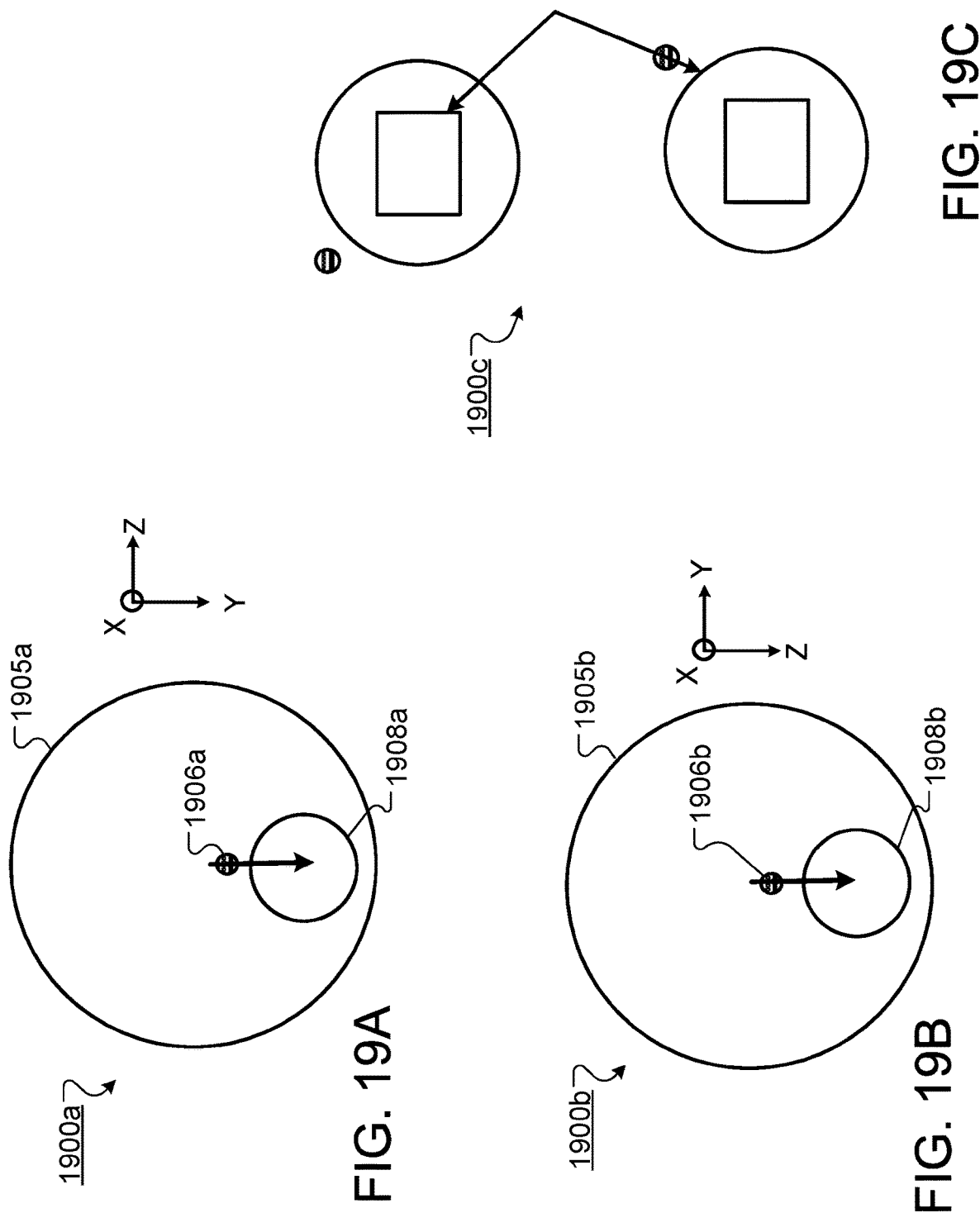

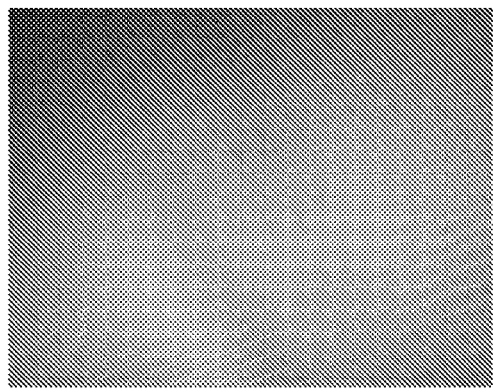
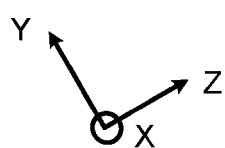
FIG. 19D
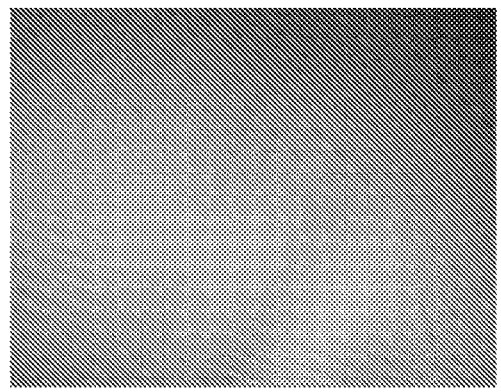
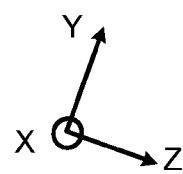
FIG. 19E
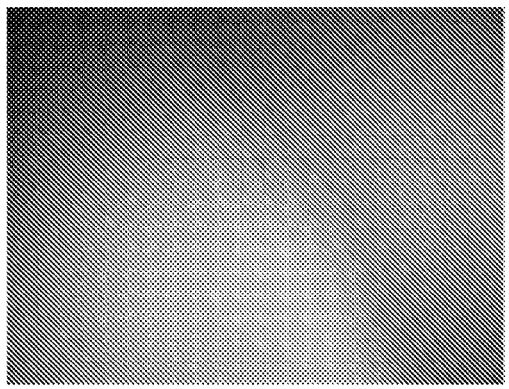
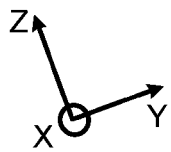
FIG. 19F
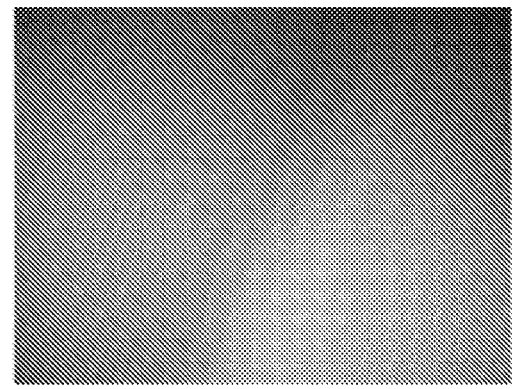
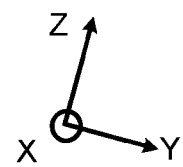
FIG. 19G

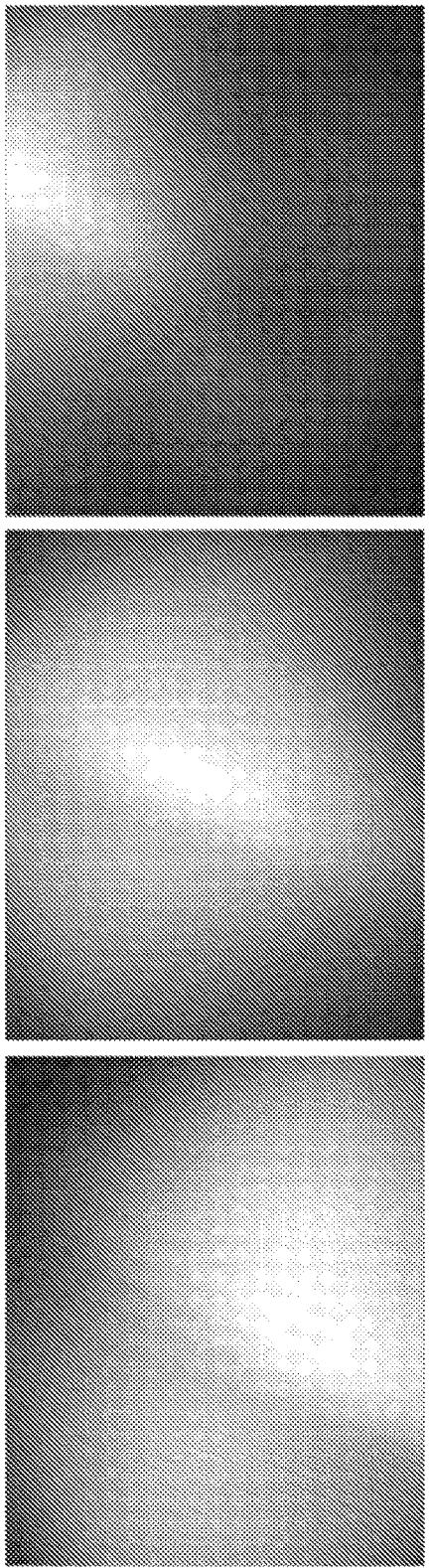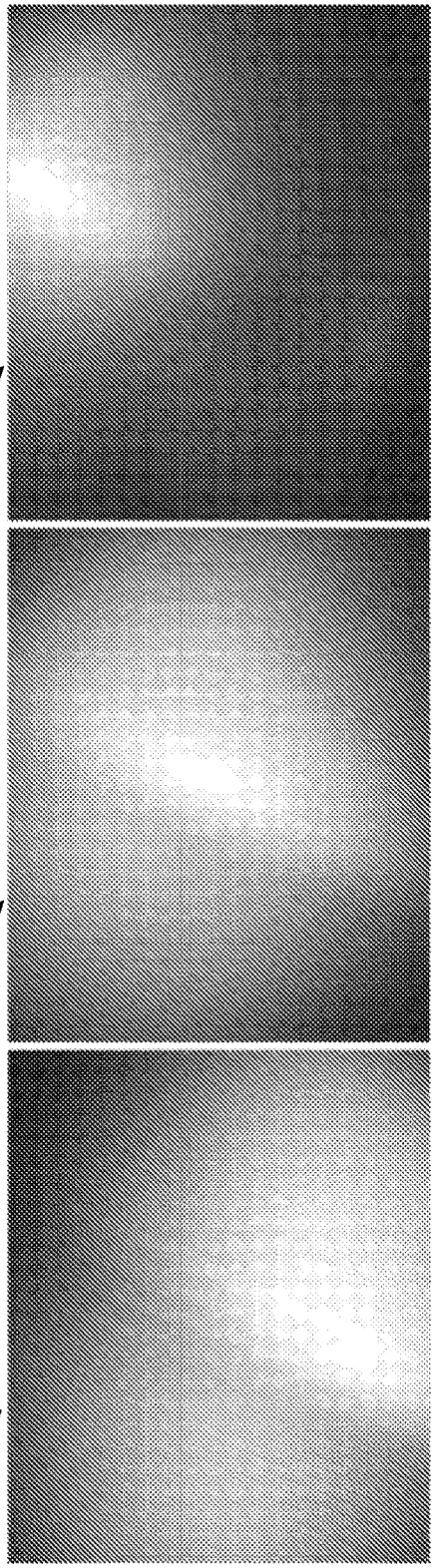
FIG. 23E  FIG. 23F  FIG. 23G
FIG. 23H  FIG. 23I  FIG. 23J

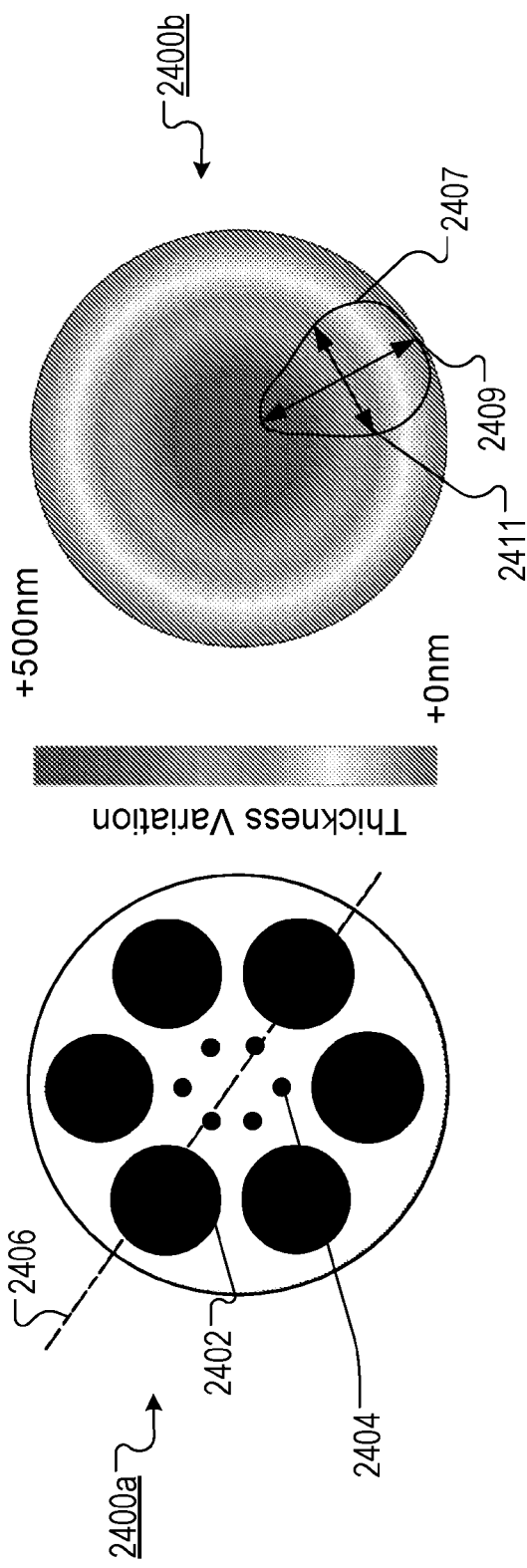
FIG. 24A
FIG. 24B
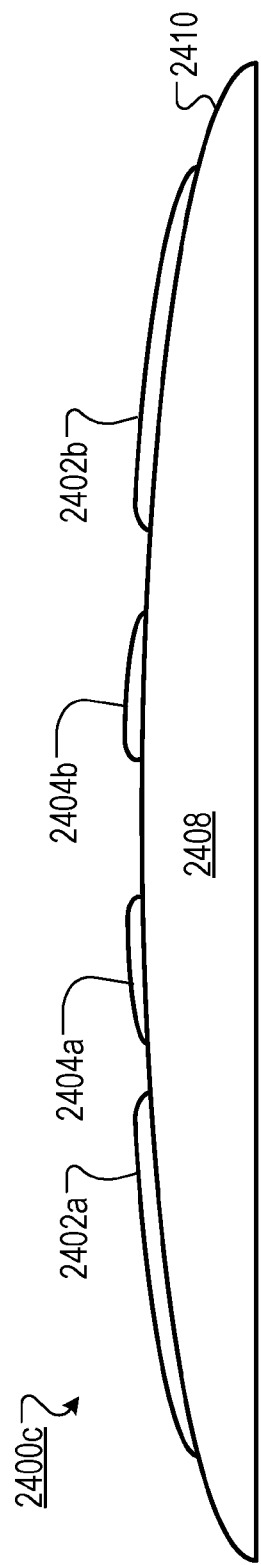
FIG. 24C

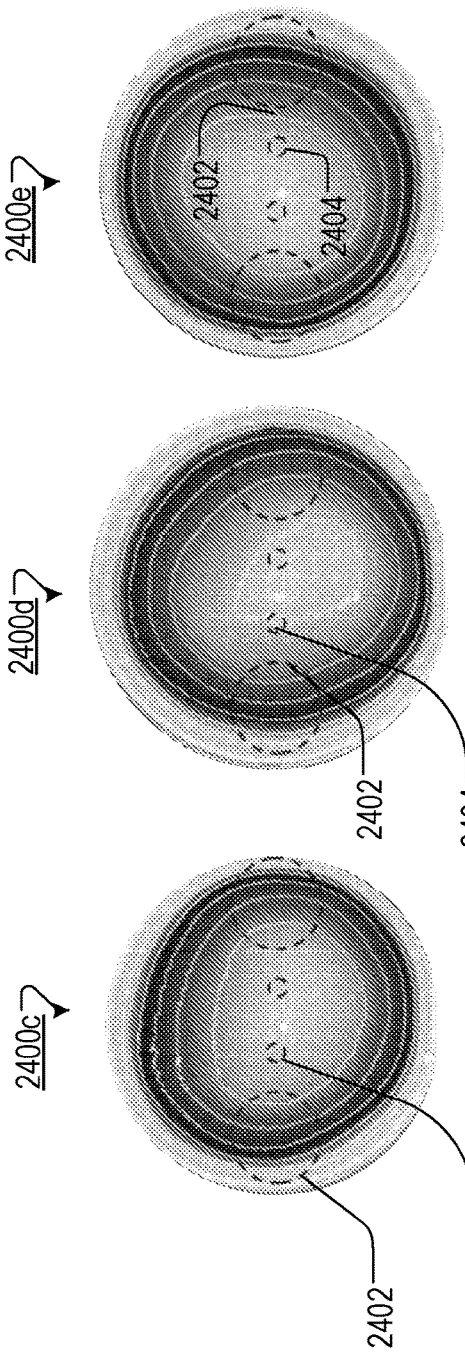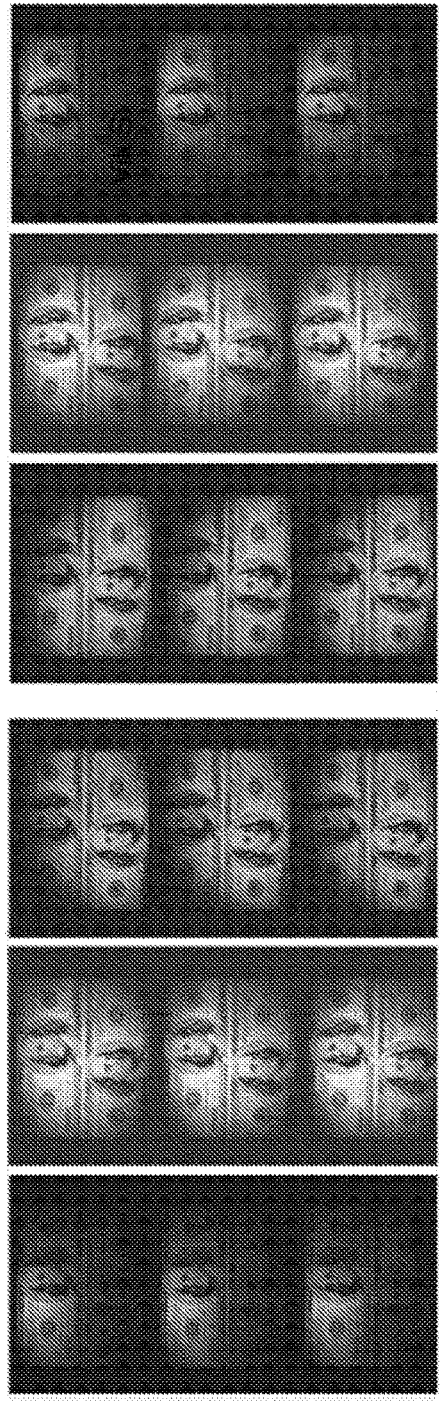
FIG. 24F  FIG. 24E  FIG. 24D
FIG. 24H  FIG. 24G

CRYSTALLINE WAVEGUIDES AND WEARABLE DEVICES CONTAINING THE SAME

CROSS-REFERENCE TO RELATED APPLICATIONS

This application is a National Stage application under 35 U.S.C. § 371 of International Application No. PCT/US2023/084633, having an International Filing Date of Dec. 18, 2023, which claims the benefit of priority to U.S. Provisional Application No. 63,433,335, filed on Dec. 16, 2022.

The disclosure of the prior applications is hereby incorporated by reference in their entireties.

BACKGROUND

The present disclosure relates to display systems and, more particularly, to augmented and virtual reality display systems and substrates for use therewith.

DESCRIPTION OF THE RELATED ART

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world, concrete platform 30, and a cartoon-like avatar character 50 flying by, which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

In augmented reality (AR) systems, substrates with high indices of refraction can advantageously provide large field of views (FOVs). Certain materials with high indices of refraction, however, are optically anisotropic (also known as birefringent), e.g., the index of refraction depends on the direction of light propagation relative to the optic axis of the material.

In AR systems, many factors can contribute to optical artifacts, e.g., undesirable optical effects. The appearance of these optical artifacts can depend on the index of refraction of the material. Consequently, the orientation of any birefringent material in the system can impact the magnitude of optical artifacts due to the birefringence. The present disclosure contemplates devices, systems, and methods to mitigate the appearance of optical artifacts that depend on the birefringence of crystalline materials with a high index of refraction.

Various aspects of the disclosed subject matter are summarized as follows.

In general, in a first aspect, the disclosure features

Examples of the head-mounted display system can include one or more of the following features.

Other features and advantages will be apparent from the drawings, the description below, and the claims.

BRIEF DESCRIPTION OF THE DRAWINGS

FIGS. 15A and 15B depict fields of view for eyepieces with $LiTaO_3$ and $LiNbO_3$ substrates, respectively.

FIGS. 16A and 16B respectively depict optical artifacts for left and right eyepieces for X- and Y-cut wafers.

FIGS. 16C and 16D respectively depict optical artifacts for left and right eyepieces for Z-cut wafers.

FIG. 16E depicts a wafer with six eyepieces with the crystallographic axes oriented in a first direction. FIG. 16F depicts the optical artifacts associated with the six eyepieces of the wafer of FIG. 16E.

FIG. 16G depicts a wafer with six eyepieces with the crystallographic axes oriented in a second direction different from the first direction. FIG. 16H depicts the optical artifacts associated with the six eyepieces of the wafer of FIG. 16G.

FIGS. 19A and 19B depict X-cut wafers with left and right eyepieces, respectively.

FIG. 19C is a schematic of the right and left eyepieces from FIGS. 19A and 19B aligned for a headset. FIGS. 19D, 19E, 19F, and 19G are images captured by a camera positioned over out-coupling elements of the eyepieces from the wafers of FIGS. 19A and 19B.

FIGS. 21D, 21E, 21F, 21G, 21H, and 21I depict images generated using the polarization insensitive in-coupling grating of FIG. 21C for red, green, and blue light.

FIGS. 23E, 23F, and 23G respectively depict red, green, and blue eye box efficiencies for the eyepiece of FIG. 32A. FIGS. 23H, 23I, and 23J respectively depict red, green, and blue eye box efficiencies for the eyepiece of FIG. 23B.

FIG. 24A depicts a wafer with thickness variation. FIG. 24B depicts the height gradation of the wafer from FIG. 24A. FIG. 24C depicts a cross-sectional view of the wafer of FIG. 24A.

FIGS. 24D, 24E, and 24F depict wafers with different thickness variations. FIGS. 24G and 24H depict images produced by eyepieces within the wafers from FIGS. 24D, 24E, and 24F.

Figure 1:
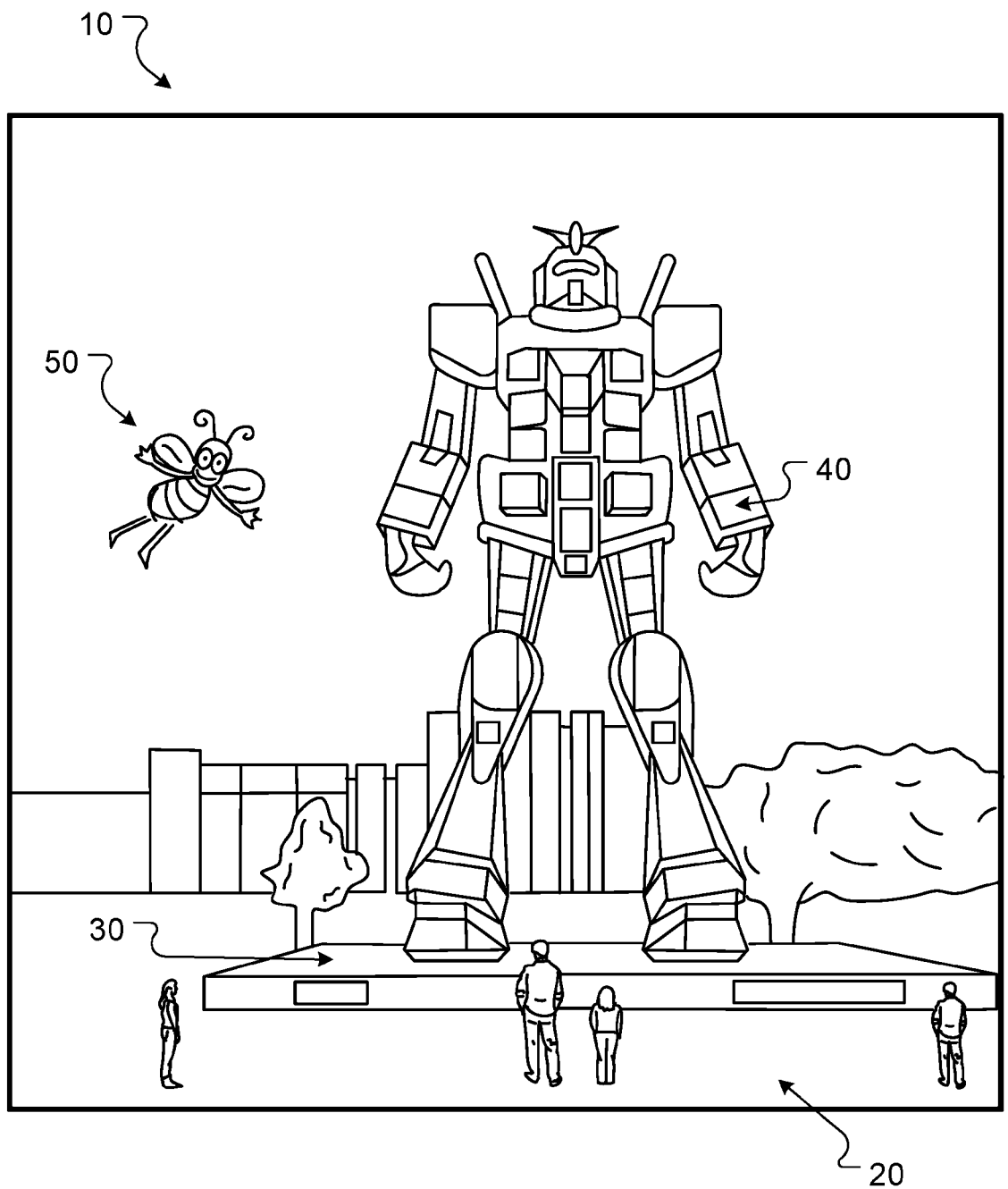
FIG. 1 illustrates a user's view of augmented reality (AR) through an AR device.

Throughout the drawings, reference numbers may be re-used to indicate correspondence between referenced elements. The drawings are provided to illustrate example implementations described herein and are not intended to limit the scope of the disclosure.

DETAILED DESCRIPTION

AR systems may display virtual content to a user, or viewer, while still allowing the user to see the world around them. Preferably, this content is displayed on a head-mounted display, e.g., as part of eyewear, that projects image information to the user's eyes. In addition, the display may also transmit light from the surrounding environment to the user's eyes, to allow a view of that surrounding environment. As used herein, it will be appreciated that a "head-mounted" or "head mountable" display is a display that may be mounted on the head of a viewer or user.

In some AR systems, virtual/augmented/mixed display having a relatively high field of view (FOV) can enhance the viewing experience. The FOV of the display depends on the angle of light output by waveguides of the eyepiece, through which the viewer sees images projected into his or her eye. A waveguide having a relatively high refractive index, e.g., 1.8 or greater, can provide a relatively high FOV. However, to efficiently couple light into the high refractive index waveguide, the diffractive optical coupling elements should also have a correspondingly high refractive index. To achieve this goal, among other advantages, some displays for AR systems according to implementations described herein include a waveguide including a relatively high-index (e.g., 1.8 or more, such as 2.0 or more) material, having formed thereon respective diffraction gratings with correspondingly high refractive index, such a Li-based oxide. For example, a diffraction grating may be formed directly on a Li-based oxide waveguide by patterning a surface portion of the waveguide formed of a Li-based oxide.

Some high refractive index diffractive optical coupling elements such as in-coupling or out-coupling optical elements have strong polarization dependence. For example, in-coupling gratings (ICGs) for in-coupling light into a waveguide where the diffractive optical coupling element includes high refractive index material may admit light of a given polarization significantly more than light of another polarization. Such elements may, for example, in-couple light with TM polarization into the waveguide at a rate approximately 3 times that of light with TE polarization. Diffractive optical coupling elements with this kind of polarization dependence may have reduced efficiency (due to the poor efficiency and general rejection of one polarization) and may also create coherent artifacts and reduce the uniformity of a far field image formed by light coupled out of a birefringent waveguide. To obtain diffractive optical coupling elements that are polarization-insensitive or at least that have reduced polarization sensitivity (e.g., that couple light with an efficiency that is relatively independent of polarization), some displays for AR systems according to various implementations described herein include a waveguide with diffraction gratings formed with blazed geometries. The diffraction grating may also be formed directly in the waveguide, which may include high-index material (e.g., having an index of refraction of at least 1.9, 2.0, 2.1, 2.2, 2.3, 2.4, 2.5, 2.6, or up to 2.7 or a value in any range between any of these values). A diffractive grating may, for example, be formed in high-index materials such as such as Li-based oxide like lithium niobate ($LiNbO_3$) or lithium tantalate ($LiTaO_3$) or such as zirconium oxide ($ZrO_2$), titanium dioxide ($TiO_2$), silicon nitride $Si_3N_4$, or silicon carbide (SiC), for example, by patterning the high-index material with a blazed geometry.

Reference will now be made to the drawings, in which like reference numerals refer to like parts throughout. Unless indicated otherwise, the drawings are schematic not necessarily drawn to scale.

Figure 2:
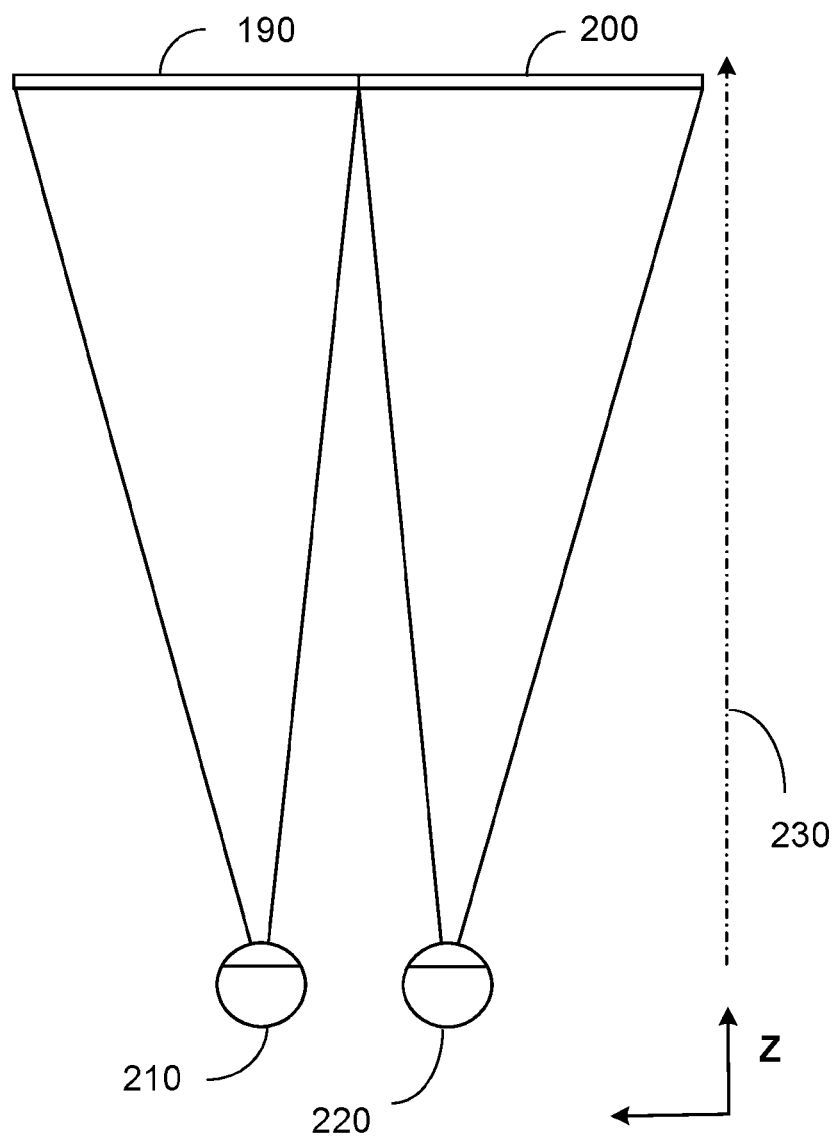
FIG. 2 illustrates a conventional display system for simulating three-dimensional imagery for a user.

FIG. 2 illustrates a conventional display system for simulating three-dimensional imagery for a user. A user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a Z-axis. The Z-axis is parallel to the optic axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
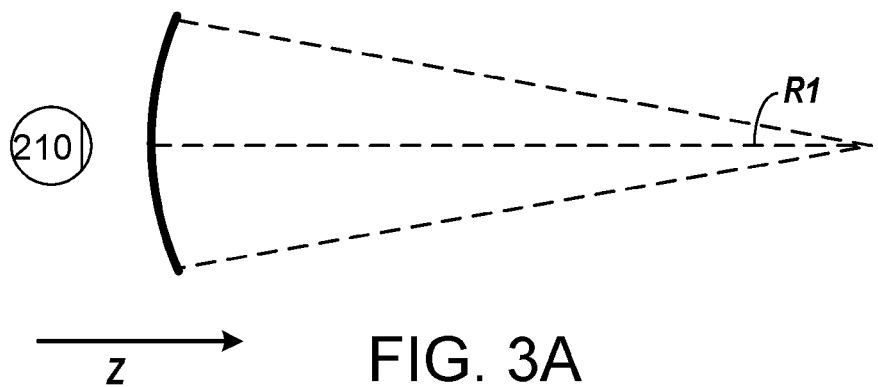
FIGS. 3A, 3B and 3C illustrate relationships between radius of curvature and focal radius.
Figure 3B:
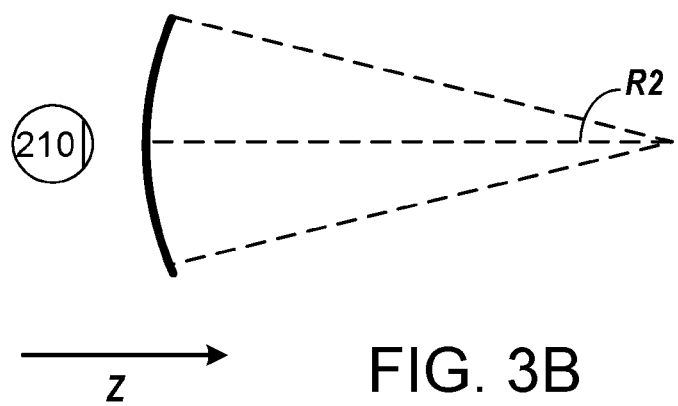
Figure 3C:
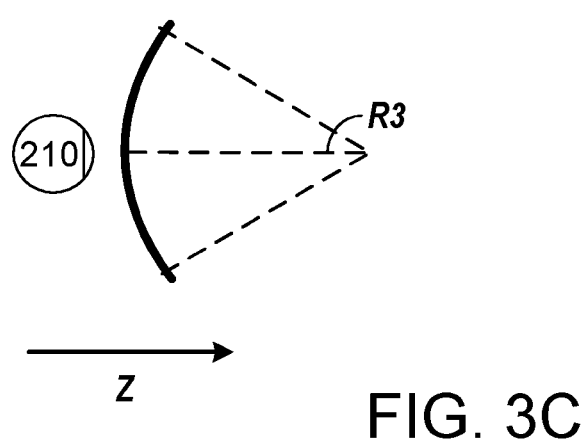

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
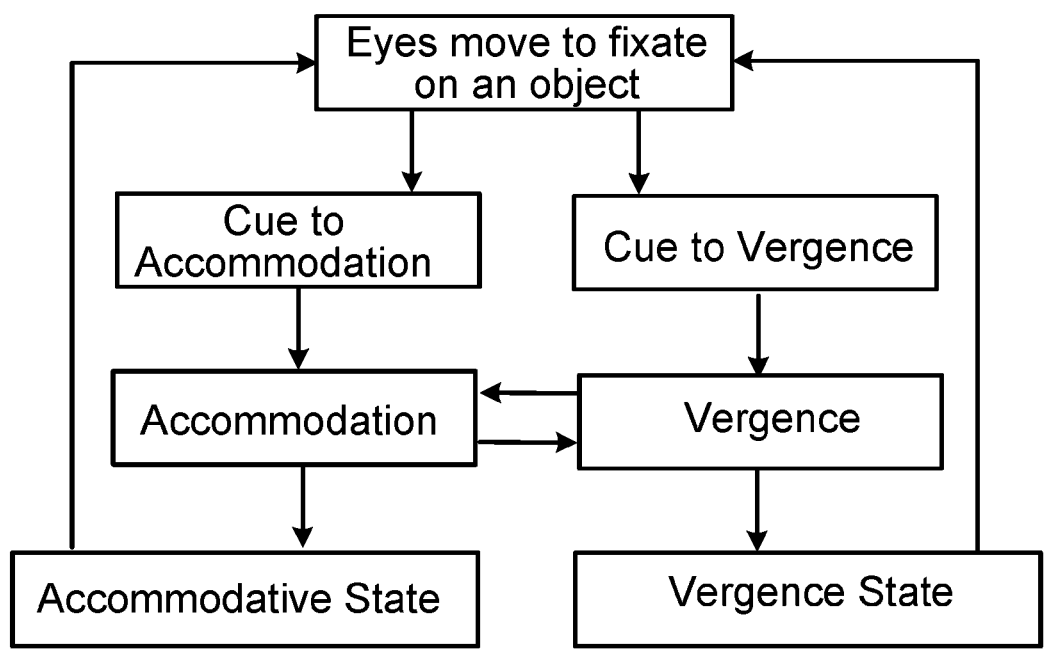
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the Z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
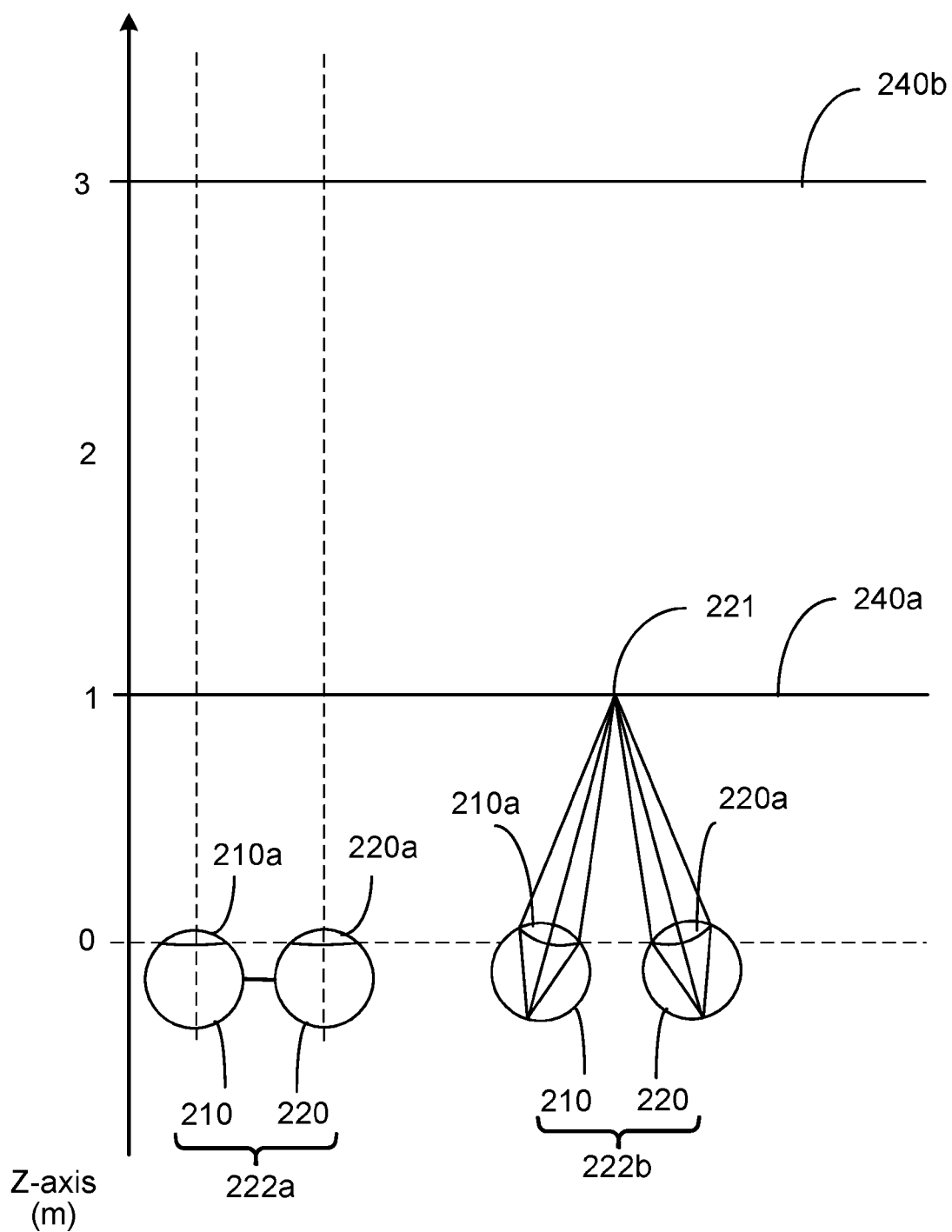
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on a point 221 at less than optical infinity. Notably, the vergence states of each pair of eyes is different, with the pair of eyes 222a directed straight ahead, while the pair of eyes 222 converge on the point 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some implementations, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated implementation, the distance, along the Z-axis, of the depth plane 240 containing the point 221 is 1 m. As used herein, distances or depths along the Z-axis may be measured with a zero-point located at the exit pupils of the user's eyes. Thus, a depth plane 240 located at a depth of 1 m corresponds to a distance of 1 m away from the exit pupils of the user's eyes, on the optic axis of those eyes with the eyes directed towards optical infinity. As an approximation, the depth or distance along the Z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
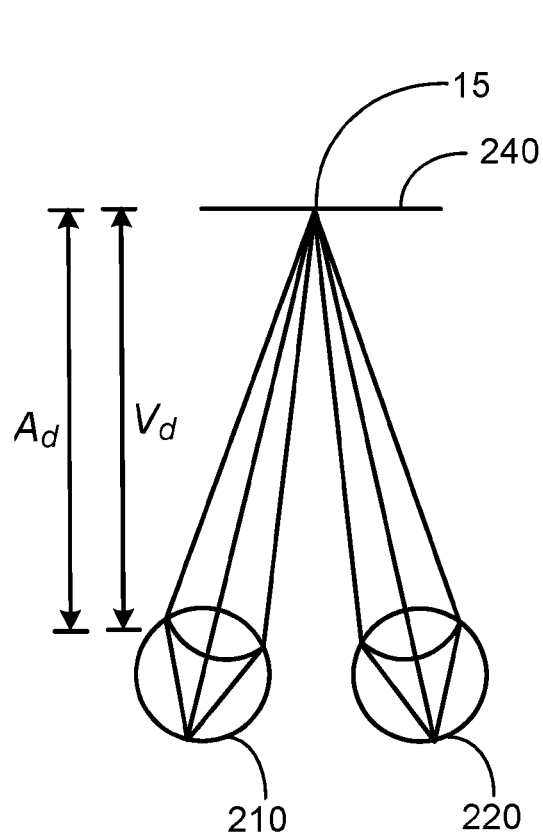
FIG. 4C illustrates an example of a representation of a top-down view of a user viewing content via a display system.
Figure 4D:
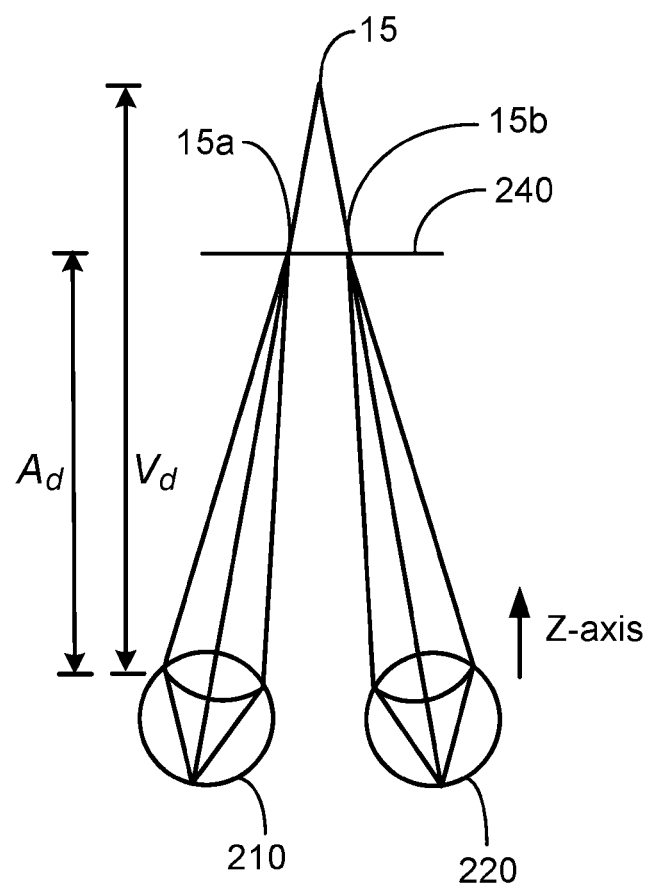
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the Z-axis. For example, an object at a particular distance from the eyes 210, 220 causes those eyes to assume particular accommodative states based upon the distances of the object. The distance associated with a particular accommodative state may be referred to as the accommodation distance, Ad. Similarly, there are particular vergence distances, Vd, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some implementations. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., Vd-Ad) and may be characterized using diopters.

In some implementations, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some implementations, display systems disclosed herein (e.g., the display system 250, FIG. 6) present images to the viewer having accommodation-vergence mismatch of about 0.5 diopter or less. In some other implementations, the accommodation-vergence mismatch of the images provided by the display system is about 0.33 diopter or less. In yet other implementations, the accommodation-vergence mismatch of the images provided by the display system is about 0.25 diopter or less, including about 0.1 diopter or less.

Figure 5:
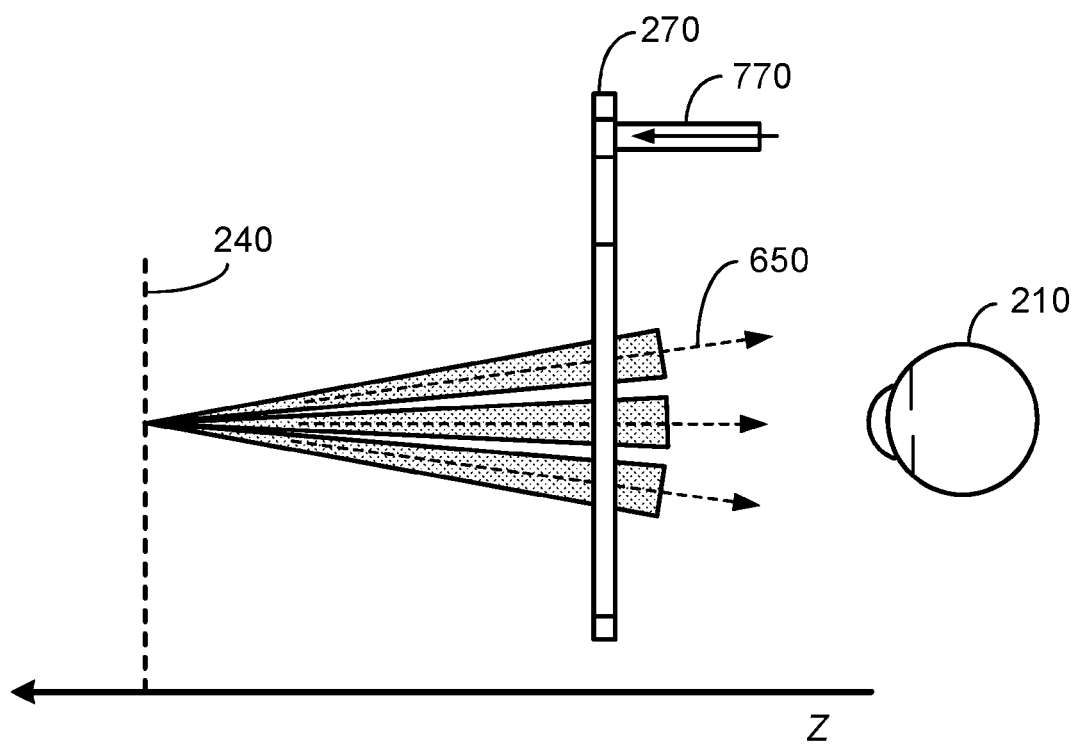
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light rays 770 that is encoded with image information, and to output that light to the user's eye 210. The waveguide 270 may output the exit beam 650 with a defined amount of wavefront divergence corresponding to the wavefront divergence of a light field produced by a point on a desired depth plane 240. In some implementations, the same amount of wavefront divergence is provided for all objects presented on that depth plane. In addition, it will be illustrated that the other eye of the user may be provided with image information from a similar waveguide.

In some cases, a single waveguide may be configured to output light with a set amount of wavefront divergence corresponding to a single or limited number of depth planes and/or the waveguide may be configured to output light of a limited range of wavelengths. Consequently, in some implementations, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
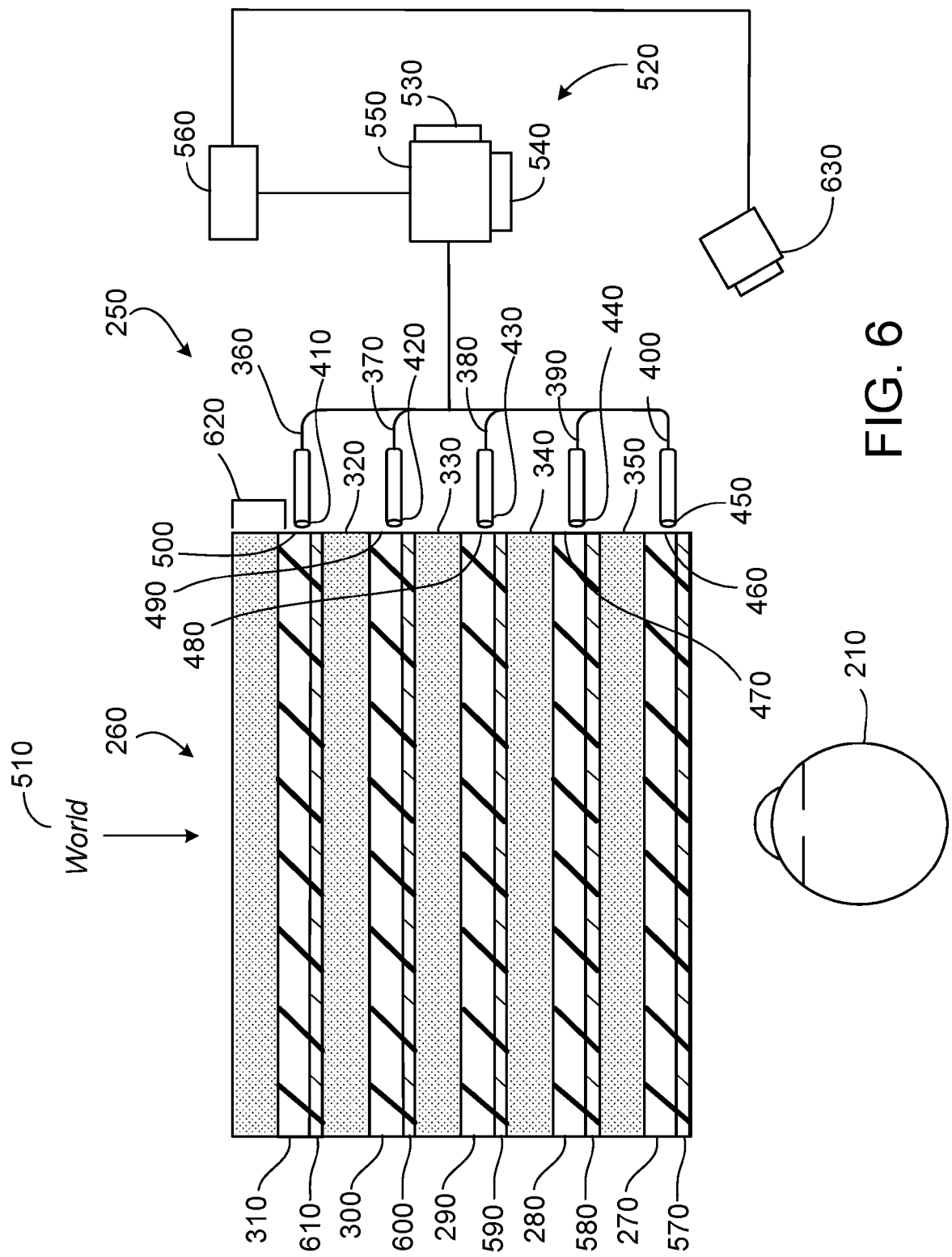
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some implementations. In addition, the waveguide assembly 260 may also be referred to as an eyepiece.

In some implementations, the display system 250 is configured to provide substantially continuous cues to vergence and multiple discrete cues to accommodation. The cues to vergence can be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some implementations, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some implementations, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and can be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some implementations, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some implementations, a single beam of light (e.g., a collimated beam) may be injected into each waveguide to output an entire field of cloned collimated beams that are directed toward the eye 210 at particular angles (and amounts of divergence) corresponding to the depth plane associated with a particular waveguide. In some implementations, a single one of the image injection devices 360, 370, 380, 390, 400 may be associated with and inject light into a plurality (e.g., three) of the waveguides 270, 280, 290, 300, 310.

In some implementations, the image injection devices 360, 370, 380, 390, 400 are discrete displays that each produce image information for injection into a corresponding waveguide 270, 280, 290, 300, 310, respectively. In some other implementations, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some implementations, the light injected into the waveguides 270, 280, 290, 300, 310 is provided by a light projector system 520, which includes a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some implementations, these image injection devices may represent different light paths and locations in a common projection system configured to output light into associated ones of the waveguides 270, 280, 290, 300, 310. In some implementations, the waveguides of the waveguide assembly 260 may function as ideal lens while relaying light injected into the waveguides out to the user's eyes. In this conception, the object may be the spatial light modulator 540 and the image may be the image on the depth plane.

In some examples, µLED displays can be used in light projector system 520. µLED displays can unpolarized light over a large range of angles. Accordingly, µLED displays can beneficially provide imagery over wide fields of view with high efficiency.

In some implementations, the display system 250 may be a scanning fiber display including one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some implementations, the illustrated image injection devices 360, 370, 380, 390, 400 may schematically represent a single scanning fiber or a bundle of scanning fibers configured to inject light into one or a plurality of the waveguides 270, 280, 290, 300, 310. In some other implementations, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light module 530, and the light modulator 540. In some implementations, the controller 560 is part of the local processing and data module 140. The controller 560 includes programming (e.g., instructions in a non-transitory medium) that regulates the timing and provision of image information to the waveguides 270, 280, 290, 300, 310 according to, e.g., any of the various schemes disclosed herein. In some implementations, the controller may be a single integral device, or a distributed system connected by wired or wireless communication channels. The controller 560 may be part of the local processing and data module 140 or remote processing module 150 (FIG. 9D) in some implementations.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some implementations, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some implementations, the out-coupling optical elements 570, 580, 590, 600, 610 may be formed in a layer of material that is attached to a transparent substrate to form the waveguides 270, 280, 290, 300, 310. In some other implementations, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first and second lenses 350 and 340 before reaching the eye 210; the combined optical power of the first and second lenses 350 and 340 may be configured to create another incremental amount of wavefront curvature so that the eye/brain interprets light coming from the third waveguide 290 as coming from a second focal plane that is even closer inward toward the person from optical infinity than was light from the next waveguide up 280.

The other layers of waveguide 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the stack of lenses 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative implementations, either or both may be dynamic using electro-active features.

In some implementations, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some implementations, the out-coupling optical elements 570, 580, 590, 600, 610 may be volumetric or surface features, which may be configured to output light at specific angles. For example, the out-coupling optical elements 570, 580, 590, 600, 610 may be volume holograms, surface holograms, and/or diffraction gratings. In some implementations, the features 320, 330, 340, 350 may not be lenses; rather, they may simply be spacers (e.g., cladding layers and/or structures for forming air gaps).

In some implementations, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some implementations, one or more DOEs may be switchable between "on" states in which they actively diffract, and "off" states in which they do not significantly diffract. For instance, a switchable DOE may include a layer of polymer dispersed liquid crystal, in which microdroplets include a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some implementations, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some implementations, the camera assembly 630 may include an image capture device and a light source to project light (e.g., infrared light) to the eye, which may then be reflected by the eye and detected by the image capture device. In some implementations, the camera assembly 630 may be attached to the frame 80 (FIG. 9D) and may be in electrical communication with the local processing and data module 140 and/or remote processing module 150, which may process image information from the camera assembly 630. In some implementations, one camera assembly 630 may be utilized for each eye, to separately monitor each eye.

Figure 7:
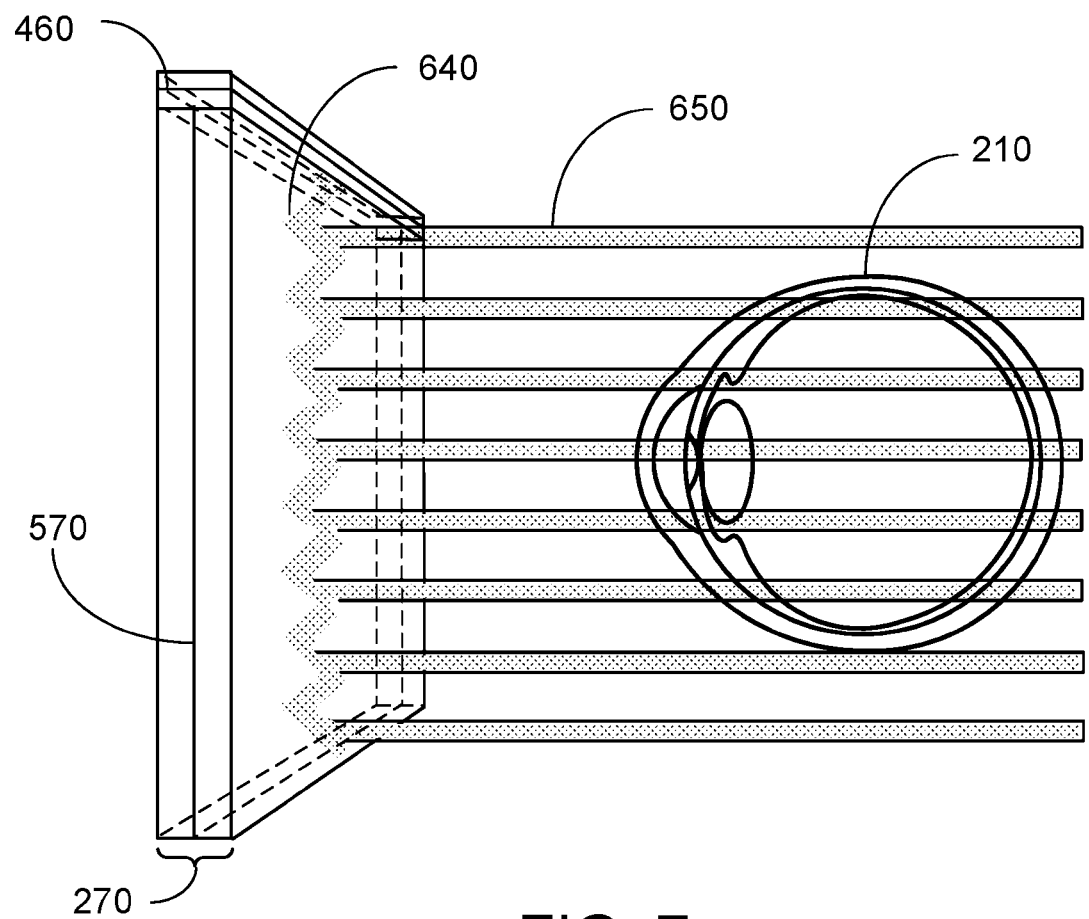
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the out-coupling optical element 570, e.g., a DOE, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
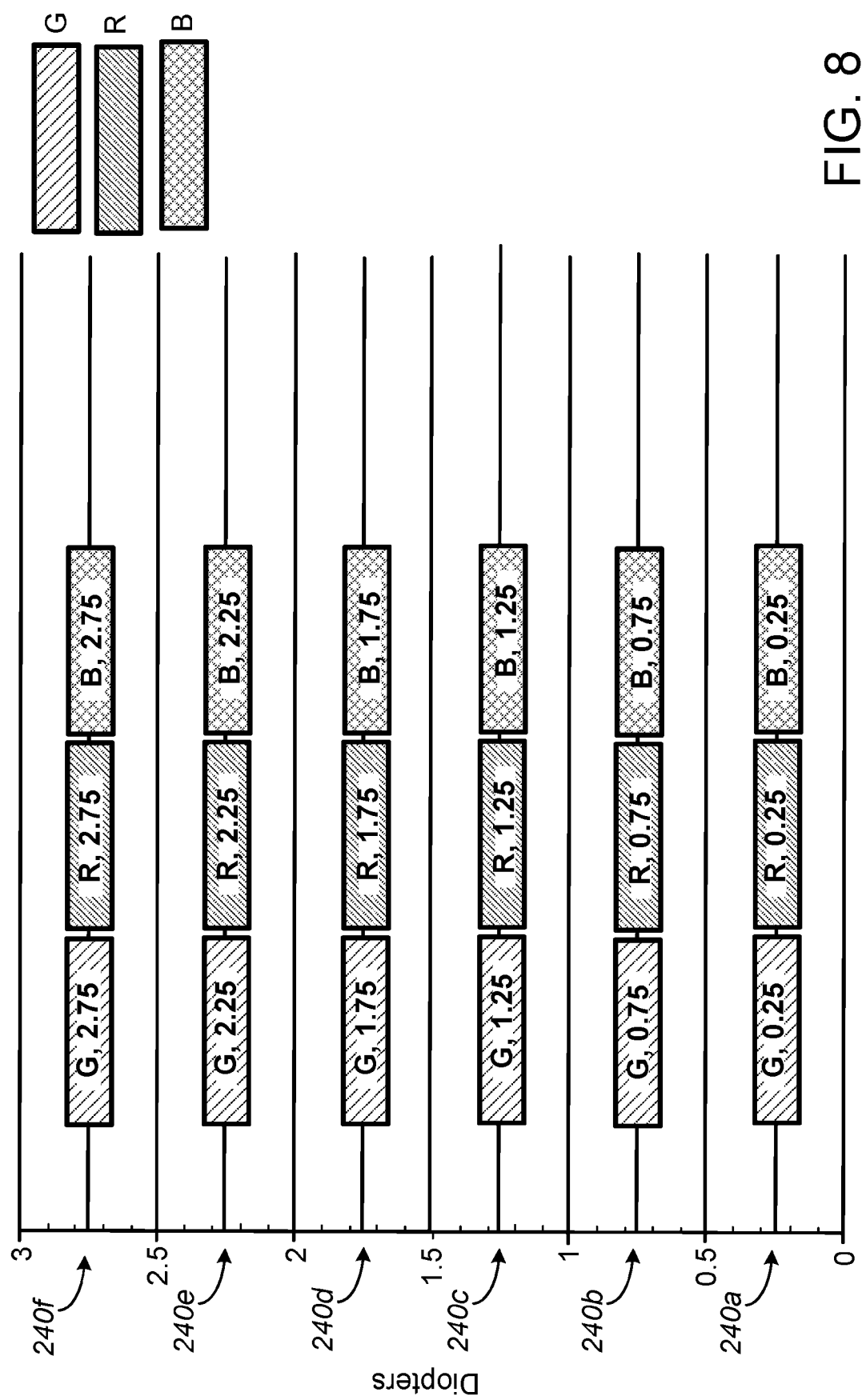
FIG. 8 illustrates an example of a stacked waveguide assembly in which each depth plane includes images formed using multiple different component colors.

In some implementations, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated implementation shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some implementations, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some implementations, light of each component color may be outputted by a single dedicated waveguide and, consequently, each depth plane may have multiple waveguides associated with it. In such implementations, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other implementations, multiple component colors may be outputted by the same waveguide, such that, e.g., only a single waveguide may be provided per depth plane.

With continued reference to FIG. 8, in some implementations, G is the color green, R is the color red, and B is the color blue. In some other implementations, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some implementations, the light module 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display system 250 may be configured to direct and emit this light out of the display towards the user's eye 210, e.g., for imaging and/or user stimulation applications.

Figure 9A:
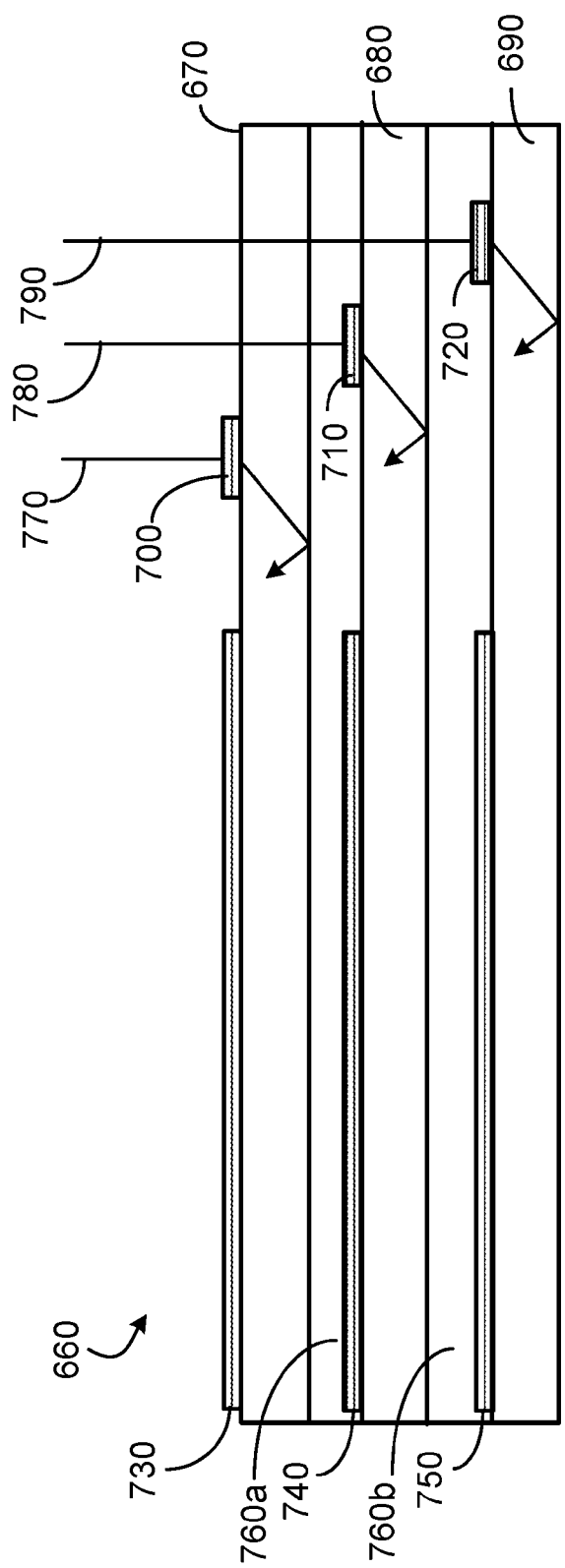
FIG. 9A illustrates a cross-sectional side view of an example of a set of stacked waveguides that each includes an incoupling optical element.

With reference now to FIG. 9A, in some implementations, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the set 660 of stacked waveguides may correspond to the waveguide assembly 260 (FIG. 6) and the illustrated waveguides of the set 660 of stacked waveguides may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some implementations, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some implementations, the in-coupling optical elements 700, 710, 720 may be disposed in the body of the respective waveguide 670, 680, 690. In some implementations, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some implementations.

As illustrated, the in-coupling optical elements 700, 710, 720 may be laterally offset from one another. In some implementations, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other implementations, the light distributing elements 730, 740, 750, may be disposed on a bottom major surface of associated waveguides 670, 680, 690, respectively. In some other implementations, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some implementations, the layers 760a and 760b are formed of low refractive index materials (that is, materials having a lower refractive index in a given direction than the material forming the immediately adjacent one of waveguides 670, 680, 690). For example, the refractive index in a given direction of the material forming the layers 760a, 760b is 0.05 or more, or 0.10 or less than the refractive index in the given direction of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some implementations, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some implementations, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some implementations, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some implementations, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect light rays 770, which has a first wavelength or range of wavelengths, while transmitting light rays 780 and 790, which have different second and third wavelengths or ranges of wavelengths, respectively. The transmitted light rays 780 impinge on and are deflected by the in-coupling optical element 710, which is configured to deflect light of a second wavelength or range of wavelengths. The light ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770,

780, 790 propagate through the respective waveguide 670, 680, 690 by TIR until impinging on the waveguide's corresponding light distributing elements 730, 740, 750.

Figure 9B:
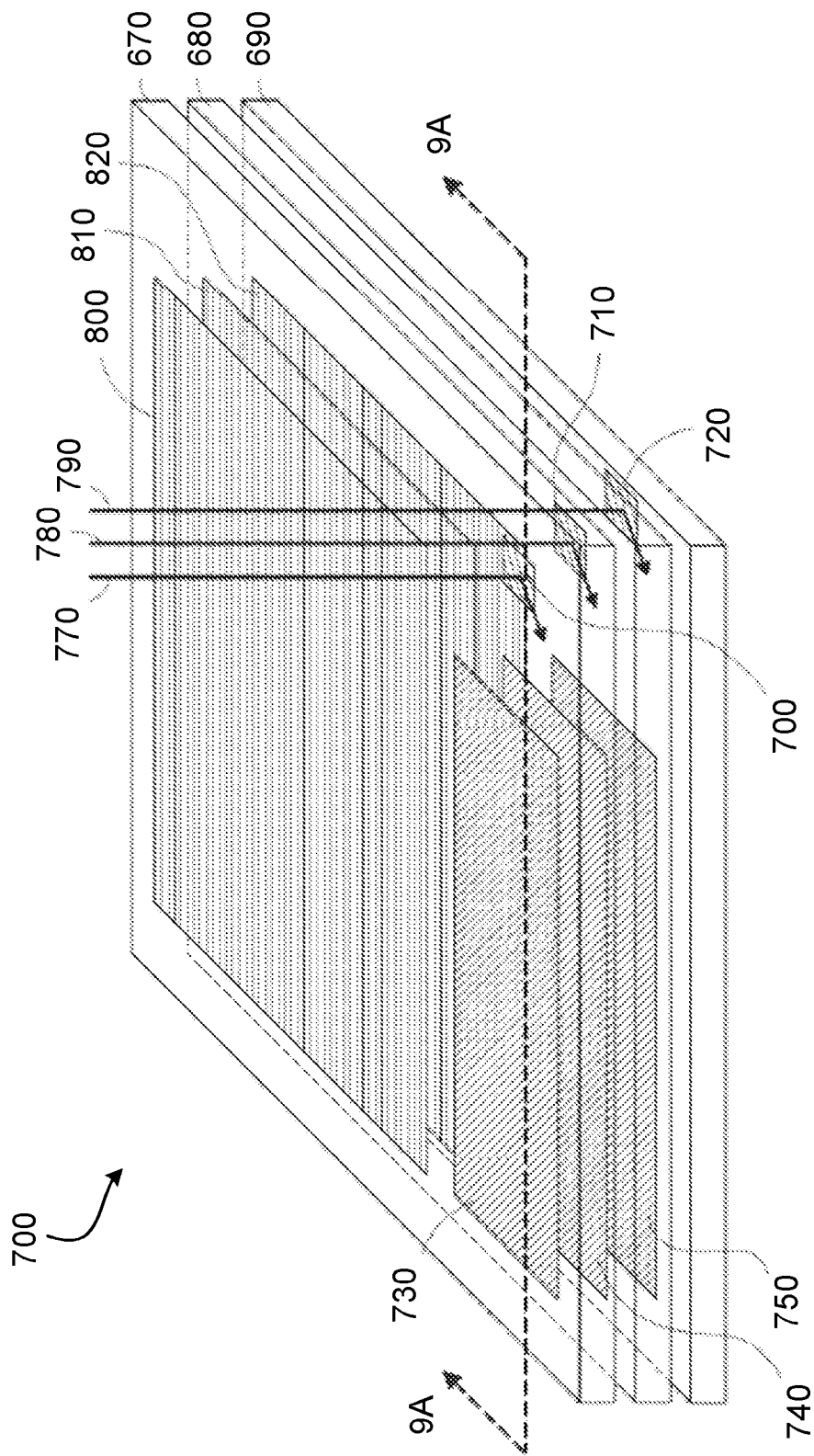
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some implementations, the light distributing elements 730, 740, 750 are orthogonal pupil expanders (OPE's). In some implementations, the OPE's deflect or distribute light to the out-coupling optical elements 800, 810, 820 and, in some implementations, may also increase the beam or spot size of this light as it propagates to the out-coupling optical elements. In some implementations, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some implementations, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some implementations, the OPE and/or EPE may be configured to modify a size of the beams of light.

Accordingly, with reference to FIGS. 9A and 9B, in some implementations, the set 660 of waveguides includes waveguides 670, 680, 690; in-coupling optical elements 700, 710, 720; light distributing elements (e.g., OPE's) 730, 740, 750; and out-coupling optical elements (e.g., EPEs) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPEs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EPEs) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPEs) 820 by TIR. The out-coupling optical element 820 then finally out-couples the light ray 790 to the viewer, who also receives the out-coupled light from the other waveguides 670, 680.

Figure 9C:
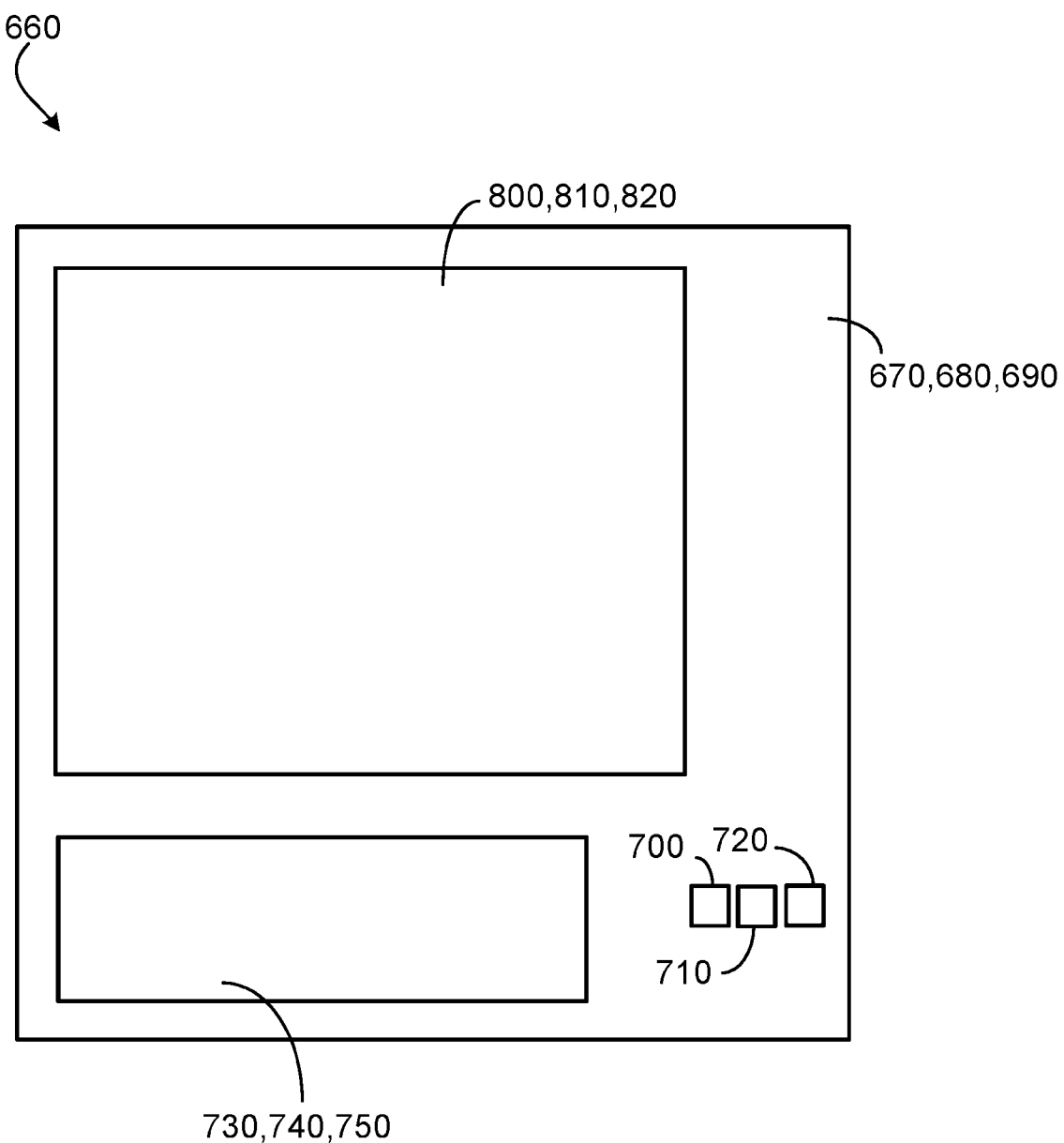
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some implementations, arrangements including nonoverlapping spatially-separated in-coupling optical elements may be referred to as a shifted pupil system, and the in-coupling optical elements within these arrangements may correspond to sub pupils.

Alternatively, in certain implementations, two or more of the in-coupling optical elements can be in an inline arrangement, in which they are vertically aligned. In such arrangements, light for waveguides further from the projection system is transmitted through the in-coupling optical elements for waveguides closer to the projection system, preferably with minimal scattering or diffraction.

Inline configurations can advantageously reduce the size of and simplify the projector. Moreover, it can increase the field of view of the eyepiece, e.g., by coupling of same color to several waveguides by making use of crosstalk. For example, green light can be coupled into blue and red active layers. Because of the pitch of each ICG can be different to provide improved (e.g., optimal) performance for a specific color, the allowed field of view can be increased.

In inline configurations, except for the last layer in the optical path, the ICGs should be either at most partially reflective or otherwise transmissive to light having operative wavelengths of subsequent layers in the waveguide stack. In either case, the efficiency can be undesirably low unless the gratings are etched in a high-index layer (e.g., 1.8 or more for polymer-based layers), or a high-index coating is deposited or growth on the grating. However, this approach can increase the back reflection into the projector lens, which thus can generate image artifacts such as image ghosting.

Figure 9D:
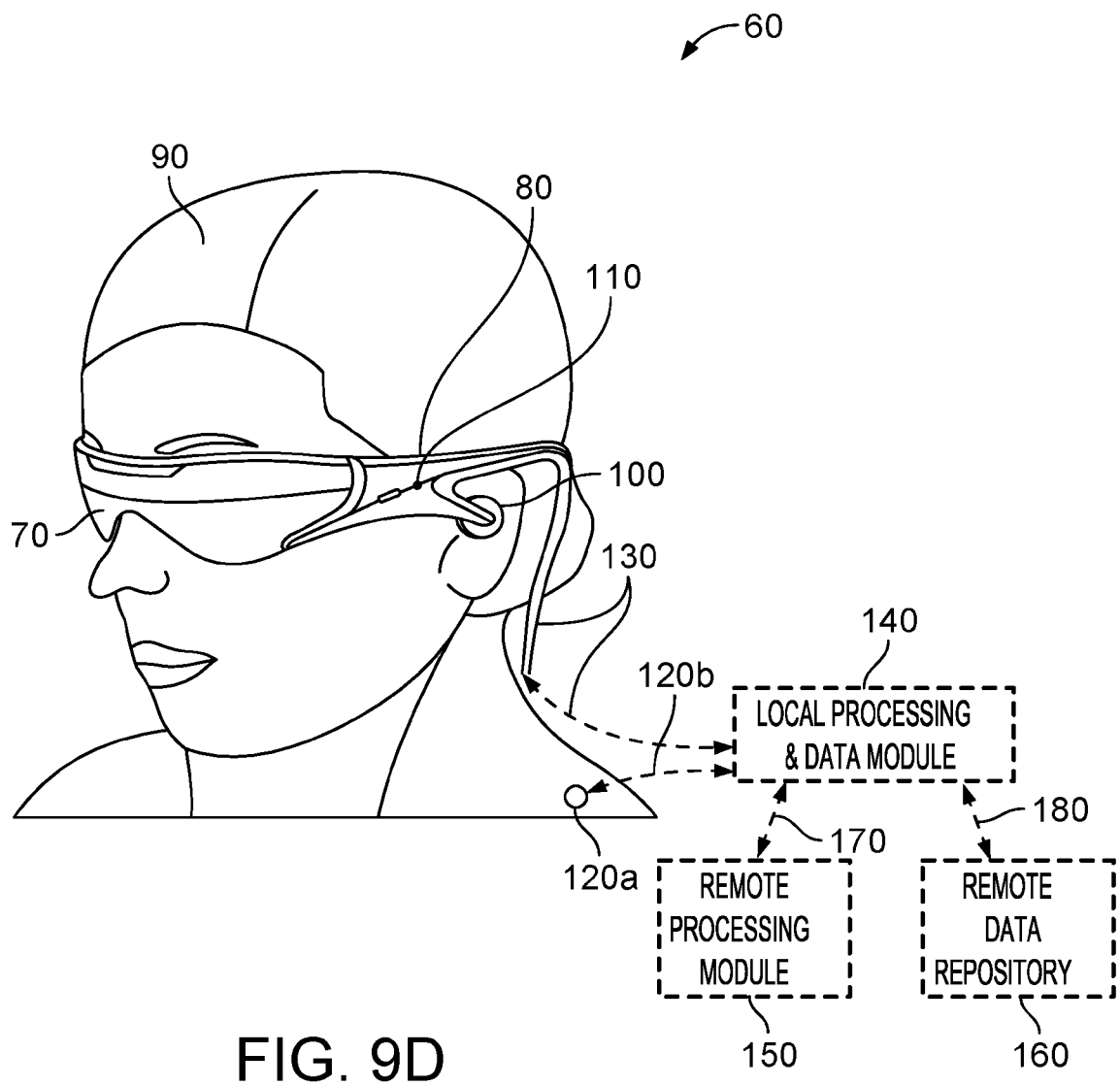
FIG. 9D illustrates an example of wearable display system.

FIG. 9D illustrates an example of wearable display system 60 into which the various waveguides and related systems disclosed herein may be integrated. In some implementations, the display system 60 is the display system 250 of FIG. 6, with FIG. 6 schematically showing some parts of that display system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or user 90 and which is configured to position the display 70 in front of the eyes of the user 90. The display 70 may be considered eyewear in some implementations. In some implementations, a speaker 100 is coupled to the frame 80 and configured to be positioned adjacent the ear canal of the user 90 (in some implementations, another speaker, not shown, may optionally be positioned adjacent the other ear canal of the user to provide stereo/shapeable sound control). The display system 60 may also include one or more microphones 110 or other devices to detect sound. In some implementations, the microphone is configured to allow the user to provide inputs or commands to the display system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some implementations, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some implementations. For example, the sensor 120a may be an electrode.

With continued reference to FIG. 9D, the display 70 is operatively coupled by communications link 130, such as by a wired lead or wireless connectivity, to a local processing and data module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processing and data module 140. The local processing and data module 140 may include a hardware processor, as well as digital memory, such as non-volatile memory (e.g., flash memory or hard disk drives), both of which may be utilized to assist in the processing, caching, and storage of data. Optionally, the local processing and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that the remote processing module 150 and remote data repository 160 are operatively coupled to each other and available as resources to the local processing and data module 140. In some implementations, the local processing and data module 140 may include one or more of the image capture devices, microphones, inertial measurement units, accelerometers, compasses, GPS units, radio devices, and/or gyros. In some other implementations, one or more of these sensors may be attached to the frame 80, or may be standalone structures that communicate with the local processing and data module 140 by wired or wireless communication pathways.

With continued reference to FIG. 9D, in some implementations, the remote processing module 150 may include one or more processors configured to analyze and process data and/or image information, for instance including one or more central processing units (CPUs), graphics processing units (GPUs), dedicated processing hardware, and so on. In some implementations, the remote data repository 160 may include a digital data storage facility, which may be available through the internet or other networking configuration in a "cloud" resource configuration. In some implementations, the remote data repository 160 may include one or more remote servers, which provide information, e.g., information for generating augmented reality content, to the local processing and data module 140 and/or the remote processing module 150. In some implementations, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, local processing and data module 140, remote processing module 150, and remote data repository 160, for instance via wireless or wired connections.

Diffraction Gratings Having Reduced Polarization Sensitivity

Providing a high-quality immersive experience to a user of waveguide-based display systems such as various display systems configured for virtual/augmented/mixed display applications described supra, depends on, among other things, various characteristics of the light coupling into and/or out of the waveguides in the eyepiece of the display systems. For example, a virtual/augmented/mixed display having high light incoupling and outcoupling efficiencies can enhance the viewing experience by increasing brightness of the light directed to the user's eye. As discussed above, in-coupling optical elements such as in-coupling diffraction gratings may be employed to couple light into the waveguides to be guided therein by total internal reflection. Similarly, out-coupling optical elements such as out-coupling diffraction gratings may be employed to couple light guided within the waveguides by total internal reflection out of the waveguides.

As described supra, e.g., in reference to FIGS. 6 and 7, display systems according to various implementations described herein may include optical elements, e.g., in-coupling optical elements, out-coupling optical elements, light distributing elements, and/or combined pupil expander-extractors (CPEs) that may include diffraction gratings. As disclosed herein, a CPE may operate both as a light distributing element spreading or distributing light within the waveguide, possibly increasing beam size and/or the eye box, as well as an out-coupling optical element coupling light out of the waveguide.

For example, as described above in reference to FIG. 7, light 640 that is injected into the waveguide 270 at the input surface 460 of the waveguide 270 propagates and is guided within the waveguide 270 by total internal reflection (TIR). In various implementation, at points where the light 640 impinges on the out-coupling optical element 570, a portion of the light guided within the waveguide may exit the waveguide as an exit beam 650, e.g., beamlets. In some implementations, any of the optical elements 570, 580, 590, 600, 610, which may include one or more of an incoupling optical element, an outcoupling optical element, a light distribution element or a CPE, can be configured as a diffraction grating.

To achieve desirable characteristics of in-coupling of light into (or out-coupling of light from) the waveguides 270, 280, 290, 300, 310, the optical elements 570, 580, 590, 600, 610 configured as diffraction gratings can be formed of a suitable material and have a suitable structure for controlling various optical properties, including diffraction properties such as diffraction efficiency as a function of polarization. Possible desirable diffraction properties may include, among other properties, any one or more of the following: spectral selectivity, angular selectivity, polarization selectivity (or non-selectivity), high spectral bandwidth, high diffraction efficiencies or a wide field of view (FOV).

Some diffraction gratings have strong polarization dependence and thus may have relatively diminished overall efficiency (due to the rejection of one polarization). Such diffraction gratings may also create coherent artifacts and reduce the uniformity of a far field image. To provide diffraction gratings that have reduced polarization sensitivity (e.g., that couple light with an efficiency that is relatively independent of polarization), some displays for AR systems according to implementation described herein include a waveguide with blazed diffraction gratings formed therein. The blazed grating may, for example, include diffractive features having a "saw tooth" shape. In some implementations, a blazed grating may achieve enhanced grating diffraction efficiency for a given diffraction order, while the diffraction efficiency for the other orders is reduced or minimized. As a result, more light may be directed into the particular given diffractive order as opposed to any of the other orders in some implementations.

Optical Artifacts Management

Figure 10:
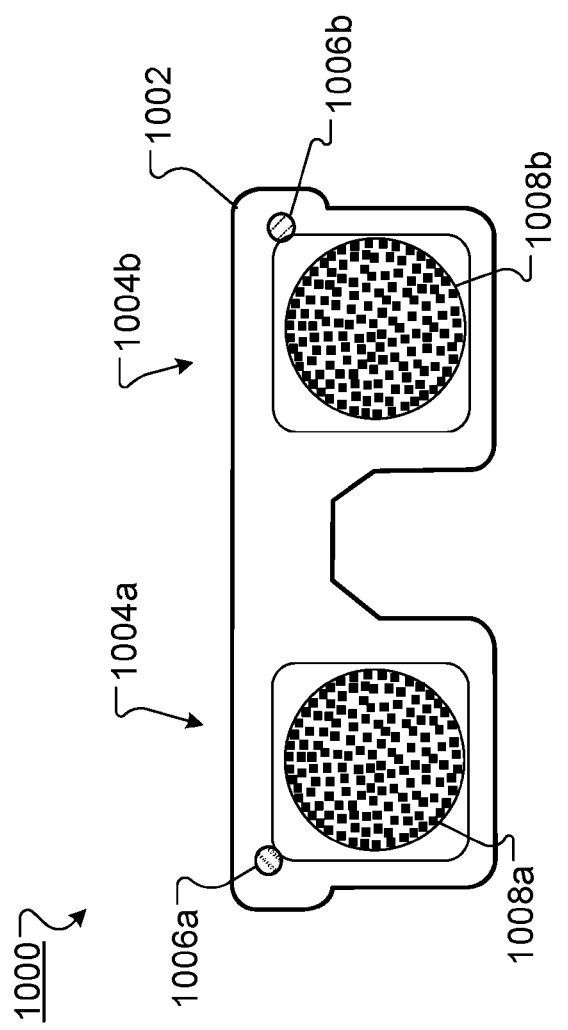
FIG. 10 depicts a headset with a frame supporting right and left eyepieces.

With reference to FIG. 10, a headset 1000 includes a frame 1002 and eyepieces 1004a and 1004b disposed within the frame 1002. The frame 1002 can be similar to frame 80 of FIG. 9D, and eyepieces 1004a and 1004b can correspond to set 660 of stacked waveguides in FIG. 9A or waveguide assembly 260 of FIG. 6. The frame 1002 supports, e.g., holds in place, the eyepieces 1004a and 1004b.

The eyepieces 1004a and 1004b respectively include waveguide substrates 1010a and 1010b with in-coupling elements 1006a and 1006b and out-coupling elements 1008a and 1008b, respectively, on surfaces of the substrates 1010a and 1010b. The substrates 1010a and 1010b are composed of a crystalline material with a relatively high-index of refraction (e.g., 2.0 or more, 2.1 or more, 2.2 or more, 2.3 or more, 2.4 or more, 2.5 or more, 2.6 or more). The crystalline material can be transparent, e.g., transmit at least 70%, 80%, or 90% of visible wavelengths of light. Examples of such crystalline materials include lithium niobate (LNO or LiNbO$_3$), lithium tantalate (LiTaO$_3$) and silicon carbide (SiC). The crystalline material can be a birefringent material.

In general, wafers formed from crystalline materials such as lithium niobate, lithium tantalate, and silicon carbide can have different crystallographic orientations depending on how the crystal is grown and the wafer is cut from the crystal. For example, crystalline wafers can be X-cut, Y-cut, or Z-cut wafers. The coordinate system, e.g., X-, Y-, Z-axes (or a-, b-, and c-of the crystal are determined according to the symmetry group of the crystal Hermann-Maugin notation. The cut refers to the orientation of the wafer surfaces with respect to the crystalline axes. For example, in a Z-cut wafer, the polar Z-axis is oriented perpendicular to the wafer surface.

As will be explained with more detail in reference to FIGS. 16A-H, in this example, each of substrates 1010a and 1010b come from different wafers and are selected as left and right sides of headset 1000 to mitigate left- and right-side image rivalry for a user. Each of substrate 1010a and 1010b can be cut along a particular orientation and have a particular clocking position to mitigate optical artifacts. The orientation, e.g., X-, Y-, or Z-cut, defines the orientation of the surface normal of the substrate relative to the optic axis. For example, in LNO, being Z-cut means that the surface normal of the cut crystal is parallel to the Z-axis, e.g., the optic axis in LNO. Being X- or Y-cut means that the surface normal of the crystal is perpendicular to the optic axis. In this example, eyepieces 1004a and 1004b are X-cut, e.g., the out-of-the-page direction is along the X axis.

The surface charge and piezoelectric properties of the crystal vary with the cut, as the surface terminations of bonds depend on the cut. For example, X-cut LNO tends to not exhibit piezoelectric properties due to a mirrored charge displacement along the x-axis. The surface of X-cut LNO being nonpolar can be beneficial in wet chemistry processing, such as wet chemistry cleaning, resin dispensing, and fluid filling between the template (superstrate) and substrate prior to patterning.

Y-cut and Z-cut LNO, however, exhibit surface charge and piezoelectric properties. For example, Z-cut LNO has both positive surface charge due to —Nb—O$_3$—Li$_2$ terminations and negative surface charge due to O—Li terminations. In general, more —O terminations lead to more positive surface charge, and more-Li terminations lead to more negative surface charge.

Surface charge distributions on substrates can be detrimental during manufacturing and in use. For example, due to Z-cut LNO being polar, the surface of Z-cut LNO can undergo undesirable reactions during wet chemistry cleaning and wetting, e.g., adhere to cleaning agents, imprints, and resins.

Figure 11B:
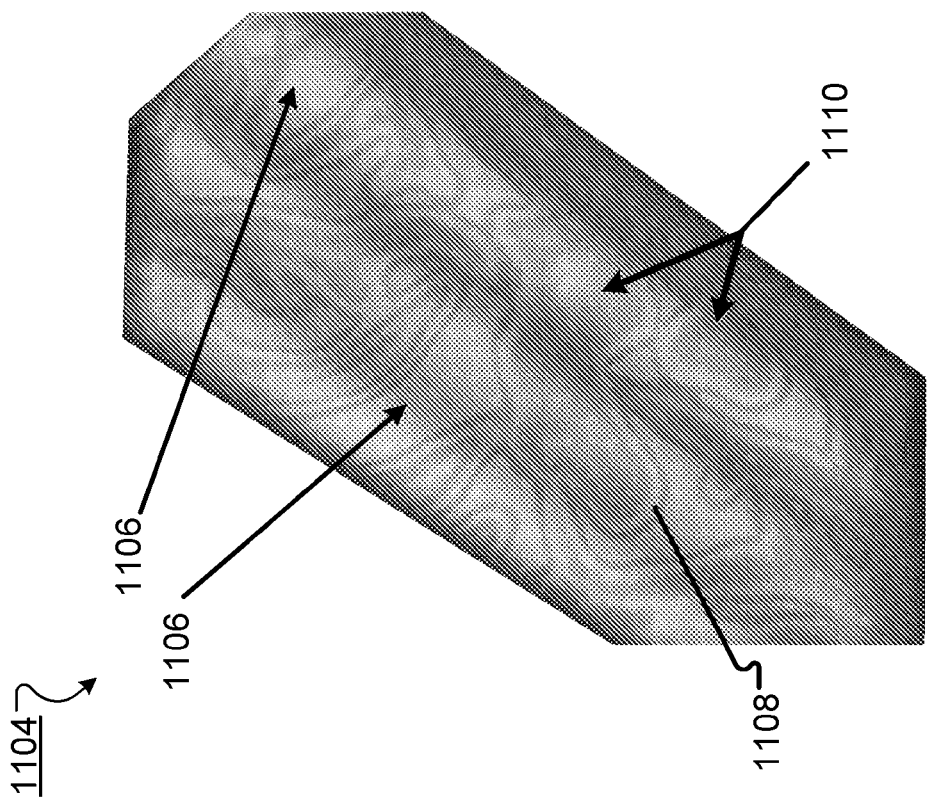
FIG. 11B depicts a nonuniform coating on a surface of the substrate.
Figure 11A:
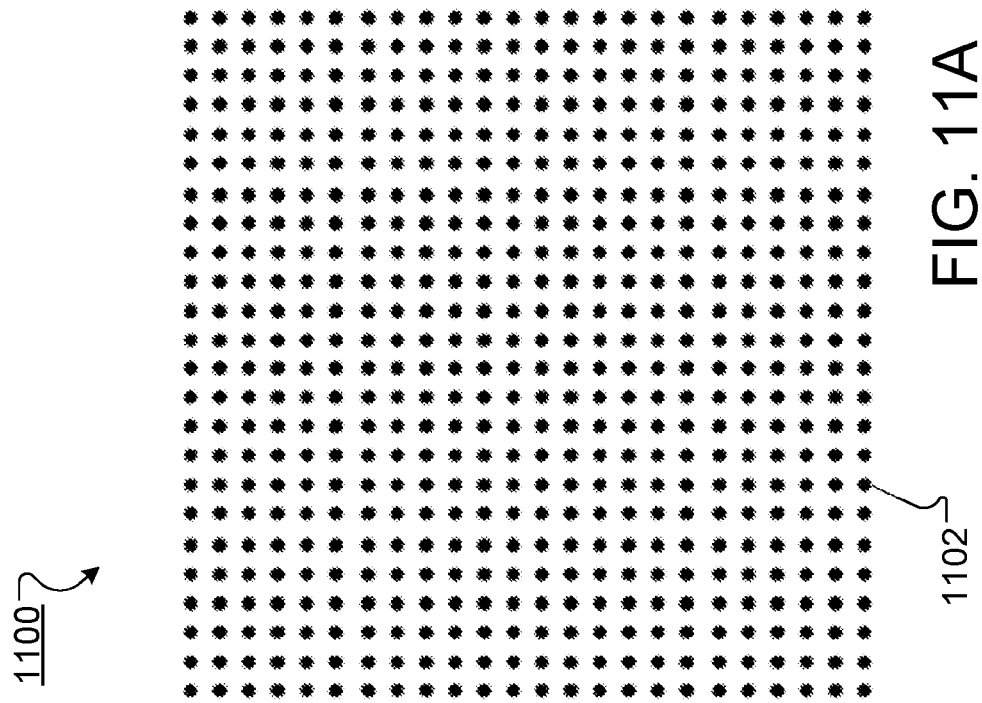
FIG. 11A depicts a pattern of dots dispensed onto a substrate.
Figure 12A:
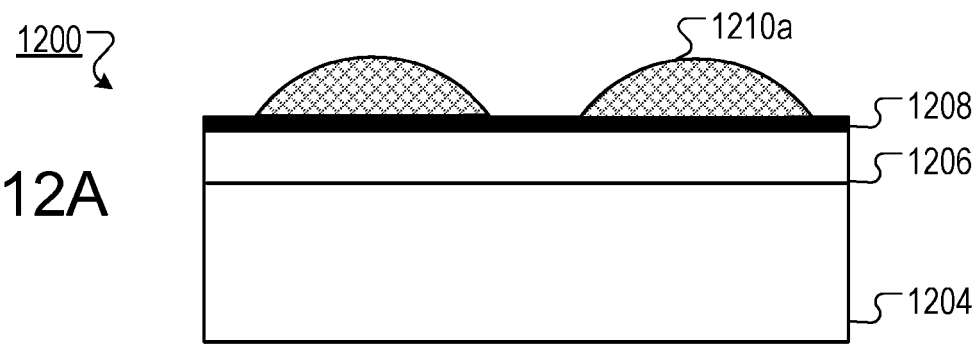
FIGS. 12A, 12B, 12C, and 12D depict schematics for a process of depositing a dielectric coating.
Figure 12B:
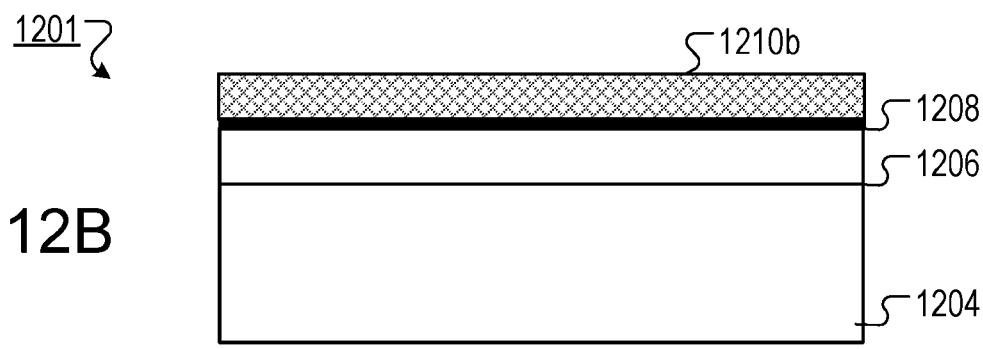
Figure 12C:
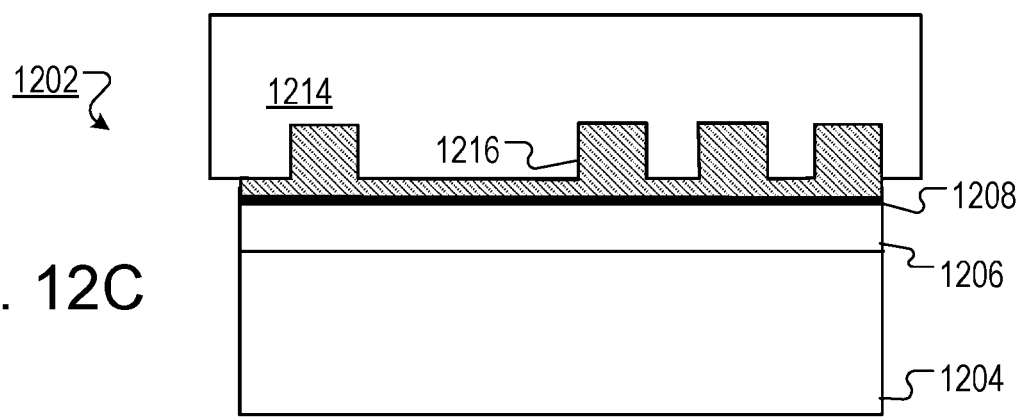
Figure 12D:
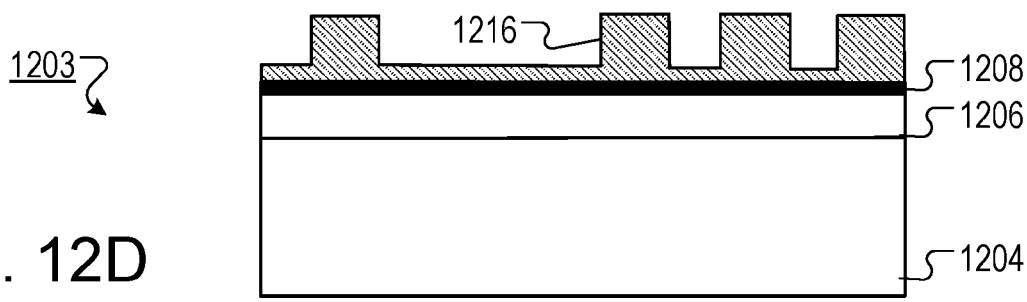

As an example, FIGS. 11A and 11B depict how a polymer resist solution distributes nonuniformly on a 41°-X-cut wafer, e.g., the angle between the plane of the surface relief gratings (surface on which diffractive structures of the in-coupling and out-coupling elements are patterned) with respect to the X-axis. surface normal and the optic axis is 41°. FIG. 11A depicts the uniform pattern 1100 of dispensed drops 1102 on the LNO surface, and FIG. d depicts the nonuniform coating 1104 on the surface after the drops 1102 had spread. For example, the lighter regions 1106 have a thinner coating than the darker regions 1108, and drops have premerged in regions 1110. Later steps in the manufacturing and processing of the substrate can be difficult as a result of the nonuniform volume distribution.

Dielectric coatings can mitigate negative effects originating from surface charge. With reference to FIGS. 12A-D, in first stages 1200 and 1201, a substrate 1204 is prepared for patterning. A dielectric coating 1206, such as TiO$_2$, is disposed on substrate 1204, e.g., LNO. The dielectric coating, especially a high-index coating with an index greater than 2.2, can prevent spurious effects on Y-cut and Z-cut LNO during resin dispense and filling in nano imprint lithography. Additionally or alternatively, a coating of a dielectric with a lower index of refraction, e.g., $SiO_2$, can be disposed prior to the high-index coating, e.g., on the LNO surface, to prevent surface charge buildup. Prepolymer imprint resin can either be disposed in drops 1210a or as a spin coating 12010b on layer 1208.

Layer 1208 promotes adhesion between the pre-polymer material post patterning, e.g., template and mold demolding, and curing over a desired surface or substrate. In some implementations, layer 1208 includes crosslinking silane coupling agents. These agents include an organofunctional group at one end and hydrolysable group at the other and form durable bonds with different types of organic and inorganic materials. For example, acryloyl can crosslink into a patternable polymer material to form a desired optical pattern/shape. In some implementations, the template or molds can be coated with a similar coating where the acryloyl end is replaced with a fluorinated chain, which can reduce the surface energy, e.g., act as a release site. Vapor deposition can occur at low pressures where the coupling agent is delivered in vapor form with or without the use of an inert gas, such as $N_2$ with activated —O and/or —OH groups present on the surface of material to be coated. The vapor coating process can deposit monolayer films.

Following either stage 1201 or 1202, in second stage 1202, the pre-polymer imprint resin can be stamped with template 1214, thereby forming pattern 1216. In stage 1203, the template 1214 is removed. In some implementations, dielectric coatings are on either one of or both surfaces of LNO.

Figure 13:
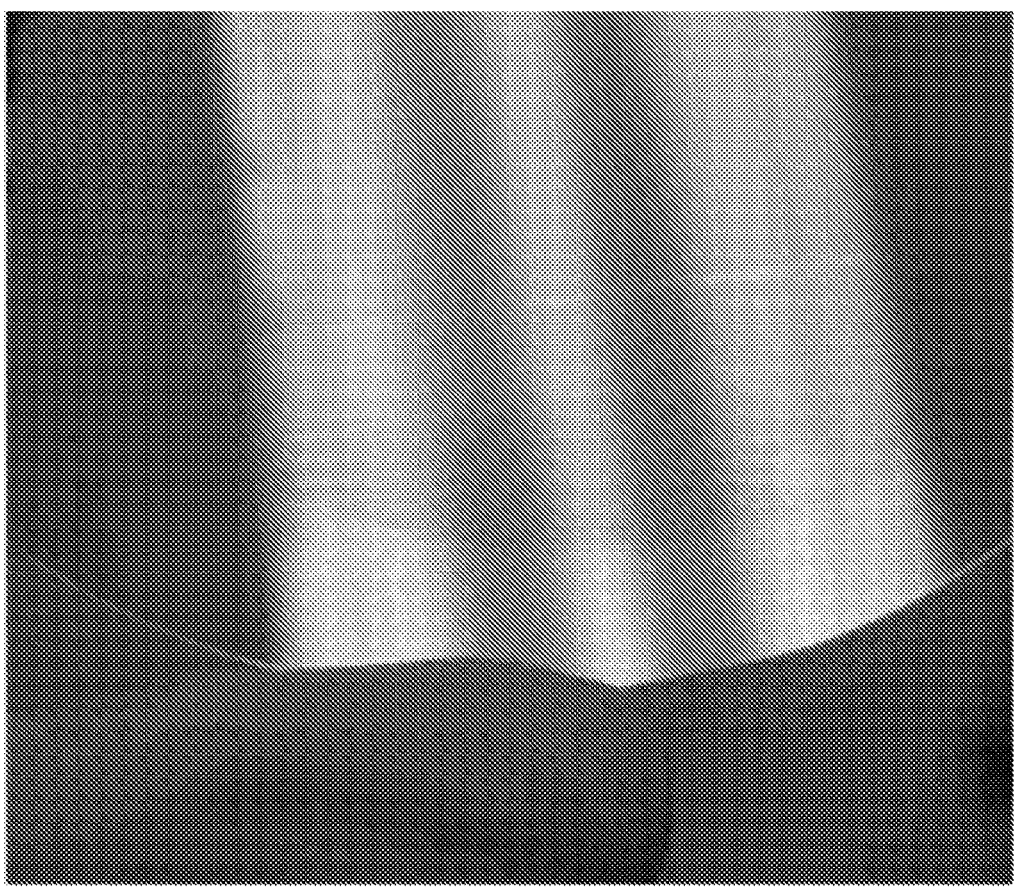
FIGS. 13, 14A, 14B, 14C, and 14D depict surfaces of substrates with dielectric coatings.
Figure 14B:
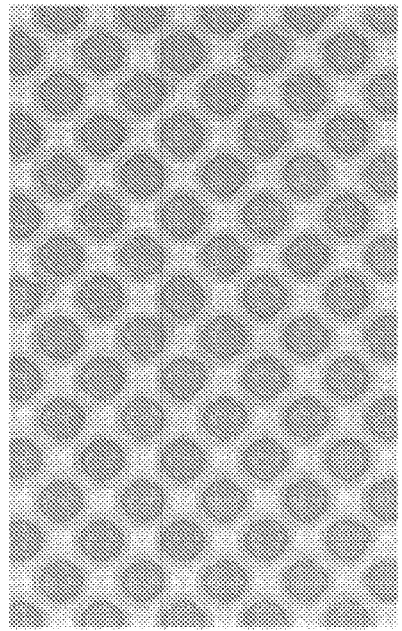
Figure 14D:
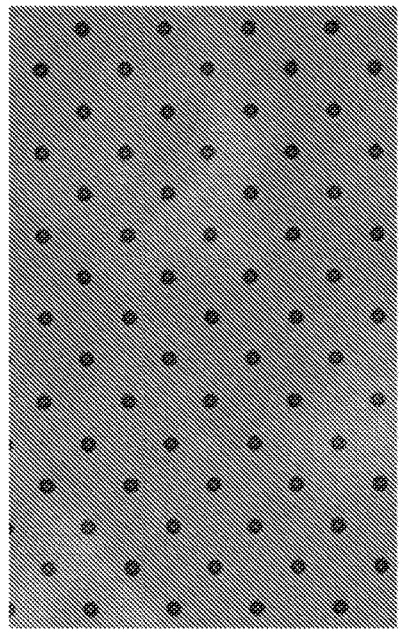
Figure 14A:
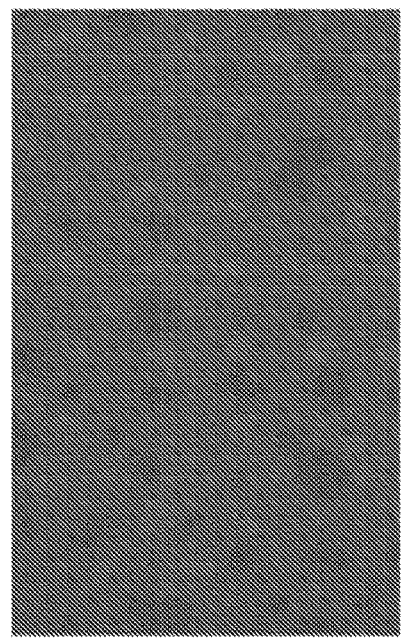
Figure 14C:
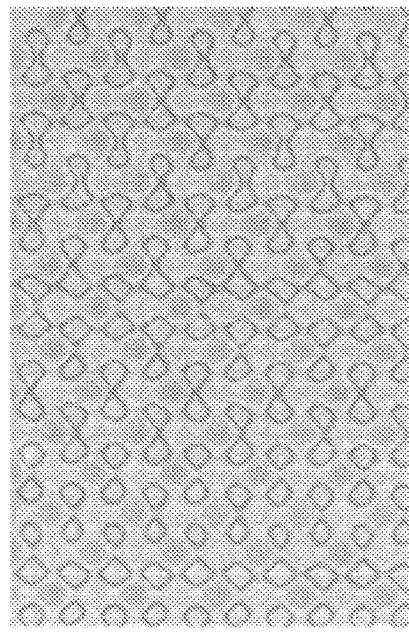

In some implementations, dielectric coatings can also be applied to X-cut or any angularly cut wafer to improve total internal reflection of light with longer wavelengths, e.g., greater than 635 nm. For example, FIG. 13 depicts 41°-X-cut LNO imprinted with a $TiO_2$ coating. Compared to FIG. 11B, the coating is more uniform, thereby preventing issues related to the spread profile, e.g., variations in residual layer thickness. As additional examples, FIGS. 14A-D depict prepolymer resin inkjet dispensed over LNO for two types of resins and two types of cuts. FIG. 14A depicts a surface 1400a with a first resin over Y-cut LNO, FIG. 14B depicts a surface 1400b with the first resin over Z-cut LNO, FIG. 14C depicts a surface 1400c with a second resin over Z-cut LNO, and FIG. 14D depict a surface 1400d with the second resin over Y-cut LNO. In general, all of surfaces 1400a-d exhibit more uniformity than FIG. 11B, which lacks a dielectric coating.

Although the examples so far have focused on lithium niobate substrates, the present disclosure generally applies to substrates composed of crystalline materials with high indices of refraction, optical anisotropy, or both, such as silicon carbide (SiC), e.g., n=2.65, and $LiTaO_3$. For example, FIGS. 15A and 15B depict fields of view (FOVs) 1500a and 1500b for $LiTaO_3$ and $LiNbO_3$, respectively. Given the high indices of refraction of $LiTaO_3$ and $LiNbO_3$, the FOVs are relatively large, e.g., greater than 50°. FOVs 1500a and 1500b were generated using red light, e.g., 635 nm. In some implementations, using different materials for each of the red, green, and blue eyepieces can be beneficial, since different crystals have different absorption profiles.

With reference to FIGS. 16A-D, in-coupling elements 1644 and 1611 and out-coupling elements 1634 and 1601 are associated with respective eyepieces. The cut, e.g., the crystallographic axes relative to the surface of the substrate, the clocking position, or both, of the eyepieces for the left and right side of the frame are selected to reduce the appearance of optical artifacts. In LNO, the X- and Y-axes are optically equivalent, and X- and Y-cut substrates tend to produce optical artifacts parallel to the Z-axes.

For example, an X- or Y-cut substrate supporting in-coupling element 1644 and out-coupling element 1634 produces optical artifact 1600a, and an X- or Y-cut substrate supporting in-coupling element 1611 and out-coupling element 1601 produces optical artifact 1600b. Choosing a pair of in-coupling and out-coupling elements on an X- or Y-cut wafer for each of the left and right side of the frame based on the clocking position and orientation of the coupling elements relative to the optic axis can cause the optical artifacts to align.

As another example, Z-cut substrates tend to produce bullseye, e.g., annular or circular, optical artifacts. Shapes with circular symmetry do not vary when rotated, e.g., optical artifacts 1600c and 1600d appear the same when rotated about the Z-axis. Accordingly, the clocking position of the in-coupling and out-coupling elements on Z-cut substrates do not have to satisfy the same design rules as those for X- or Y-cut substrates to align optical artifacts.

Optical artifacts crisscrossing rather than each other being parallel to each other can result in virtual image rivalry for a user. For example, when the headset 1000 displays images to a user, if the optical artifacts are similar, the optical artifacts can be less noticeable. However, if the optical artifacts intersect, e.g., are noticeably different for each eye, a user can experience confusion. For example, some users can prefer overlapping spatial uniformity variations rather than non-overlapping spatial uniformity variations. Therefore, selecting pairs of eyepieces, e.g., substrates supporting optical components, that align optical artifacts can result in an enhanced visual experience for a user.

With reference to FIGS. 16E-H, each of optical artifacts 1600a and 1600b correspond to a pair of in-coupling elements and out-coupling elements from two wafers that are patterned differently, e.g., the direction of the gratings in the eyepiece differs relative to the crystallographic axes 1691a and 1691b of each wafer. For example, wafer 1600e is X-cut with the optic axis along a first lateral direction, e.g., the Z-axis is parallel to the vertical direction 1607a. Wafer 1600g is X-cut with the optic axis along a second lateral direction, e.g., the Z-axis is parallel to the horizontal direction 1607b. In other words, the crystallographic axes of the wafers 1600e and 1600g are different, though wafers 1600e and 1600g are composed of the same material.

Wafer 1600e includes six pairs of in-coupling elements 1611, 1612, 1613, 1614, 1615, and 1616 and out-coupling elements 1601, 1602, 1603, 1604, 1605, and 1606 in first through sixth clocking positions respectively. Wafer 1600g includes six pairs of in-coupling elements 1641, 1642, 1643, 1644, 1645, and 1646 and out-coupling elements 1631, 1632, 1633, 1634, 1635, and 1636 in first through sixth clocking positions respectively.

Wafers 1600e and 1600g are different in that, for wafer 1600e, the directions of light launching from the in-coupling elements 1614 and 1611 to out-coupling elements 1604 and 1601 are parallel to the optic axis, whereas none of the directions of light launching from in-coupling elements to out-coupling elements are parallel to the optic axis in wafer 1600g. Rather, the directions of light launching from the in-coupling elements 1644 and 1641 to out-coupling elements 1634 and 1631 are perpendicular to the optic axis. For X- and Y-cut wafers, optical artifacts tend to be parallel to the optic axis, so this difference between wafers 1600e and 1600g effects how the optical artifacts will appear for each pair of in-coupling and out-coupling elements.

For example, schematic 1600f illustrates how pairs of in-coupling and out-coupling elements correspond to optical artifacts when viewed from right and left sides. Based on the direction of the optic axis in wafer 1600e, in-coupling element 1611 and out-coupling element 1601 yield vertical optical artifact 1621, in-coupling element 1612 and out-coupling element 1602 yield positively sloped optical artifact 1622, in-coupling element 1613 and out-coupling element 1603 yield negatively sloped artifact 1623, in-coupling element 1614 and out-coupling element 1604 yield vertical optical artifact 1624, in-coupling element 1615 and out-coupling element 1605 yield positively sloped optical artifact 1625, and in-coupling element 1616 and out-coupling element 1606 yield negatively sloped optical artifact 1626.

Each pair of in-coupling and out-coupling elements can be on either the right or left side of the headset by being rotated by 45°, e.g., clockwise for the right side and counterclockwise for the left side. As a result, optical artifact 1621 can be either of right and left optical artifacts 1621a and 1621b, and so on for right and left optical artifacts 1622a, 1622b, 1623a, 1623b, 1624a, 1624b, 1625a, 1625b, 1626a, and 1626b. Similar analysis applies for schematic 1600h.

Based on the direction of the optic axis in wafer 1600g, in-coupling element 1641 and out-coupling element 1631 yield horizontal optical artifact 1651, in-coupling element 1642 and out-coupling element 1632 yield negatively sloped optical artifact 1652, in-coupling element 1643 and out-coupling element 1633 yield positively sloped optical artifact 1653, and so on for optical artifacts 1654, 1655, and 1656. Similarly, each of the in-coupling and out-coupling elements can be on either the right or left side of the headset by being rotated by 45°, yielding right and left optical artifacts 1651a, 1651b, 1652a, 1652b, 1653a, 1653b, 1654a, 1654b, 1655a, 1655b, 1656a, and 1656b.

When the optical artifacts produced by each of the right and left sides align, the optical artifacts are substantially parallel. With reference to schematic 1600f for wafer 1600e, if in-coupling element 1611 and out-coupling element 1601 in the first clocking position are chosen for the right side, none of the pairs of in-coupling and out-coupling elements will yield parallel optical artifacts, e.g., optical artifact 1621a is positively sloped, while none of the optical artifacts 1621b-1626b are positively sloped. The schematic 1600h for wafer 1600g, however, includes positively sloped optical artifacts 1651b and 1654b on the left side.

With reference to FIGS. 10, 16A, and 16B, using in-coupling element 1611 and out-coupling element 1601 on the right side and in-coupling element 1644 and out-coupling element 1634 on the left side produces parallel optical artifacts, e.g., optical artifacts 1600a and 1600b from FIGS. 16A and 16B match optical artifacts 1621a and 1654b from FIGS. 16F and 16H, respectively. Thus, pairs of in-coupling elements and out-coupling elements for each of the right and left sides of the headset can be selected to reduce right-left image rivalry.

In the example of FIGS. 16A and 16B, the pair of eyepieces formed with in-coupling and out-coupling elements 1644 and 1634 and in-coupling and out-coupling elements 1611 and 1601 can have either different or the same crystallographic axes 1671a and 1671b and still manage the optical artifacts 1600a and 1600b. For example, each of the crystallographic axes 1671a and 1671b can either have the X- or Y-axis being out of the page, as indicated the "Y,X" and "X,Y" labels. In this example, changing the crystallographic axes to switch whether X or Y points out the page involves rotating about the Z-axis (the optic axis), which won't change the optical properties in uniaxial crystals.

Various other pairs resulting in parallel optical artifacts on the right and left side can be made, e.g., optical artifact 1622a and 1655b. In some cases, such as when the optical artifacts are vertical or horizontal when in the rotated right and left configurations, both the right and left pairs of in-coupling and out-coupling elements can come from the same wafer, e.g., optical artifacts 1653a and 1655b.

In some implementations, optical artifacts for X- and Y-cut wafers are nonsymmetric along the Z-axis. For example, with reference to FIGS. 15A and 15B, the optical artifacts along the Z-axis fan outward along the Z-axis. Accordingly, even if optical artifacts are aligned, the shape, e.g., width, of the optical artifacts can be different. To avoid problems relating to the optical artifacts having different shapes along the Z-axis, right and left pairs of in-coupling and out-coupling elements can be selected to have opposite clocking positions, e.g., in-coupling and out-coupling elements from clocking position 1 being paired with in-coupling and out-coupling elements from clocking position 4, clocking position 2 being paired with in-coupling and out-coupling elements from clocking position 5, and clocking position 3 being paired with in-coupling and out-coupling elements from clocking position 6.

Although a wafer with six pairs of in-coupling and out-coupling elements, e.g., six clocking positions, is depicted in FIGS. 16A-H, other implementations are possible. For example, a wafer can include 2 to 20 eyepieces.

Figure 16I:
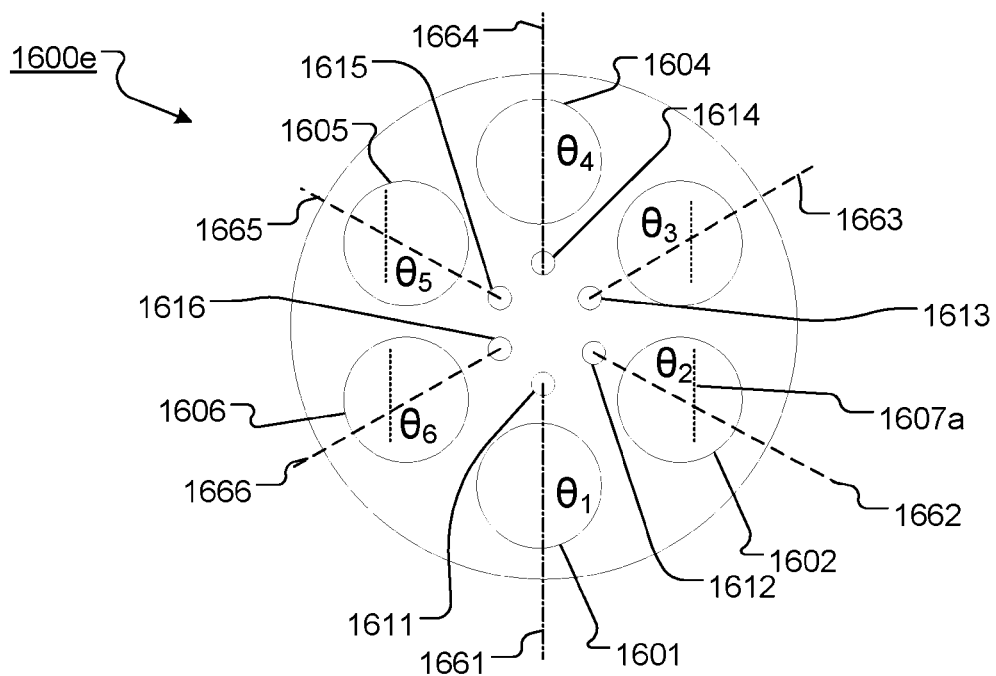
FIGS. 16I and 16J depict the wafers of FIGS. 16E and 16G, respectively, marked with angles between the with lines between the in-coupling and out-coupling elements and the optic axis of the material of the substrate in the wafers.
Figure 16J:
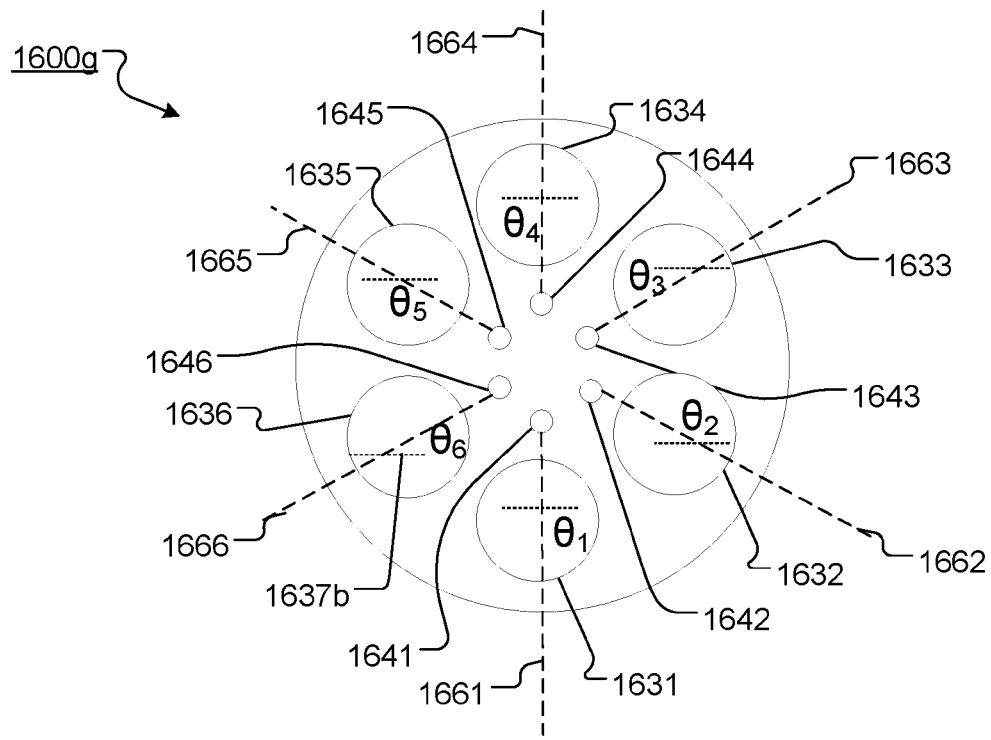

A design rule for selecting right and left eyepieces identifies a relationship between the angles between the optic axis of the substrate and the direction of light being launched from the in-coupling element to the out-coupling element for each eyepiece. With reference to FIGS. 16I and 16J, the angle between the optic axis and the direction of light varies for each clocking position in wafers 1600e and 1600g.

For example, wafer 1600e includes in-coupling elements and out-coupling elements as described in FIG. 16E, and wafer 1600g includes in-coupling elements and out-coupling elements as described in FIG. 16G. In wafer 1600e, the optic axis (parallel to vertical direction 1607a) is denoted by the various finely-dashed, vertical lines. In wafer 1600g, the optic axis (parallel to horizontal direction 1607b) is denoted by the various finely-dashed horizontal lines.

The direction of light being launched, e.g., the shortest line connecting the in-coupling element to the out-coupling element, for each pair of in-coupling elements and out-coupling elements is denoted by coarsely-dashed lines 1661, 1662, 1663, 1664, 1665, and 1666. In some implementations, the shortest line connecting the in-coupling element to the out-coupling element is perpendicular to a grating within either of the in-coupling and out-coupling elements. In the examples of FIGS. 16E and 16G, the symbol for each of the in-coupling elements 1611-1616 and 1641-1646 includes a line indicating the direction parallel to a grating within the in-coupling element. For example, the symbol for the in-coupling element 1641 includes a horizontal line, indicating that the grating is perpendicular to the horizontal line, and the direction of light launch, e.g., line 1664, is a vertical line.

The angle between the optic axis and the direction of light launch for each of the first through sixth clocking positions is denoted by $\theta_1$, $\theta_2$, $\theta_3$, $\theta_4$, $\theta_5$, and $\theta_6$, respectively.

In this example, in wafer 1600e, $\theta_1=0°$, $\theta_2=60°$, $\theta_3=120°$, $\theta_4=0°$, $\theta_5=60°$, and $\theta_6=120°$. In wafer 1600f, $\theta_1=90°$, $\theta_2=150°$, $\theta_3=30°$, $\theta_4=90°$, $\theta_5=150°$, and $\theta_6=30°$. As previously discussed, the in-coupling element 1611 and outcoupling element 1601 in the first clocking position can be paired with the in-coupling element 1644 and out-coupling element 1634 in the fourth clocking position as right and left sides, respectively. The difference between $\theta_1$ for wafer 1600e and $\theta_4$ for wafer 1600f is 90°, which leads to the optical artifacts 1621a and 1654b being aligned.

In general, right and left pairs can be selected by choosing pairs of angles $\theta$ that have a difference of about ±90°. In this example, the angular difference is 90° rather than 0° because each of the right and left eyepieces are rotated 45° in opposite directions, e.g., when disposed in frame 1002, each eyepieces tilted 45°, so the directions of light launch intersect at 90°. Pairs of eyepieces that are tilted at different angles, the angular difference will vary. The sign of the difference can impact whether the optical artifacts are symmetrical along the optic axis, as previously discussed. In this specification, when referring to numerical ranges, "about" indicates that an item has a value close to the numerical range, e.g., within 1%, 5%, or 10%.

The origins of the optical artifacts can vary as light travels through the eyepieces. In birefringent materials, the optical artifacts appear somewhat regularly spaced and aligned along the direction of the optic axis or axes. When the substrate is optically anisotropic, e.g., uniaxially or biaxially birefringent, the index of refraction depends on the polarization of the light and the direction of the light relative to the optic axis (or two optical axes in the case of biaxial materials). As a result, the optical artifacts exhibit patterns caused by the indices of refraction varying along different directions, since light corresponding to different points in a FOV can experience different refractive indices, e.g., reflect a different number of times in the substrate.

In uniaxial materials, there are two indices of refraction, e.g., the ordinary and extraordinary indices $n_o$ and $n_i$, governing the propagation of light, which can be represented by an index ellipsoid. In biaxial materials, there are three indices of refraction governing the propagation of light, e.g., $n_\alpha$, $n_\beta$, and $n_\gamma$, which can be represented by an index spheroid. A cross-section of either the index ellipsoid or spheroid is an ellipse whose major and minor semi axes have lengths equal to the two refractive indices for a wavefront propagating perpendicular to the cross-section.

Uniaxial crystals have tetragonal or hexagonal symmetry, and biaxial crystals have orthorhombic, monoclinic, or triclinic symmetry. For example, SiC and LiNbO$_3$ are both hexagonal crystals and thus uniaxial, and LiTaO$_3$ is orthorhombic and thus biaxial. In uniaxial crystals, the optic axis is defined as the c-axis using Hermann-Maugin convention. In biaxial crystals, the relationship between the optic axes and the a, b, and c axes varies. For example, for orthorhombic LiTaO$_3$, the optic axes can be parallel to any of the three a-, b-, or c-axes. The optic axes are in the plane defined by the directions where light experiences the greatest and least refractive indices, $n_\alpha$ and $n_\gamma$. In biaxial crystals, optical artifacts appear along both optic axes. For example, optical artifacts appear along both the Z- and X/Y-axes in FIG. 15A, depicting the FOV for biaxial LiTaO$_3$.

Figure 17:
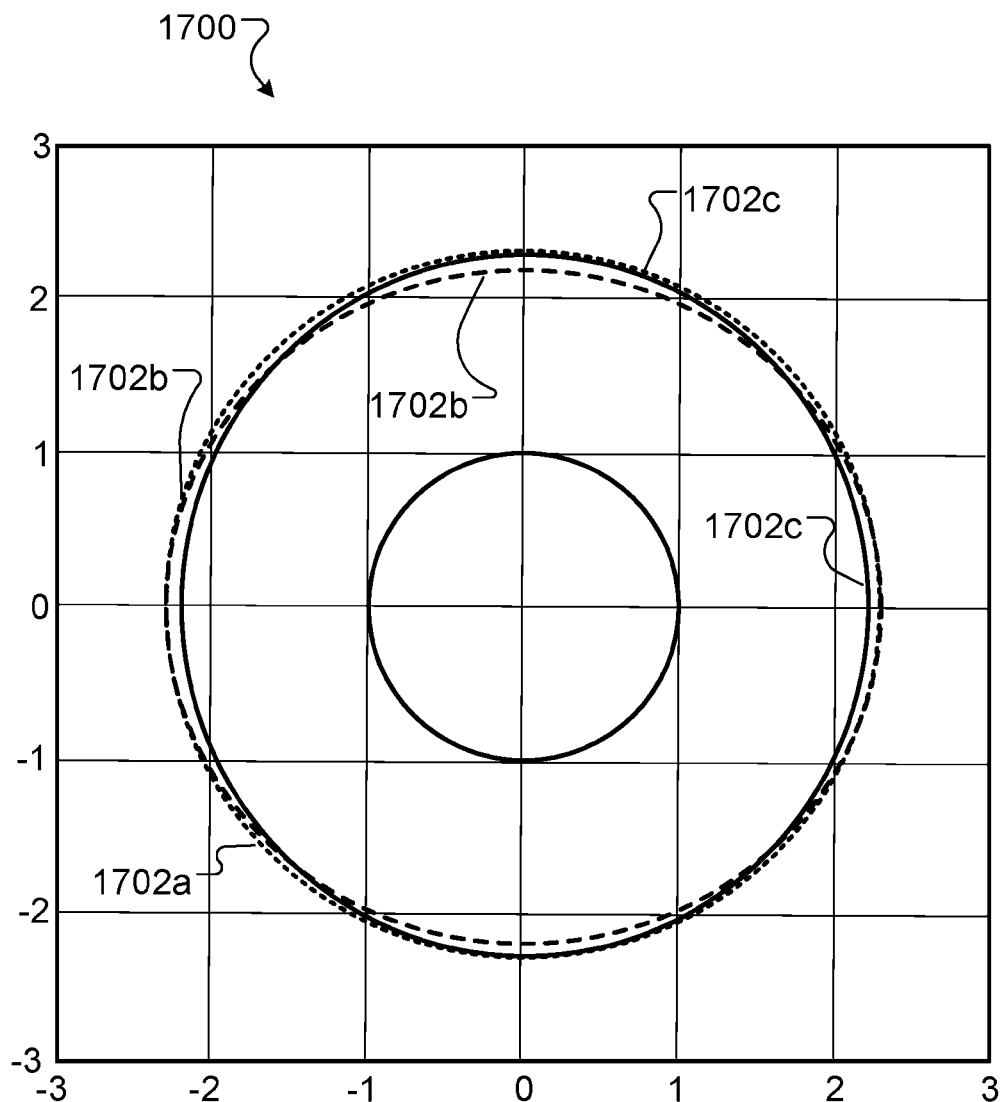
FIG. 17 depicts the k-space ellipses for light propagating in different direction and different cuts of lithium niobate.

With reference to FIG. 17, the shape of k-space annuluses 1700 for a birefringent crystal varies depending on the direction of light propagation and the cut of the birefringent crystal. The inner radius is equal to the index of refraction of the medium from which the light is incoming, e.g., 1 for air. The outer radius represents how much light can in-couple into a substrate based on the refractive index of the substrate, e.g., the allowed angles of incoming light. As a result, the size of a k-space annulus corresponds to the size of the field of view. In an optically isotropic material, the k-space annulus is truly annular, e.g., the outer outline is a circle with a radius equal to the index of refraction of the material. In optically anisotropic materials, the outer outline is an ellipse, with the major and minor axes determined by the indices of refraction along different directions.

FIG. 17 depicts the k-space ellipses 1702a, 1702b, and 1702c for LNO, which is uniaxial. In LNO, the Z-axis is the optic axis and the X- and Y-axes are optically equivalent. Ellipse 1702a represents the k-space for light propagating perpendicular to the X-Y plane for Z-cut wafer, ellipse 1702b the k-space for light propagating along either the X- or Y-axis for an X- or Y-cut wafer, and ellipse 1702c represents the k-space for light propagating along the Z-axis for an X- or Y-cut wafer. Ellipse 1702a is circular since all light propagating perpendicular to the X-Y plane experiences the same index of refraction. Ellipses 1702b and 1702c have nonequal semi major and minor axes since light propagating along the X- or Y-axes experiences different indices of refraction.

In LNO, light propagating along the Z-axis is the only light that experiences the same index of refraction, no matter the polarization. Light propagating along other directions will experience different indices of refraction depending on the polarization. Incoming light that is not traveling parallel to the optic axis in-couples and travel via TIR at different angles, resulting in a different number of bounces along the surfaces of the substrate. Consequently, nonuniformities develop along the Z-axis.

Figures 18A, 18B, 18C:
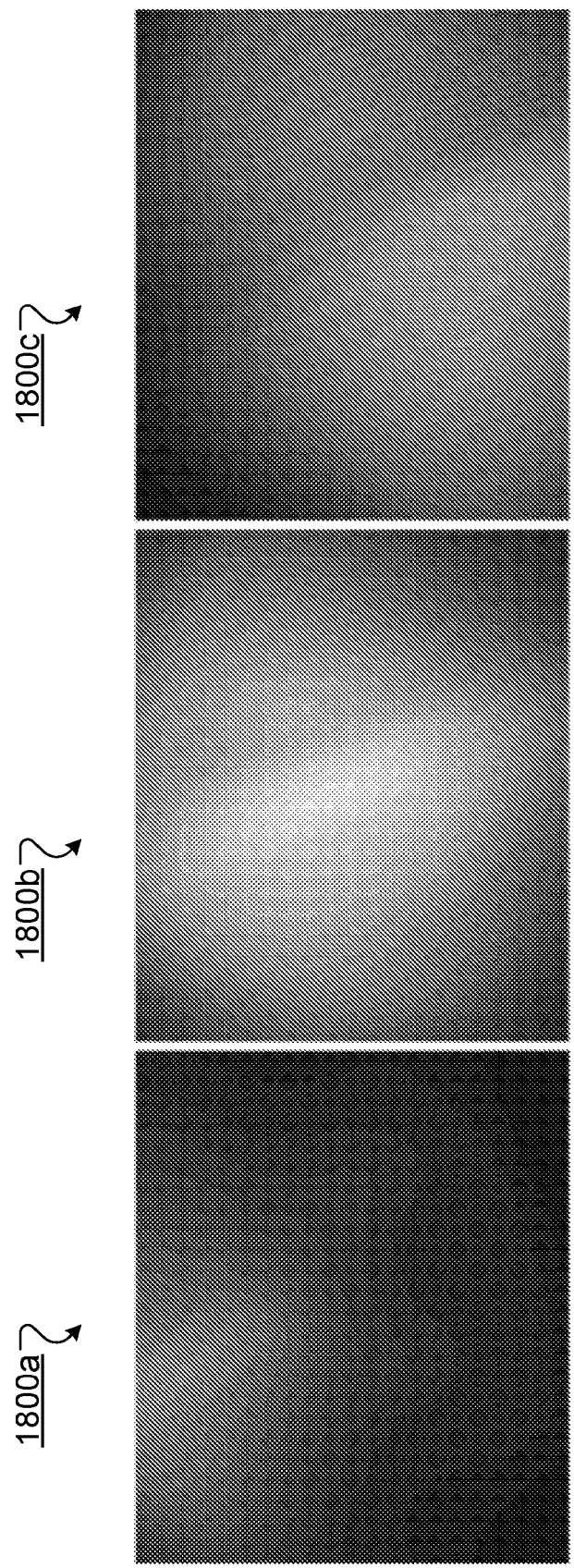
FIGS. 18A, 18B, and 18C depict images for a headset for red, green, and blue light respectively.

The index of refraction can also depend on the wavelength of light. In general, the greater the wavelength, the lower the refractive index. As a result, depending on the wavelength of light, the optical artifacts can be more or less pronounced based on the spacing. With reference to FIGS. 18A-C, image 1800a corresponds to blue light, e.g., 355 nm, image 1800b corresponds to green light, e.g., 530 nm, and image 1800c correspond to red light, e.g., 635 nm. Image 1800c correspond to light with the longest wavelength and least refractive index of the three images, resulting in more pronounced optical artifacts. Each of images 1800a-c was produced by an LED reticle projector launching light into an X-cut LNO waveguide with an out-coupling element corresponding to a combined pupil expander, e.g., a polymer resin grating. Each of images 1800a-c as the field-of-view greater than 60°.

With reference to FIGS. 19A and 19B, wafers 1900a and 1900b can each be X-cut LNO wafers. Each of wafers 1900a and 1900b include a substrate, e.g., substrates 1905a or 1905b, on which are disposed an in-coupling element, e.g., in-coupling elements 1906a or 1906b, and an out-coupling element, e.g., combined pupil expander (CPE) 1908a or 1908b. In wafer 1900a, the direction of light launch, e.g., the direction of a line connecting in-coupling element 1906a and CPE 1908a, is along the Y axis, which is perpendicular to the optic axis.

With reference to FIG. 19C, a pair 1900c of eyepieces includes the in-coupling element 1906a and CPE 1908a, with each eyepiece rotated±45°. FIGS. 19D and 19E depict the resulting images 1900d and 1900e when the in-coupling element 1906a and CPE 1908a are used for left and right eyepieces, respectively. The images 1900d and 1900e were captured by a camera positioned over the CPE 1908a, and the light is p-polarized, e.g., transverse magnetic (TM) polarized.

In wafer 1900b, the direction of light launch is along the Z-axis, which is parallel to the optic axis. With reference to FIG. 19C, a pair 1900c of eyepieces can be constructed from the in-coupling element 1906b and CPE 1908b, each eyepiece rotated±45°. FIGS. 19F and 19G depict the resulting images 1900*f* and 1900*g* when the in-coupling element 1906*b* and CPE 1908*b* are used for left and right eyepieces, respectively. Images 1900*f* and 1900*g* depict optical artifacts only along the Z-axis. The images 1900*f* and 1900*g* were captured by a camera positioned over the CPE 1908*b*, and the light is p-polarized, e.g., transverse magnetic (TM) polarized.

Figure 20A:
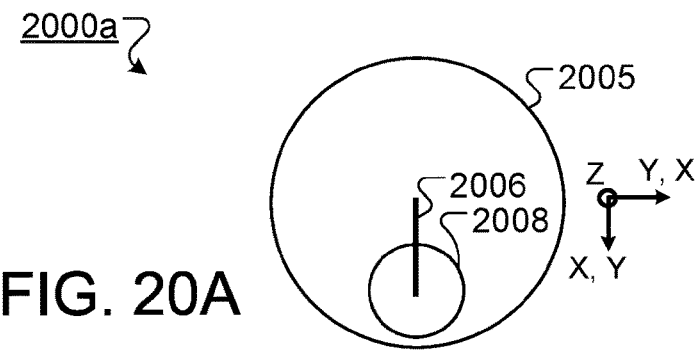
FIG. 20A depicts a Z-cut wafer with an eyepiece.
Figure 20B:
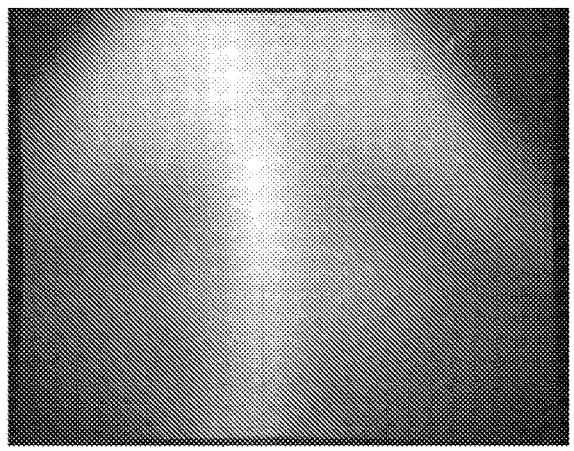
FIGS. 20B and 20C are images generated using an eyepiece from the wafer of FIG. 20A with unpolarized and polarized light, respectively.
Figure 20C:
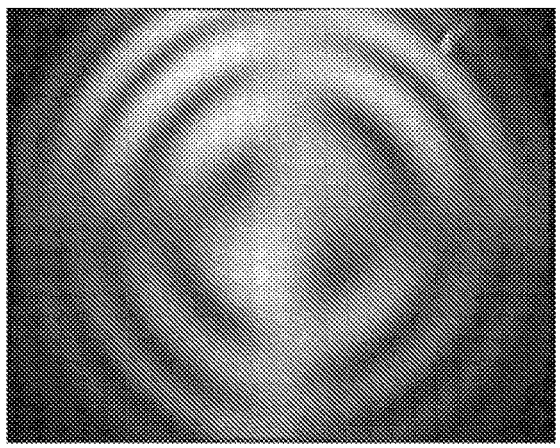

For Z-cut wafers, the severity of optical artifacts can depend on the polarization of incoming light. As an example, with reference to FIG. 20A, wafer 2000*a* includes a Z-cut substrate 2005, on which in in-coupling element 2006 and out-coupling element, e.g., CPE 2008, are disposed. FIGS. 20B and 20C depict images 2000*b* and 2000*c* generated from light traveling from the in-coupling element 2006 to the CPE 2008. The light in image 2000*b* is unpolarized, and the light and image 2000*c* is TM-polarized. Image 2000*b* is more uniform than image 2000*c*, which depicts a more dramatic bullseye pattern, demonstrating that using non-polarized light can mitigate optical artifacts for Z-cut wafers. In some implementations, the light source, e.g., light projector system 520, can be configured to deliver unpolarized light to the in-coupling element.

Figure 20D:
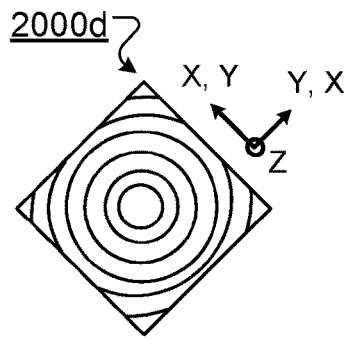
FIGS. 20D, 20E, and 20F are optical artifacts for different orientations of the eyepiece from FIG. 20A.
Figure 20E:
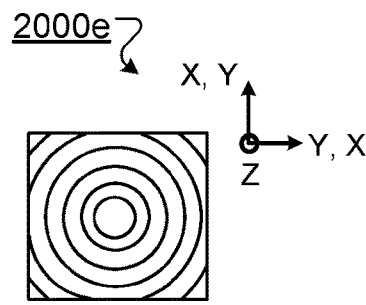
Figure 20F:
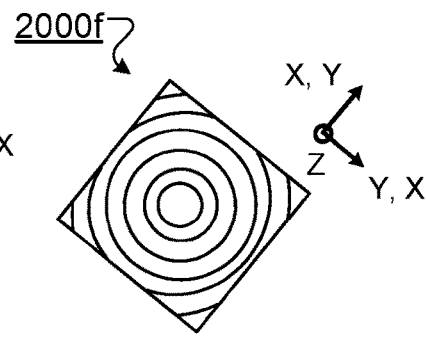

For Z-cut wafers, the shape of the optical artifacts appears generally the same when the clocking orientation of the wafer 2000*a* changes relative to the optic axis, e.g., rotates in the X-Y plane, due to the rotational symmetry of the bullseye pattern. As a result, with reference to FIGS. 20D-20F, each of optical artifacts 2000*d*, 2000*f*, and 2000*g* are present in image 2000*b*.

Using polarization insensitive in-coupling elements, e.g., input coupling gratings (ICGs), can mitigate optical artifacts for Z-cut wafers. Polarization insensitivity can be defined as the ratio of TM/TE (or vice versa, e.g., TE/TM) polarized light that is in-coupled over a particular field of view. For example, if an ICG is polarization insensitive, an equal amount of TM and TE polarized light will be in-coupled, yielding a ratio of 1. As an example, ICGs having a polarization insensitivity in the range of 0.5-2.0 over field-of-view of 10°, 20°, or 30° are considered polarization insensitive.

Figure 21B:
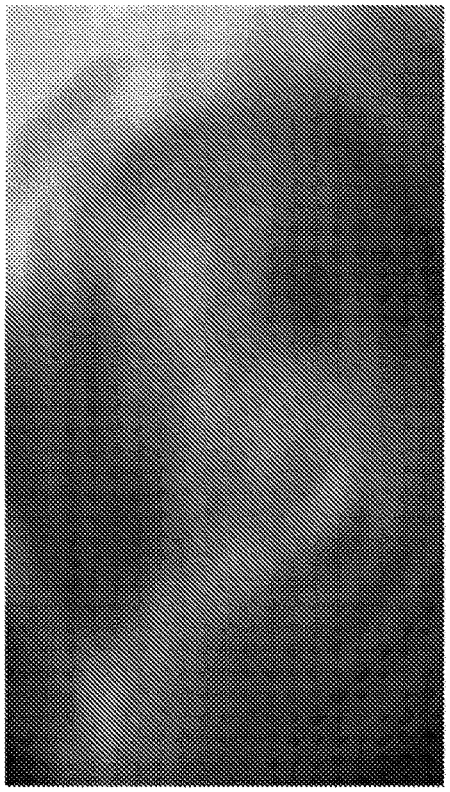
FIGS. 21A and 21B depict images of the outputs of a polarization sensitive in-coupling element and a polarization insensitive in-coupling element, respectively.
Figure 21A:
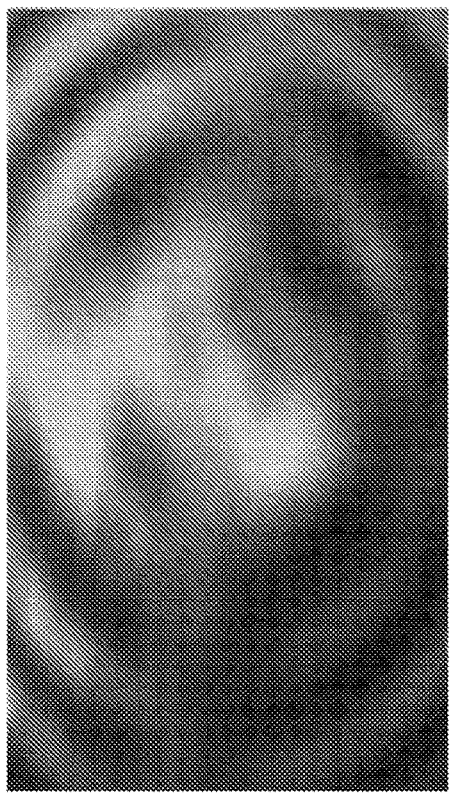

With reference to FIGS. 21A and 21B, images 2100*a* and 2100*b* depict the outputs of a polarization sensitive ICG, e.g., having a ratio greater than 2, and a polarization insensitive ICG, having a ratio between 0.5 and 1.5, respectively. Each of images 2100*a* and 2100*b* as a 50° field-of-view and was generated using green, e.g., 530 nm, TM polarized light from an LED. Image 2100*b* is more uniform than image 2100*a*, demonstrating that using polarization insensitive ICGs can mitigate optical artifacts for Z-cut wafers.

Figure 21C:
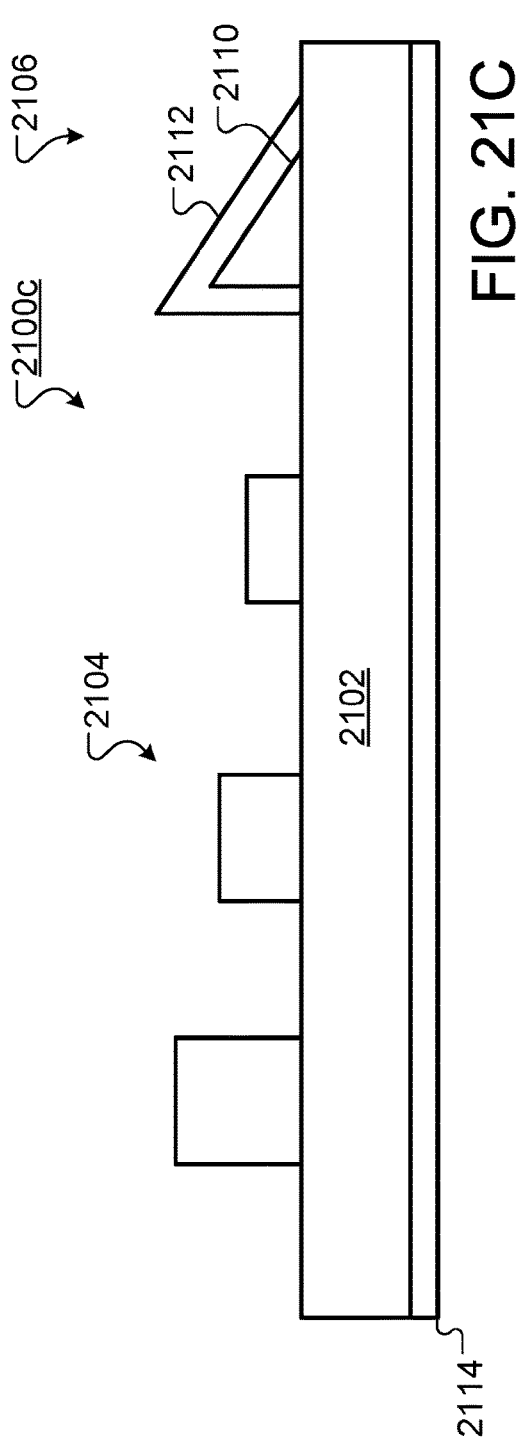
FIG. 21C depicts a polarization insensitive in-coupling grating on a substrate.

As an example, the eyepiece 2100*c* of FIG. 21C is different depending on the polarization of in-coupled light. The eyepiece 2100*c* includes a Z-cut silicon carbide substrate 2102 having n=2.65. The grating 2104 has a pitch, which can be selected based on the wavelength of light. For example, a pitch of 350 nm works well for blue light. The height of the gratings can vary, e.g., be graded at different rates. The ICG 2106 includes a blazed grating 2110 made of a first material with a medium index, e.g., n=1.53, with a silver (Ag) coating 2112. An antireflective coating 2114 having n=1.3 is on the side of the substrate 2102 opposite the gratings, e.g., grating 2104 and ICG 2106.

Figure 21D:
Figure 21E:
Figure 21F:
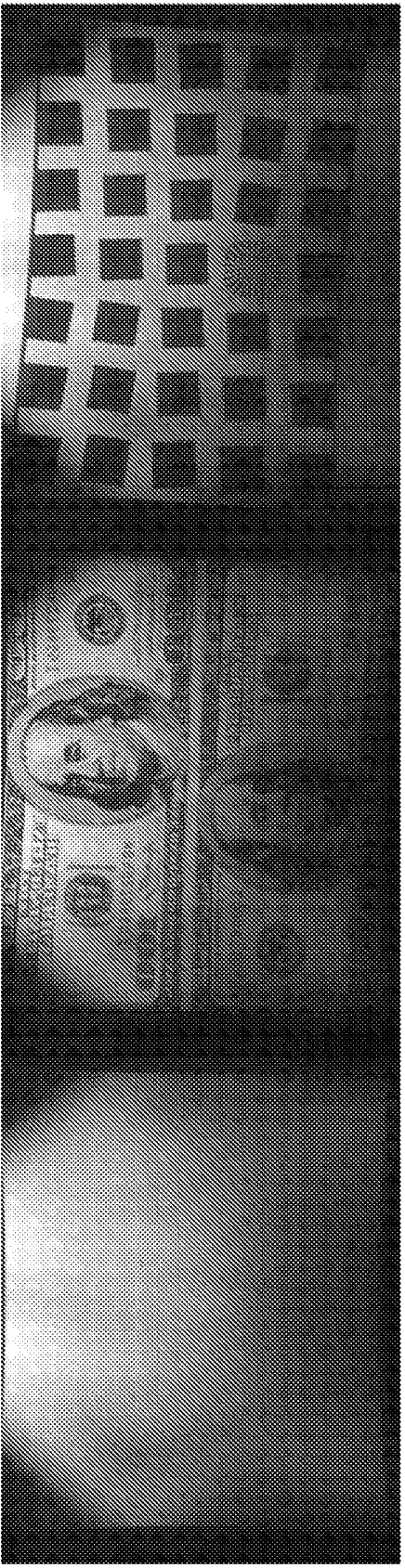
Figure 21G:

Similarly to the output of eyepieces including LNO substrates, eyepiece 2100*c* exhibits circular fringes when using polarized light, which subside when using unpolarized light. FIGS. 21D and 21E depict output for blue light for unpolarized light and polarized light, respectively. The FOV 2100*d*1 does not exhibit circular fringes, and the FOV 2100*e*1 does exhibit circular fringes. This leads to circular distortions in images 2100*e*2 compared 2100*d*2 and 2100*e*3 compared 2100*d*3. FIGS. 21F and 21G depict output for green light for unpolarized light and polarized light, respectively. The FOV 2100*f*1 exhibits reduced circular fringes compared to FOV 2100*e*1. This leads to stronger circular distortions in images 2100*g*2 compared 210012 and 2100*g*3 compared 2100*f*3. FIGS. 21H and 21I depict output for green light for unpolarized light and polarized light, respectively. The FOV 2100*h*1 exhibits reduced circular fringes compared to FOV 2100*i*1. This leads to stronger circular distortions in images 210012 compared 2100*h*2 and 210013 compared 2100*h*3.

Figures 22A, 22B:
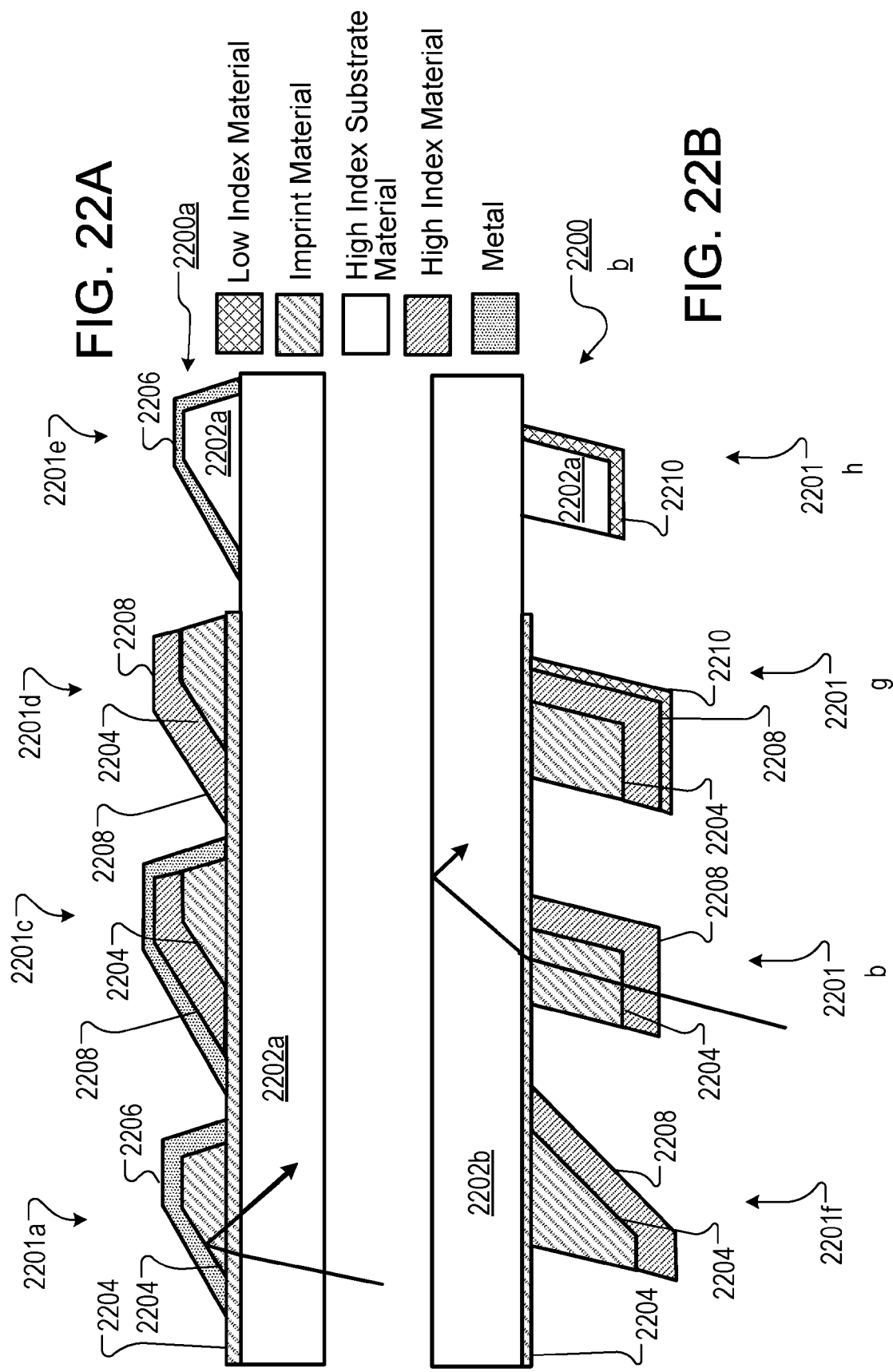
FIGS. 22A and 22B depict reflective and transmissive in-coupling gratings, respectively.

Polarization insensitive ICGs can take various forms. For example, FIGS. 22A and 22B depict ICGs 2200*a* and 2200*b*, respectively. ICG 2200*a* is a reflective ICG, where a ridge 2201*a* reflects incoming light before being in-coupled the light into substrate 2202*a*. ICG 2200*b* is a transmissive ICG, where a ridge 2201*b* transmits incoming light into the substrate 2202*b* before the light is in-coupled into the substrate 2202*b*.

Each of substrates 2202*a* and 2202*b* can be composed of a high-index, crystalline, waveguide material, such as LNO. The ICGs 2200*a* and 2200*b* include multi-index ridges, e.g., ridges composed of two or more layers of materials with different indices of refraction. For example, ICG 2200*a* includes a first ridge 2201*a* composed of an imprint material 2204 with a metal coating 2206, a second ridge 2201*c* composed of an imprint material 2204, a metal coating 2206, and intermediate coating of a high-index material 2208 between the imprint material 2204 and metal coating 2206. A third ridge 2201*d* is composed of the imprint material 2204 with a coating of a high-index material 2208, and a fourth ridge 2201*e* is composed of the same material as the substrate 2202*a* and has a metal coating 2206. The first through third ridges 2201*a-c* are all disposed on a layer of imprint material 2204 on the substrate 2202*a*, and the fourth ridge is disposed directly on the substrate 2202*a*. The first through fourth ridges 2201*a-d* have a blazed grating shape, e.g., sides of the ridges are slanted. In this example, each ridge has a trapezoidal shape.

ICG 2200*b* includes first and second ridges 2201*f* and 2201*b* composed of the imprint material 2204 with a coating of the high-index material 2208, a third ridge 2201*g* composed of the imprint material and a low-index coating 2210 within intermediate coating of a high-index material 2208 between the imprint material 2204 and the low-index coating 2210, and a fourth ridge 2201*h* composed of the same material as the substrate 2202*b* and a low-index coating 2210. The first through third ridges 2201*f*, 2201*b*, and 2201*g* are all disposed on a layer of imprint material 2204 on the substrate 2202*b*, and the fourth ridge 2201*h* is disposed directly on the substrate 2202*b*. The first through fourth ridges 2201*f*, 2201*b*, 2201*g*, and 2201*h* are blazed. The first ridge 2201*f* has a trapezoidal shape, and the second through fourth ridges 2201*b*, 2201*g*, and 2201*h* have a parallelogram shape.

The form of individual ridges can determine polarization sensitivity, e.g., in-coupling rates for TM and TE polarized light. For example, ridges 2201*a* and 2201*c* equally in-couple TM and TE polarized light. Ridges 2201*b* and 2201*d* diffract TE and TM polarized light with about the same diffraction efficiency.

In some implementations, a single eyepiece can include ICGs on both sides of a substrate, e.g., in both reflection and transmission modes.

In some implementations, the high-index coating includes titanium oxide (TiO$_2$), the low-index coating has an index of refraction between 1.3 and 1.45, the imprint material has an index of refraction between 1.5 and 2.0, and the metal coating includes aluminum, silver, or both.

Additional Design Considerations

The foregoing design rules regarding optical artifacts management can be combined with the following features. The in-coupling and out-coupling elements can include multi-index features, e.g., nanoscale patterns including two or more indices of refraction.

Figure 23B:
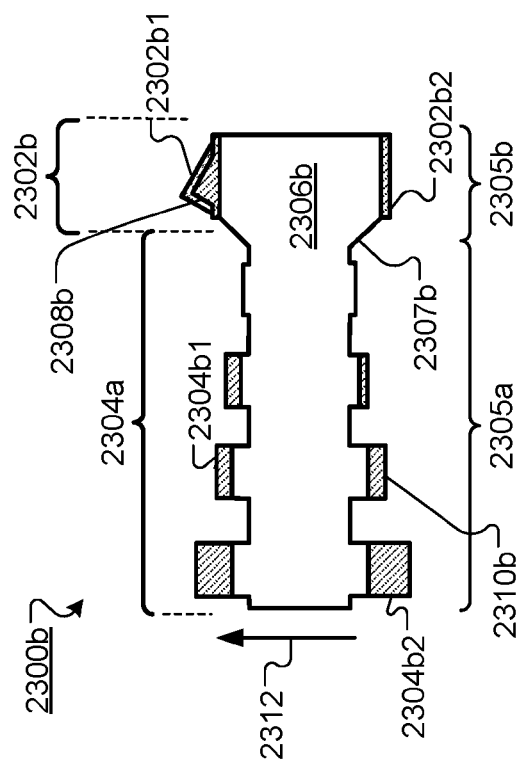
FIGS. 23A and 23B depict eyepieces with nonuniform height profiles.
Figure 23D:
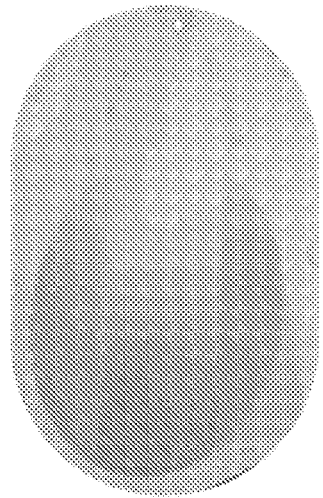
FIGS. 23C and 23D are plan views of the eyepieces of FIGS. 23A and 23B, respectively.
Figure 23A:
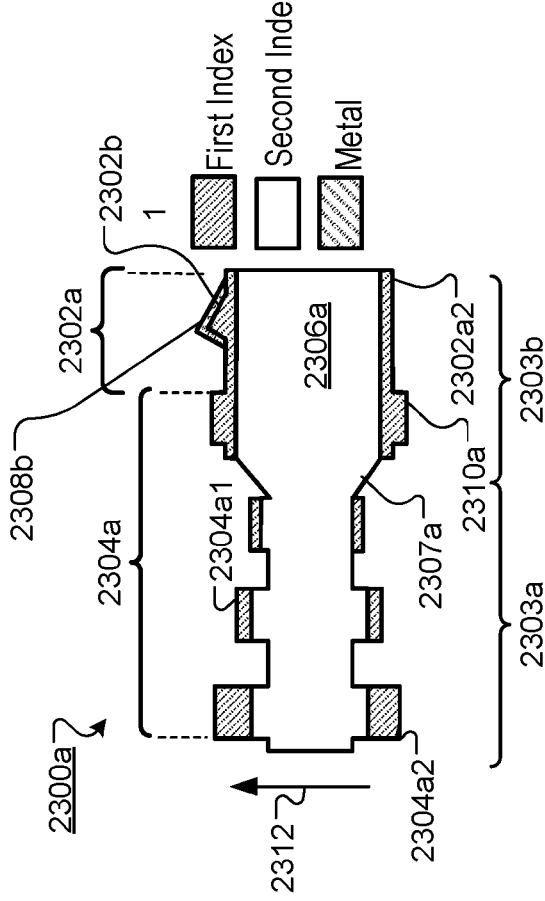

With reference to FIGS. 23A and 23B, eyepieces 2300a and 2300b each include an ICG, e.g., ICGs 2302a and 2302b, and a CPE, e.g., CPE 2304a and 2304b disposed on substrates 2306a and 2306b, respectively. Each of substrates 2306a and 2306b have a nonuniform height profile. For example, on each side of substrate 2303a, substrate 2306a includes a grating with graded height in a first portion 2303a and a second portion 2303b with a raised height relative to the surface of the substrate 2306a in the first portion 2303a, connected by a slanted region 2307a. Similarly, on each side of substrate 2303b, substrate 2306b includes a grating with graded height in a first portion 2305a and a second portion 2305b with a raised height relative to the surface of the substrate 2306b in the first portion 2305a, connected by a slanted region 2307b.

ICG 2302a includes a top portion 2302a1 including a blazed grating and a bottom portion 2302a2 including an even layer of imprint material. ICG 2302b includes a top portion 2302a1 including a blazed grating and a bottom portion 2302b2 including an even layer of imprint material. The top and bottom portions 2302a1 and 2302a2 are on opposite sides of the substrate 2306a. CPE 2304a includes a top portion 2304a1 and a bottom portion 2304a2 with symmetric features on opposite sides of the substrate 2306a. CPE 2304b includes a top portion 2304b1 and a bottom portion 2304b2 with symmetric features on opposite sides of the substrate 2306b.

As a result of the varied height profile of each of substrates 2306a and 2306b and the varying height of the ridges in the CPE, the height of the diffractive features on the substrates 2306a and 2306b varies. For examples, the height of ICG 2308a along vertical direction 2312 is greater than that of the CPE 2304a.

Throughout this disclosure, an in-coupling element can refer to an ICG, e.g., a ID or 2D array, and an out-coupling element can refer to an EPE, OPE, or CPE, e.g., a 1D or 2D array. The diffractive feature within the arrays can be asymmetrical so as to provide for a blazed grating. In some implementations, the diffractive features have material asymmetrically deposited thereon so as to provide for a blazed grating.

Each of substrates 2306a and 2306b are X-cut and composed of a high-index material, e.g., having an index of refraction between 2.2 and 2.3. The ICGs 2302a and 2302b and the CPEs 2304a and 2304b include a medium-index material, e.g., having an index of refraction between 1.6-1.7. Each of the ICGs 2302a and 2302b include a reflective coating 2308a or 2308b, respectively.

The pattern of the CPEs 2304a and 2304b differs. For example, ridge 2310a includes the medium-index material disposed at a different level along the vertical direction 2312 than the other ridges in CPE 2304a, and ridge 2310b does not include the medium-index material and is disposed at the same vertical level as the other ridges in CPE 2304b.

Figure 23C:
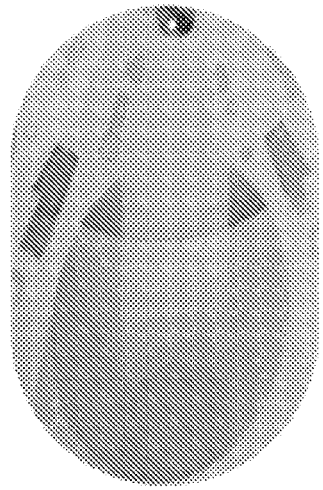

FIGS. 23C and 23D show top-down views 2300c and 2300d of eyepieces 2300a and 2300b.

The patterns of the CPEs and ICGs impact the light output efficiency and uniformity. With reference to FIGS. 23E-23J, images 2300e, 2300f, and 2300g depict eye box efficiencies for red, e.g., 635 nm±30 nm, green, e.g., 530 nm±30 nm, and blue light, e.g., 455 nm±30 nm, respectively, for eyepiece 2300a. Images 2300h, 2300i, and 2300j depict eye box efficiencies for red, green, and blue light, respectively, for eyepieces 2300b. For eyepieces 2300a, red light has an efficiency of 4.8%, green light has an efficiency of 6.1%, and blue light has an efficiency of 2.7%. For eyepieces 2300b, red light has an efficiency of 3.5%, green light has an efficiency of 3.6%, and blue light has an efficiency of 1.1%. Accordingly, eyepiece 2300a generally has greater eye box efficiency over eyepiece 2300b.

Figure 23K:
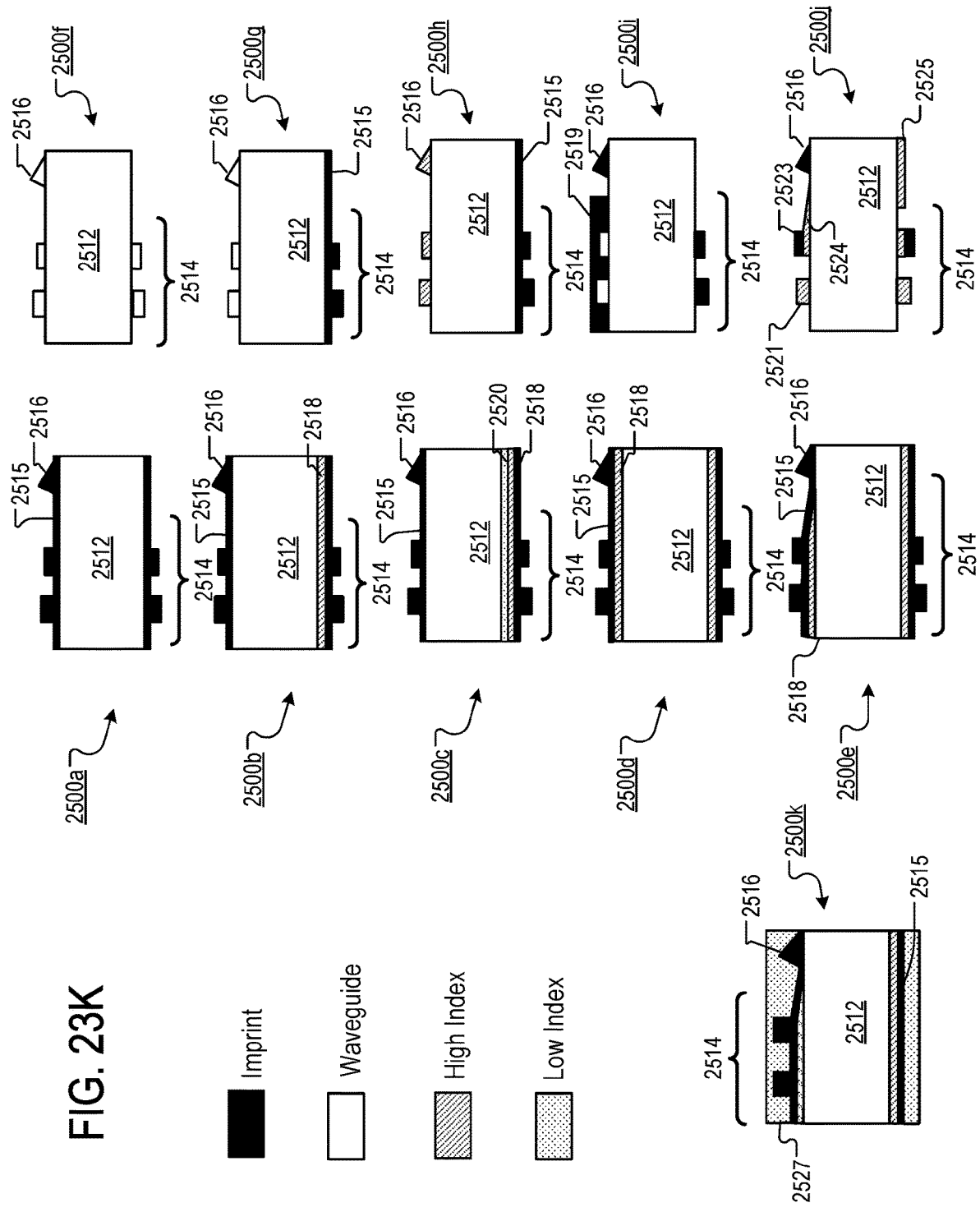
FIG. 23K depicts a variety of multi-index eyepieces.

FIG. 23K depicts various features, e.g., multi-index thin film coatings, etched gratings, feathered film coatings, and embed etched gratings, for eyepieces 2500a, 2500b, 2500c, 2500d, 2500e, 2500f, 2500g, 2500h, 2500i, 2500j, and 2500k. Each of eyepieces 2500a-2500k possess different combinations of elements and indices of refraction, marked with different patterns according to the index.

For example, eyepiece 2500a includes a high-index waveguide substrate 2512, e.g., LNO, with a CPE 2514 and ICG 2516 composed of an imprint material, e.g., having an index of refraction between 1.5 and 2.0. A layer 2515 of imprint material is disposed on each side of the substrate 2512, and between substrate 2512 and each of the CPE 2514 and ICG 2516.

Compared to eyepiece 2500a, eyepiece 2500b includes a high-index coating 2518, e.g., TiO$_2$, between the substrate 2512 and the lower layer 2515. Compared to eyepiece 2500b, eyepiece 2500c includes a low-index coating 2520, e.g., SiO$_2$, between the substrate 2512 and the high-index coating 2518. Compared to eyepiece 2500b, eyepiece 2500d includes an upper high-index coating 2518 between the substrate 2512 and the top layer 2518. Compared to eyepiece 2500d, the upper high-index coating 2518 and layer 2515 slant downward toward the ICG 2516 in eyepiece 2500e.

Compared to eyepiece 2500a, eyepiece 2500f does not include an imprint layer 2515, and the ICG 2516 and CPE 2514 are made of the same material as the substrate 2512, e.g., LNO. Compared to eyepiece 2500a, there is no upper imprint layer, and the upper portion of the CPE 2514 and the ICG 2516 are made of the same material as the substrate 2512 in eyepiece 2500g. Portions of the substrate 2512, e.g., spaces between the ICG 2516 and CPE 2514 and spaces between adjacent ridges of the CPE 2514, are exposed. Compared to eyepiece 2500g, the upper portion of the CPE 2514 and the ICG 2516 in eyepiece 2500h are composed of a high-index material rather than the same material as the substrate 2512. Compared to eyepiece 2500f, in eyepiece 2500i, the lower portion of the CPE 2514 and the ICG 2516 are composed of the imprint material, and there is an imprint coating 2519 over the top portion of the CPE.

Compared to eyepiece 2500e, eyepiece 2500j does not include an imprint layer between the substrate 2512 and the CPE 2514 and the ICG 2516. Further, each of the lower and upper portions of the CPE 2514 include a ridge 2521 composed of only the high index coating and another ridge 2523 composed of both the imprint material and the high-index material. Additionally, there is a high-index coating 2524 between the ICG 2516 and the ridge 2523 on the top of the substrate 2512 and a high-index coating 2525 directly beneath the ICG 2516 on the lower surface of the substrate 2512. The high-index coating 2525 and the lower portion of the CPE 2514 are separated by spaces of exposed regions of the substrate 2525. Compared to eyepiece 2500e, both sides of eyepiece 2500k are submerged in a low-index material 2527. In some implementations, only one side of the eyepiece 2500k is submerged in a low-index material 2527.

Throughout FIG. 23K, the various coatings, e.g., high-, medium- or low-index coatings can be 500 nm+/−10 nm or less. The coatings, e.g., layers, can have a thickness in a range from 100 nm to 500 nm.

As depicted in the various examples in FIGS. 22A-23K, both of the in-coupling and out-coupling elements can be on either side of a substrate. For example, the in-coupling and out-coupling elements can be on a single side of the substrate, or the in-coupling and out-coupling elements can be on both sides of the substrate. The in-coupling and out-coupling elements can be on the same or opposite sides of the substrate. In some implementations, the in-coupling element is on both sides of the substrate, and the out-coupling element is on a single side of the substrate. In some implementations, the out-coupling element is on both sides of the substrate, and the in-coupling element is on a single side of the substrate. Both the in-coupling and out-coupling elements can include a grating on one side of a substrate and/or a grating on the opposite side of the substrate. In some implementations, there are stacks of substrates, and the in-coupling and out-coupling elements can include a grating on one side of a first substrate and/or a grating one side of a second substrate.

Throughout this disclosure are examples of in-coupling elements, e.g., ICGs, an out-coupling elements, e.g., EPEs, OPEs, and CPEs, being supported by one of or two surfaces of a substrate. If there are intermediate layers, for example as in eyepiece 2500c with low-index coating 2520, high-index coating 2518, and imprint layer 2515, the substrate, e.g., the crystalline material, still supports the in-coupling and out-coupling elements.

Varying a thickness of a wafer can positively impact image uniformity. With reference to FIG. 24A, a wafer 2400a includes six pairs of in-coupling elements 2404 and out-coupling elements 2402 evenly distributed a center 2405 of the wafer 2400a, e.g., equally spaced by an angular increment (60° in this example) around the center 2405. For examples, each in-coupling element 2404 is at the same position from the center of the wafer 2400a along a different radial direction, and each radial direction is at an equal angular displacement from the prior radial direction.

FIG. 24A depicts a planar view of wafer 2400a, and FIG. 24B depicts a total thickness variation (TTV) plot 2400b. As indicated by the index, the thickness variation ranges from zero at the edge of the wafer 2400a to 500 nm at the center of the wafer 2400a, e.g., the height generally decreases from the center toward the edge. In this example, wafer 2400a a circular, and the height varies radially from the origin of the circle.

Along plane 2406, the height increases from 0 nm, reaching 500 nm at the center before descending back to 0 nm at the opposite end. With reference to FIG. 24C, a cross-section 2400c is the cross-section of wafer 2400a across plane 2406. Substrate 2408 has a height profile according to the thickness variation. In this example, the height profile of substrate 2408 is dome-shaped, e.g., correspond to a portion of the spherical or rotationally symmetric a spherical surface. In the cross-section 2400c, two pairs of in-coupling elements 2404a and 2404b and out-coupling elements 2402a and 2402b are visible. The in-coupling and out-coupling elements are disposed conformally on the surface 2410 of the substrate with varying height.

In this example, there are six pairs of in-coupling elements and out-coupling elements, which correspond to six eyepieces. For example, outline 2407 marks the outline of one eyepiece from wafer 2400a. As previously described, the height profile varies along the radial direction 2409. In this example, the radial direction 2409 is parallel to a line that connects the in-coupling element 2404 to the out-coupling element 2402. Additionally, the height profile varies along a second direction 2411, e.g., a tangential direction, that is perpendicular to the radial direction. The height profile varies more rapidly along the radial direction than the tangential direction. Although outline 2407 and thus the eyepiece do not possess circular symmetry, the eyepiece corresponds to a portion of a rotationally symmetrical object, e.g., wafer 2400a.

Although FIG. 24B depicts a rotationally symmetric TTV, other implementations are possible. For example, FIGS. 24-24F depict TTVs for three different wafers, each including two or more pairs of in-coupling elements 2404 and out-coupling elements 2402. The height profiles in wafers 2400d, 2400e, and 2400f are functions of both the radius and angular position, since these three TTVs do not possess exact circular symmetry. Contour lines 2412 mark increments of 50 nm changes in the height.

With reference to FIGS. 24G and 24H, images 2400g and 2400h include images output by eyepieces from wafers 2400d-2400f. Images 2400g includes images for a left eyepiece, with the top row being images produced by eyepieces from wafer 2400d, the middle row being images produced by eyepieces from wafer 2400e, in the bottom row being images produced by eyepieces from wafer 2400f. The left column includes blue light images, the middle column includes green light images, and the right column includes red light images. The same organization applies to image 2400h. In this example, wafer 2400e produces blue images with 3.94% eye box efficiency, green images with 5.85% eye box efficiency, and read images with 3.64% eye box efficiency. In this example, the field-of-view is greater than 65°, and the wafer is X-cut LNO.

The TTV can be further modulated with high-index, e.g., n being between 2.2 and 2.3, dielectric film coatings, e.g., $TiO_2$ being vapor deposited with a shadow stencil over the substrate. Using a coating to achieve a desired profile, e.g., a wedge shape, can be easier to manufacture than the substrate with the desired profile. In some implementations, the total length spanning the in-coupling element and out-coupling element is 65 mm, e.g., in a range of 60-70 mm.

Figure 25:
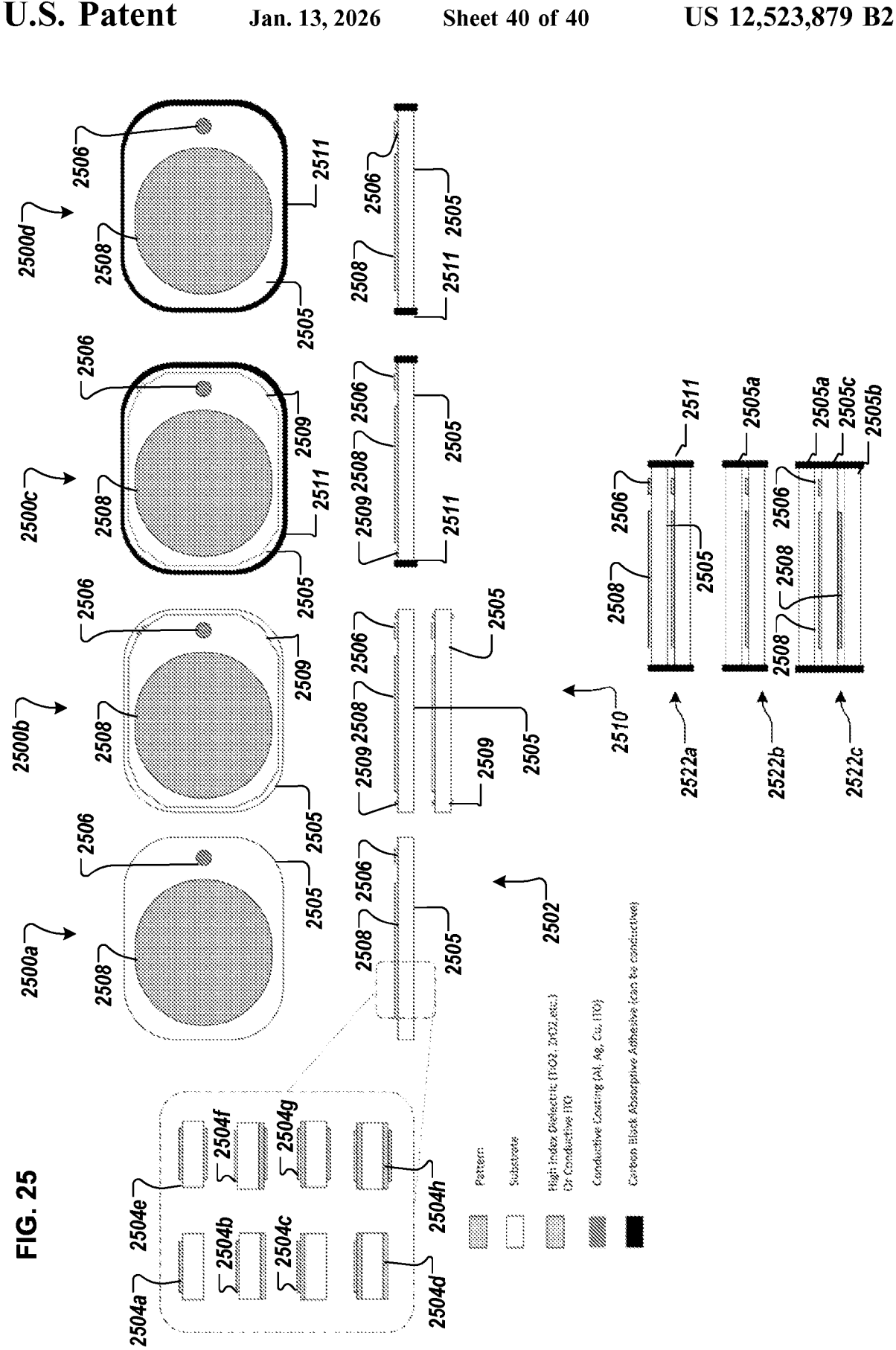
FIG. 25 depicts eyepieces with conductive coatings, absorptive adhesives, and both.

Additional design features can improve image contrast by preventing light from straying outside of the eyepiece in undesirable ways. In some implementations, a conductive material, e.g., indium tin oxide (ITO), coats an outer edge of the substrate. The conductive material can be grounded to a metal frame within a headset. With reference to FIG. 25, an eyepiece 2500a can be processed in various ways. Schematic 2502 of the eyepiece 2500a reveals in-coupling element 2506, out-coupling element 2508, and a substrate 2505. A close up of the CPE, indicated by dashed lines, shows various options 2504a, 2504b, 2504c, 2504d, 2504e, 2504f, 2504g, and 2504h for the CPE design. Options 2504a-f include different configurations of the substrate, patterning, a high-index dielectric, e.g., $TiO_2$ or $ZrO_2$, or conductive ITO coating, a conductive coating, e.g., Al, Ag, Cu, or ITO, and an absorptive adhesive for absorbing stray light.

Eyepiece 2500b includes a stack 2510 of substrates 2505 with a pattern 2509, forming a stencil around the in-coupling element and out-coupling element 2508. Eyepiece 2500c includes the pattern 2509 and an absorptive adhesive 2511, e.g., carbon black, which can be conductive.

Eyepiece 2500d includes in-coupling element 2506, out-coupling element 2508, and substrate 2505, which is coated in the absorptive adhesive 2511. Although one substrate 2505 is depicted in eyepiece 2500d, other implementations are possible. For example, eyepiece 2522a includes two stacked substrates 2502 with an absorptive adhesive 2511 on the edges of the substrates, each substrate with respective in-coupling element 2506 and out-coupling element 2508. As another example, eyepiece 2522b includes two stacked substrates 2505 with an absorptive adhesive 2511 on the edges of the substrates, where there are no in-coupling or out-coupling elements on the upper substrate 2505a. As another example, eyepiece 2522c includes three stacked substrates 2502 with an absorptive adhesive 2511 on the edges of the substrates, where there are no in-coupling or out-coupling elements on the upper or lower substrates 2505a 2505b, and the middle substrate 2505c has out-coupling elements 2508 disposed on both sides of the substrate 2505c and an in-coupling element 2506 on the upper surface of the substrate 2505c.

There are various material options for the components of the disclosed eyepieces. US20220128817A1, entitled "Waveguides with high index materials and methods of fabrication thereof," is incorporated in its entirety by reference, describes use of high index materials (including $LiNbO_3$ or $LiTaO_3$) waveguides in AR systems that are example environments in which the technology described above can be deployed.

The imprint material can be a patterned imprintable prepolymer material including a resin material, such as an epoxy vinyl ester. The resin can include a vinyl monomer (e.g., methyl metacrylate) and/or difunctional or trifunctional vinyl monomers (e.g., diacrylates, triacrylates, dimethacrylates, etc.), with or without aromatic molecules in the monomer. The prepolymer material can include monomer having one or more functional groups such as alkyl, carboxyl, carbonyl, hydroxyl, and/or alkoxy. Sulfur atoms and aromatic groups, which exhibit polarizability, can be incorporated into acrylate components to increase the refractive index, e.g., an index ranging from 1.5~1.75. In some implementations, the prepolymer material can include a cyclic aliphatic epoxy containing resin, which can be cured using ultraviolet light and/or heat. In addition, the prepolymer material can include an ultraviolet cationic photoinitiator and a co-reactant to facilitate efficient ultraviolet curing in ambient conditions.

Incorporating inorganic nanoparticles (NP) as $ZrO_2$ and $TiO_2$ into imprint able resin polymers and even added to the edge adhesive resin can increase the refractive index up to 2.1. For patterned optical features, e.g., gratings, higher indices improve the overall diffraction efficiencies over wider angles. For edge blackening adhesives higher indices can help index match edge surface of $LiNbO_3$ better, e.g., reduce the mismatch to 1.7 vs. 1.5. The index matching increases the likelihood of incoupling and extinguishing stray light. Pure $ZrO_2$ and $TiO_2$ crystals can have indices such as 2.2 and 2.4-2.6 at 532 nm. In the preparation of optical nanocomposites of acrylate monomer and inorganic nanoparticle, the particle size being smaller than 10 nm helps avoid excessive Rayleigh scattering. Due to $ZrO_2$ NP's high specific surface area, high polarity, and incompatibility with the cross-linked polymer matrix, $ZrO_2$ NP tend to agglomerate in the polymer matrix. Surface modification of NPs can be used to overcome this problem. In this technique, the hydrophilic surface of $ZrO_2$ is modified to be compatible with organics, thus enabling the NP to be uniformly mixed with the polymer. Such modification can be done with silane and carboxylic acid containing capping agents. One end of the capping agent is bonded to $ZrO_2$ surface, and the other end of capping agent either contains a functional group that can participate in acrylate crosslinking or a non-functional organic moiety. Examples of surface modified sub-10 nm $ZrO_2$ particles are those supplied by Pixelligent Technologies™ and Cerion Advanced Materials™. These functionalized nanoparticles are typically sold uniformly suspended in solvent as uniform blends, which can be combined with other base materials to yield resist formulations with ink-jettable viscosity and increased refractive index.

The pre-polymer material can be patterned using a template (superstrate, rigid or flexible) with an inverse-tone of the optically functional nano-structures (diffractive and sub-diffractive) directly in contact with the liquid pre-polymer. The liquid state pre-polymer material can be dispensed over the substrate or surface to be patterned using, for example, ink-jetting drop on demand or continuous jetting system, slot-die coating, spin-coating, doctor blade coating, micro-gravure coating, screen-printing, or spray or atomization. The template contacts the liquid, and when the liquid fills the template features, to crosslink and pattern, the prepolymer with diffractive patterns with a template in contact (for example in case of Imprint Lithography e.g. J-FIL™ where prepolymer material is inkjet dispensed) includes exposing the prepolymer to actinic radiation having a wavelength between 310 nm and 410 nm and an intensity between 0.1 $J/cm^2$ and 100 $J/cm^2$. The method can further include, while exposing the prepolymer to actinic radiation, applying heat of the prepolymer to a temperature between 40° C. and 120° C.

To promote adhesion between the pre-polymer material post patterning (template/mold demolding) and curing over a desired $LiNbO_3$ or surface film coating over $LiNbO_3$ (e.g. $TiO_2$, $ZrO_2$, $SiO_2$, etc.), crosslinking silane coupling agents can be used. Silane coupling agents have an organofunctional group at one end and hydrolysable group at the other and form durable bonds with different types of organic and inorganic materials. An example of the organofunctional group can be an acryloyl, which can crosslink into a patternable polymer material. The template or molds can be coated with a coating where the acryloyl end is replaced with a fluorinated chain, which can reduce the surface energy and thus act as a nonbonding but release site. Vapor deposition is carried out at low pressures where the coupling agent is delivered in vapor form with or without the use of an inert gas, e.g., as $N_2$, with activated —O and/or —OH groups present on the surface of material to be coated. The vapor coating process can deposit monolayer films with a thickness in the range of 0.5 nm-0.7 nm or more.

UV acrylate coatings and films tend to suffer from oxygen inhibition during ambient curing. During curing, oxygen will react with acrylate radicals at the surface to generate peroxide radicals, which are inactive. This reaction effectively stops the chain reaction and results in a sticky, wet surface after UV exposure. The viscosity of the material can be in a range of about 10 cPs to about 100,000 cPs to about 500,000 cPs. Suitable dyes and pigments include Carbon black (size range 5 nm~500 nm), Rhodamine B, Tartarzine, chemical dyes from Yamada Chemical Co., Ltd., SUNFAST pigments from SunChemical (e.g., Green 36, Blue, Violet 23, etc.).

The dye or pigment is combined with a solvent and then combined with a UV curable resin to yield a color-absorbing resin. The solvent can be a volatile solvent, such as an alcohol (methanol, ethanol, butanol, or the like) or other less volatile organic solvents, such as dimethylsulfoxide (DMSO), propylene glycol monomethyl ether acetate (PG-MEA), toluene, and the like. The dye or pigment can be separated from the solvent or concentrated (e.g., using centrifuge evaporation) to yield an optimal concentration with the crosslinking organic resin (e.g., a UV curable highly transparent material). An optimal concentration of the dye or pigment can impart a color-absorbing film with desirable optical characteristics, such as a greater concentration of color-absorbing dye or pigment, and yield less reflective films.

Compared to conventional water and solvent-borne coatings, UV radiation curable coatings and adhesives hold additional challenges for balancing acceptable viscosity for the specific application, targeted gloss level, and desired film properties (e.g. scratch resistance, hardness, adhesion strength, etc.). Due to solvent evaporation, conventional coatings start to orientate and "concentrate" the matting agent during physical drying of the film. As volatile compounds evaporate, the applied film starts to shrink. This shrinkage can vary between 30% up to 60% of the wet films volume depending on volume solids. Compared to this, 100% UV coatings only shrink about 10% during the rapid cure cycle, which results in much less dense packing of matting agent. Silica based matting agents are effective in reducing the glossiness by introducing surface roughness and wrinkling. Examples of silica matting agents are those from Evonik: Acematt HK 400, D50 particle size of 6.3 um, Acematt OK 607, D50 particle size of 4.4 um, Acematt OK 412, D50 particle size of 6.3 um, Acematt 3600, D50 particle size of 5.0 um.

The pattern in the cured polymer material can be used as a mask also to directly etch into the high or low-index substrate (inorganic or organic) or a high or low-index film (e.g. $TiO_2$, $SiO_2$, etc.) over the substrate and under the patterned and cured polymer. The high-index or low-index inorganic thin film can also be deposited with Physical Vapor Deposition (e.g. Evaporation, Sputter) or with Chemical Vapor Deposition (Low Pressure Plasma Enhanced CVD, Atmospheric PECVD, ALD) with indices ranging from 1.38 to 2.6 (e.g. $MgF_2$, $SiO_2$, $ZrO_2$, $TiO_2$, etc.). An imprinted polymer with certain actin energy may be selected to provide etching selectivity (etch of target material/etch of patterned polymer) with an index in the range of 0.3~3.0. The imprinted or etched pattern can also be further planarized a curable pre-polymer material of index 1.5~2.1 (as mentioned above) using, for example, ink-jetting drop on demand or continuous jetting system, slot-die coating, spin-coating, doctor blade coating, micro-gravure coating, screen-printing, spray or atomization. A uniform or varying volume can be also achieved for example using an inkjet dispense drop-on-demand system where different area get different density or volume of drops. In some implementations, a blank template can be used to planarize the surface. The blank template can be composed of the laminate, which is needed to be adhered to the patterned substrate. The thickness variation of each individual layer index can be in a range of 0-50 nm, 0-100 nm, <200 nm, <300 nm, <800 nm, or <1000 nm. The shape can be a wedge shape, e.g., thickest near the ICG and tapering going away from ICG or vice versa. Laminates of opposing wedges can also be combined to achieve an increased uniformity and spread of light wavelength in different diffractive pitch waveguides.

Although the disclosed inventive concepts include those defined in the attached claims, it should be understood that the inventive concepts can also be defined in accordance with the following embodiments.

In addition to the embodiments of the attached claims and the embodiments described above, the following numbered embodiments are also innovative.

Embodiment 1 is a head mounted display comprising: a head mounted display frame; a first eyepiece supported by the frame, the first eyepiece comprising a first substrate composed of a crystalline, transparent material having crystallographic axes in a first orientation with respect to the frame, the substrate having a first surface and a second surface opposite the first surface, the first eyepiece further comprising a first in-coupling element comprising a grating on the first surface, and a first out-coupling element comprising a grating on the first surface and/or a grating on the second surface; and a second eyepiece comprising a second substrate composed of the crystalline, transparent material having crystallographic axes in a second orientation with respect to the frame different from the first orientation, a second in-coupling element on either surface of the second substrate, and a second out-coupling element on either surface of the second substrate.

Embodiment 2 is the head mounted display of embodiment 1, wherein for both the first orientation and the second orientation, a first crystallographic axis of the crystallographic axes is oriented perpendicular to the surface of the respective substrate and a second crystallographic axis of the crystallographic axes is oriented in a plane of the substrate.

Embodiment 3 is the head mounted display of embodiment 2, wherein the first crystallographic axis is a Z-axis.

Embodiment 4 is the head mounted display of embodiment 3, wherein the second crystallographic axis in the first orientation is perpendicular to the second crystallographic axis in the second orientation.

Embodiment 5 is the head mounted display of embodiment 3, further comprising a light projection system configured to deliver unpolarized light to the first and second in-coupling elements.

Embodiment 6 is the head mounted display of embodiment 2, wherein the first crystallographic axis is an X-axis.

Embodiment 7 is the head mounted display of embodiment 2, wherein the first crystallographic axis is a Y-axis.

Embodiment 8 is the head mounted display of any of embodiments 1 through 7, wherein an optic axis of the crystalline, transparent material in the first eyepiece is parallel to an optic axis of the crystalline, transparent material in the second eyepiece.

Embodiment 9 is the head mounted display of any of embodiments 1 through 8, wherein a thickness of the first substrate varies across the first substrate.

Embodiment 10 is the head mounted display of embodiment 9, wherein the thickness of the first substrate at an edge of the substrate is smaller than a thickness of the first substrate away from the edge.

Embodiment 11 is the head mounted display of any of embodiments 1 through 10, wherein for the first and second eyepieces, a shortest line between corresponding in-coupling element and out-coupling element defines a respective first direction for a corresponding eyepiece, and for the first substrate, a first crystallographic axis of the crystallographic axes is aligned parallel to the first direction, and for the second substrate, a second crystallographic axis of the crystallographic axes is aligned parallel to the first direction.

Embodiment 12 is the head mounted display of any of embodiments 1 through 11, wherein the crystalline, transparent material is selected from the group consisting of $LiNbO_3$, SiC, and $LiTaO_3$.

Embodiment 13 is the head mounted display of any of embodiments 1 through 12, wherein the crystalline transparent material is a birefringent material.

Embodiment 14 is the head mounted display of any of embodiments 1 through 13, wherein the first and second substrates are components of first and second stacks of waveguides.

Embodiment 15 is the head mounted display of any of embodiments 1 through 14, wherein the first and second eyepieces correspond to portions of first and second wafers, and a first orientation of a first optic axis relative to the first line is different from a second orientation of a second optic axis relative to the second line.

Embodiment 16 is the head mounted display of any of embodiments 1 through 15, wherein at least one of the first and second in-coupling elements and the first and second out-coupling elements comprise multiple materials with different indices of refraction.

Embodiment 17 is the head mounted display of any of embodiments 1 through 16, wherein the first surface supports a layer of a first dielectric material that extends over the first in-coupling element and the first out-coupling element, the first dielectric material having a refractive index of 1.5 or less.

Embodiment 18 is the head mounted display of embodiment 17, wherein the refractive index of the first dielectric material is in a range from 1.2 to 1.3.

Embodiment 19 is the head mounted display of embodiment 17, wherein the refractive index of the first dielectric material is in a range from 1.2 to 1.3.

Embodiment 20 is the head mounted display of any of embodiments 1 through 19, wherein the second surface supports a layer of a second dielectric material that extends over the second in-coupling element and the second out-coupling element, the second dielectric material having a refractive index of 1.5 or less.

Embodiment 21 is the head mounted display of any of embodiments 1 through 20, further comprising an adhesive layer on edges of at least one of the first and second eyepieces, the adhesive layer configured to absorb visible light.

Embodiment 22 is the head mounted display of any of embodiments 1 through 21, further comprising a layer of material disposed over the in-coupling and out-coupling elements.

Embodiment 23 is the head mounted display of embodiment 22, wherein said layer of material comprises a polymerized resin.

Embodiment 24 is the head mounted display of any of embodiments 1 through 23, wherein the in-coupling and out-coupling elements are separated by spaces, and said spaces comprise exposed regions of the crystalline, transparent material.

Embodiment 25 is the head mounted display of any of embodiments 1 through 24, wherein at least one of the first and second in-coupling elements and the first and second out-coupling elements is etched into the surface of the first and second substrates, respectively.

Embodiment 26 is an article comprising: a wafer composed of a crystalline, transparent material having crystallographic axes in a first orientation with respect to a surface of the wafer, a thickness of the wafer varying across the surface of the wafer such that for a cross-sectional profile of the wafer, the thickness increases monotonically from edges of the wafer to a location of maximum thickness away from the edges; and a plurality of optical elements comprising a grating on the surface of the wafer and spaced apart from each other, each grating corresponding to a portion of the wafer for singulation into a component for an eyepiece for a head mounted display, each portion having the same thickness profile.

Embodiment 27 is the article of embodiment 26, further comprising a respective optical element for each grating in a corresponding portion of the wafer.

Embodiment 28 is the article of embodiment 26 or embodiment 27, wherein the respective optical element is a combined pupil expander, an exit pupil expander, or an orthogonal pupil expander.

Embodiment 29 is the article of any of embodiments 26 through 28, wherein a difference between a maximum thickness and a minimum thickness is in a range of 1 to 500 nm, Embodiment 30 is the article of any of embodiments 26 through 29, wherein the wafer is circular.

Embodiment 31 is the article of embodiments 30, wherein the thickness of the wafer follows a sector of the circular wafer.

Embodiment 32 is the article of embodiment 30 or embodiment 31, wherein the plurality of gratings are equally spaced from a center of the circular wafer.

Embodiment 33 is an eyepiece comprising: a transparent, crystalline substrate composed of a material having a refractive index greater than 2.2, the substrate extending in a plane and having a thickness in a direction perpendicular to the plane that varies along a first direction in the plane and along a second direction in the plane substantially perpendicular to the second direction; an in-coupling element comprising a grating supported by a first surface of the substrate; and an optical element comprising a grating supported by the first surface and/or the second surface of the substrate opposite the first surface.

Embodiment 34 is the eyepiece of embodiment 33, wherein the optical element is a combined pupil expander, an exit pupil expander, or an orthogonal pupil expander.

Embodiment 35 is the eyepiece of embodiment 33 or embodiment 34, wherein the eyepiece corresponds to portion of a spherical or rotational symmetric aspherical surface.

Embodiment 36 is the eyepiece of any of embodiments 33 through 35, wherein the eyepiece is coated in an absorptive adhesive material.

Embodiment 37 is the eyepiece of any of embodiments 33 through 36, wherein a difference between a maximum thickness and a minimum thickness is in a range of 1 to 500 nm.

Embodiment 38 is the eyepiece of any of embodiments 33 through 37, wherein a total length in the plane spanning the in-coupling element and optical element is in a range of 60-70 mm.

Embodiment 39 is the eyepiece of any of embodiments 33 through 38, wherein the substrate is configured to guide light in a range of 455 nm+/−30 nm.

Embodiment 40 is the eyepiece of any of embodiments 33 through 38, wherein the substrate is configured to guide light in a range of 530 nm+/−30 nm.

Other implementations are in the following claims.

Embodiment 41 is the eyepiece of any of embodiments 33 through 38, wherein the substrate is configured to guide light in a range of 635 nm+/−30 nm.

Embodiment 42 is the eyepiece of any of embodiments 33 through 41, wherein at least one of the in-coupling grating and the optical element comprise two or more materials with different indices of refraction.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this by itself should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed:

1. A head mounted display, comprising:
   a head mounted display frame;
   a first eyepiece supported by the frame, the first eyepiece comprising a first substrate composed of a crystalline, transparent material having crystallographic axes in a first orientation with respect to the frame, the first substrate having a first surface and a second surface opposite the first surface, the first eyepiece further comprising a first in-coupling element comprising a grating on the first surface, and a first out-coupling element comprising a grating on the first surface and/or a grating on the second surface; and
   a second eyepiece comprising a second substrate composed of the crystalline, transparent material having crystallographic axes in a second orientation with respect to the frame different from the first orientation, a second in-coupling element on either surface of the second substrate, and a second out-coupling element on either surface of the second substrate.

2. The head mounted display of claim 1, wherein for both the first orientation and the second orientation, a first crystallographic axis of the crystallographic axes is oriented perpendicular to the surface of the respective substrate and a second crystallographic axis of the crystallographic axes is oriented in a plane of the second substrate.

3. The head mounted display of claim 1, wherein an optic axis of the crystalline, transparent material in the first eyepiece is parallel to an optic axis of the crystalline, transparent material in the second eyepiece.

4. The head mounted display of claim 1, wherein a thickness of the first substrate varies across the first substrate.

5. The head mounted display of claim 1, wherein the crystalline, transparent material is selected from the group consisting of $LiNbO_3$, SiC, and $LiTaO_3$.

6. The head mounted display of claim 5, wherein the crystalline, transparent material is a birefringent material.

7. The head mounted display of claim 1, wherein at least one of the first and second in-coupling elements and the first and second out-coupling elements comprise multiple materials with different indices of refraction.

8. The head mounted display of claim 1, wherein:
   the first surface supports a layer of a first dielectric material that extends over the first in-coupling element and the first out-coupling element, the first dielectric material having a refractive index of 1.5 or less;
   the second surface supports a layer of a second dielectric material that extends over the second in-coupling element and the second out-coupling element, the second dielectric material having a refractive index of 1.5 or less;
   or both.

9. The head mounted display of claim 1, further comprising an adhesive layer on edges of at least one of the first and second eyepieces, the adhesive layer configured to absorb visible light.

10. The head mounted display of claim 1, wherein at least one of the first and second in-coupling elements and the first and second out-coupling elements is etched into the surface of the first and second substrates, respectively.

11. An article comprising:
    a wafer composed of a crystalline, transparent material having crystallographic axes in a first orientation with respect to a surface of the wafer, a thickness of the wafer varying across the surface of the wafer such that for a cross-sectional profile of the wafer, the thickness increases monotonically from edges of the wafer to a location of maximum thickness away from the edges; and
    a plurality of optical elements comprising a grating on the surface of the wafer and spaced apart from each other, each grating corresponding to a portion of the wafer for singulation into a component for an eyepiece for a head mounted display, each portion having the same thickness profile.

12. The article of claim 11, further comprising a respective optical element for each grating in a corresponding portion of the wafer.

13. An eyepiece comprising:
    a transparent, crystalline substrate composed of a material having a refractive index greater than 2.2, the substrate extending in a plane and having a thickness in a direction perpendicular to the plane that varies along a first direction in the plane and along a second direction in the plane substantially perpendicular to the second direction;
    an in-coupling element comprising a grating supported by a first surface of the substrate; and
    an optical element comprising a grating supported by the first surface and/or a second surface of the substrate opposite the first surface.

14. The eyepiece of claim 13, wherein the optical element is a combined pupil expander, an exit pupil expander, or an orthogonal pupil expander.

15. The eyepiece of claim 13, wherein the eyepiece corresponds to portion of a spherical or rotational symmetric aspherical surface.

16. The eyepiece claim 13, wherein the eyepiece is coated in an absorptive adhesive material.

17. The eyepiece of claim 13, wherein a difference between a maximum thickness and a minimum thickness is in a range of 1 to 500 nm.

18. The eyepiece of claim 13, wherein a total length in the plane spanning the in-coupling element and optical element is in a range of 60-70 mm.

19. The eyepiece of claim 13, wherein the substrate is configured to guide light in at least one of the following ranges: 455 nm+/−30 nm, 530 nm+/−30 nm, or 635 nm+/−30 nm.

20. The eyepiece of claim 13, wherein at least one of the in-coupling element and the optical element comprise two or more materials with different indices of refraction.

\* \* \* \* \*